(12) United States Patent
Que et al.

(10) Patent No.: US 12,353,050 B2
(45) Date of Patent: Jul. 8, 2025

(54) CAMERA APPARATUS, SMA DRIVING DEVICE AND MANUFACTURING METHOD, DRIVING METHOD AND WIRING METHOD THEREOF

(71) Applicant: NINGBO SUNNY OPOTECH CO., LTD., Zhejiang (CN)

(72) Inventors: Jiayao Que, Yuyao Ningbo (CN); Zhenyu Chen, Yuyao Ningbo (CN); Yinli Fang, Yuyao Ningbo (CN); Hongde Tu, Yuyao Ningbo (CN); Qi Wang, Yuyao Ningbo (CN); Xiaoyang Sun, Yuyao Ningbo (CN); Kailun Zhou, Yuyao Ningbo (CN); Hailing Ding, Yuyao Ningbo (CN)

(73) Assignee: NINGBO SUNNY OPOTECH CO., LTD, Yuyao (CN)

( * ) Notice: Subject to any disclaimer, the term of this patent is extended or adjusted under 35 U.S.C. 154(b) by 880 days.

(21) Appl. No.: 17/266,437

(22) PCT Filed: Jul. 29, 2019

(86) PCT No.: PCT/CN2019/098078
§ 371 (c)(1),
(2) Date: Feb. 5, 2021

(87) PCT Pub. No.: WO2020/029821
PCT Pub. Date: Feb. 13, 2020

(65) Prior Publication Data
US 2021/0294068 A1 Sep. 23, 2021

(30) Foreign Application Priority Data

Aug. 7, 2018 (CN) .......................... 201810891983.0
Aug. 7, 2018 (CN) .......................... 201821267078.X
(Continued)

(51) Int. Cl.
*G02B 7/09* (2021.01)
*F03G 7/06* (2006.01)
(Continued)

(52) U.S. Cl.
CPC ............... *G02B 7/09* (2013.01); *F03G 7/065* (2013.01); *G02B 7/08* (2013.01); *G03B 13/36* (2013.01)

(58) Field of Classification Search
CPC .. F03G 7/0614; F03G 7/06143; F03G 7/0636; F03G 7/0665; F03G 7/065;
(Continued)

(56) References Cited

U.S. PATENT DOCUMENTS 9,684,183 B2 * 6/2017 Brown ..................... G03B 5/00
2001/0022688 A1 9/2001 Kosaka et al.
(Continued)

FOREIGN PATENT DOCUMENTS

CN 101248270 A 8/2008
CN 101416090 A 4/2009
(Continued)

OTHER PUBLICATIONS

Extended European Search Report for European Application No. 19846591.6, dated Sep. 8, 2021.
(Continued)

*Primary Examiner* — William R Alexander
*Assistant Examiner* — Mackenzi Waddell
(74) *Attorney, Agent, or Firm* — Birch, Stewart, Kolasch & Birch, LLP

(57) ABSTRACT

The present disclosure provides a camera apparatus, an SMA driving device and a manufacturing method, a driving method and a wiring method, wherein the SMA driving device further comprises a lens carrier, at least one upgoing driver, and at least one downgoing driver; wherein the lens
(Continued)

carrier is connected to the upgoing driver, and the upgoing driver supports the lens carrier upwardly in a thermally driven manner, and pulls the lens carrier to move upward; wherein the lens carrier is connected to the downgoing driver, and the downgoing driver draws the lens carrier downwardly in a thermally driven manner, and pulls the lens carrier to move downward; and wherein the lens is disposed on the lens carrier of the SMA driving device, and the SMA driving device drives the lens to move up and down, thereby improving the focusing speed of the lens.

20 Claims, 37 Drawing Sheets

(30) Foreign Application Priority Data

| | | |
|---|---|---|
| Feb. 28, 2019 | (CN) | 201910151258.4 |
| Feb. 28, 2019 | (CN) | 201920258543.1 |
| Mar. 15, 2019 | (CN) | 201910197694.5 |
| Mar. 15, 2019 | (CN) | 201920335094.6 |

(51) Int. Cl.
  *G02B 7/08* (2021.01)
  *G03B 13/36* (2021.01)

(58) Field of Classification Search
  CPC ........ G02B 7/09; G02B 13/001; G02B 7/022; G03B 13/36; G03B 3/10; G03B 5/04
  See application file for complete search history.

(56) References Cited

U.S. PATENT DOCUMENTS

| | | |
|---|---|---|
| 2009/0295986 A1 | 12/2009 | Topliss et al. |
| 2010/0074607 A1 | 3/2010 | Topliss et al. |
| 2011/0102920 A1 | 5/2011 | Shyu et al. |
| 2011/0179786 A1 | 7/2011 | Topliss et al. |
| 2011/0235194 A1* | 9/2011 | Nobe ............ G02B 13/001 359/823 |
| 2012/0019675 A1 | 1/2012 | Brown |
| 2012/0120513 A1* | 5/2012 | Kotanagi ............ F03G 7/065 359/823 |
| 2015/0346507 A1 | 12/2015 | Howarth |
| 2017/0254978 A1 | 9/2017 | Chong et al. |
| 2021/0006720 A1 | 1/2021 | Enta |

FOREIGN PATENT DOCUMENTS

| | | | |
|---|---|---|---|
| CN | 101668947 | A | 3/2010 |
| CN | 102023364 | A | 4/2011 |
| CN | 102207603 | A | 10/2011 |
| CN | 103135316 | A | 6/2013 |
| CN | 104204935 | A | 12/2014 |
| CN | 106546188 | A | 3/2017 |
| CN | 107079090 | A | 8/2017 |
| CN | 207283678 | U | 4/2018 |
| CN | 108737708 | A | 11/2018 |
| CN | 208156392 | U | 11/2018 |
| CN | 208739221 | U | 4/2019 |
| CN | 210129900 | U | 3/2020 |
| JP | 2010-286820 | A | 12/2010 |
| JP | 2013-122557 | A | 6/2013 |
| JP | 5574091 | B2 * | 8/2014 ............ G02B 7/022 |
| KR | 10-2011-0097553 | A | 8/2011 |
| WO | WO 2017/148434 | A1 | 9/2017 |
| WO | WO 2018/021479 | A1 | 2/2018 |

OTHER PUBLICATIONS

International Search Report (PCT/ISA/210) issued in PCT/CN2019/098078, dated Oct. 12, 2019.

* cited by examiner

CAMERA APPARATUS, SMA DRIVING DEVICE AND MANUFACTURING METHOD, DRIVING METHOD AND WIRING METHOD THEREOF

CROSS-REFERENCE TO RELATED APPLICATIONS

The present application claims the priority of Chinese invention patent application No. 201810891983.0, filed with the Chinese Patent Office on Aug. 7, 2018; Chinese utility model patent application No. 201821267078.X, filed with the Chinese Patent Office on Aug. 7, 2018; Chinese invention patent application No. 201910151258.4, filed with the Chinese Patent Office on Feb. 28, 2019; Chinese utility model patent application No. 201920258543.1, filed with the Chinese Patent Office on Feb. 28, 2019; Chinese invention patent application No. 201910197694.5, filed with the Chinese Patent Office on Mar. 15, 2019; and Chinese utility model patent application No. 201920335094.6, filed with the Chinese Patent Office on Mar. 15, 2019, the entire contents of which are incorporated herein by reference.

TECHNICAL FIELD

The present disclosure relates to a camera apparatus, and in particular to a camera apparatus, an SMA driving device and a manufacturing method, a driving method and a wiring method.

BACKGROUND

With the increasing integration of mobile electronic devices such as mobile phones and tablet computers, the miniaturization of camera modules has become a development trend. At the same time, in order to meet the high-definition requirements of cameras, the camera modules are required to be able to focus automatically.

The camera module in the prior art with the autofocus function uses an electromagnetic driving motor to drive a lens assembly to a target position so as to achieve the autofocus function. However, such a driving mechanism in the prior art includes magnets, coils, etc. It is not only complex in structure, but also increases the structure of the camera module, so that the overall size of the module structure is difficult to reduce, which is not in line with the requirements of the current mobile electronic devices for miniaturized camera modules.

SMA (shape memory alloy) material is set as another feasible actuator due to its thermal shrinkage characteristics, and can meet the requirements of miniaturization. Moreover, as the actuator of the miniaturized camera lens assembly, the SMA material also has the following advantage: it provides linear, high power per unit mass.

Chinese Invention Patent Publication No. CN101668947A discloses a shape memory alloy driving device. In this publication, a camera apparatus uses an SMA driver as a driving apparatus to drive the movement of lens elements. The SMA driver includes two SMA lines, wherein the SMA lines are disposed around a camera lens assembly in a surrounding manner. Two ends of the SMA line are fixedly disposed on an upper part of the camera apparatus. When the SMA driver thermally shrinks, a middle part of the SMA line draws the camera assembly upwardly to move upward. When the SMA driver cools down, the SMA line relaxes the traction of the camera assembly, wherein the camera assembly is drawn downwardly by an elastic piece to move back to an original position. That is to say, the camera lens apparatus of this camera apparatus in the prior art is driven by the SMA driver to move upward in a one-way driving manner, whereas the downward movement of the camera lens apparatus relies on the rebound effect of the elastic sheet.

As a driver, SMA in the prior art still has at least one of the following defects: Firstly, the driving stroke of the SMA driver in the prior art is short, which results in a short movement distance of the camera lens assembly driven by the SMA driver. In other words, when the SMA line is used as an actuator, the adjustable stroke range of a single line is limited by the length, and the stroke of driving the lens element is short. The SMA driver drives the camera apparatus to move in a one-way manner, so the current required for moving the lens from an initial position to the maximum stroke is always increasing. That is to say, in order to achieve the maximum stroke, the SMA driver needs to consume a large amount of energy. Secondly, the speed at which the lens is driven by the SMA driver in the prior art is not uniform, because the camera lens is driven by the SMA driver to move upward, whereas the downward movement is returned by the elastic piece under the elastic action. Moreover, the rate at which the SMA line is pulled up is different from the rate at which the elastic piece returns, causing the focusing speed to be abnormal. In addition, this SMA driver in the prior art generally adopts a single SMA line system to drive the movement of the lens. This driving manner has poor lens stability and poor response speed of lens movement. Before the lens apparatus of the camera apparatus in the prior art is focused, the position of the camera lens is generally at the bottom end of the camera lens. When focusing is needed, the SMA driver is powered on to heat the SMA line of SMA driver, thereby moving the camera lens upward. However, this lens needs to be driven to move a large stroke. In particular, when the focus of the camera lens needs to be adjusted to a high position, the SMA driver needs to move the camera lens from the lowest position to the highest position. The entire movement stroke is relatively large, resulting in slow response speed of movement of the camera lens.

On the other hand, due to the need to realize the movement of the lens in multiple directions, it is necessary to arrange multiple SMA lines in multiple directions on the outer side of the lens. Each SMA line needs to be connected to a power line. The temperature of each SMA line is changed by the thermal effect of the current so as to control expansion and contraction of each SMA line, thereby realizing the movement of lens in all directions.

FIG. 29 shows an arrangement of SMA lines in a camera module in the prior art. The camera module includes a supporting member 1A, a movable member 2A, a lens assembly mounted on the movable member 2A, two cantilevers 3A elastically connected to the movable member 2A and the supporting member 1A, and four SMA driving lines 4A for driving the movable member 2A to move relative to the supporting member 1A.

Four SMA driving lines 4A are disposed around the movable member 2A in a regular quadrilateral shape, and one end of the SMA driving line 4A is connected to the movable member 2A, and the other end is fixed to the supporting member 1A. By changing the expansion and contraction state of each SMA driving line 4A, the movable member 2A is moved in the XY plane, and the lens assembly mounted on the movable member 2A moves accordingly. The two cantilevers 3A are centrally symmetrically disposed on the outer side of the movable member 2A. One end of the cantilever 3A is connected to the movable member 2A, and the other end is fixed to the supporting member 1A. The cantilever 3A has a certain elastic deformation capacity. When the SMA driving line 4A drives the movable member 2A to move relative to the supporting member 1A, the cantilever 3A is elastically deformed. When the SMA driving line 4A is restored, the cantilever 3A is restored from deformation while making the movable member 2A return to its original position.

The SMA driving lines 4A mounted on the movable member 2A all need to be powered on, and thus an external power line is required to extend to the movable member 2A. In the prior art, as shown in FIG. 30, the power line 5A extends to the movable member 2A along an upper surface of the cantilever 3A, and is connected electrically to the SMA driving line 4A at the connection of the movable member 2A and the SMA driving line 4A. The power line is electrically connected to the external power line at a fixed end of the cantilever 3A.

As shown in FIG. 31, the lens assembly includes a lens 51A and a motor 52A for focusing. The motor 52A also needs to be electrically connected to the external power source through a power line. However, the upper surface of the cantilever 3A has the very limited area and can only be arranged with a power line for supplying power to the SMA driving line 4A, and the power line of the motor 52A cannot be extended to the movable member 2A through the cantilever 3A. Therefore, the power line of the motor 52A needs to be disposed on the external connection belt 53A. The increase of the external connection belt 53A makes the overall size of the camera module increase and the structure more complicated. In addition, even if the upper surface area of the cantilever 3A is increased in design, and the power line of the motor 52A is also arranged on the cantilever 3A, there is a risk of short circuit and leakage after long-term movement wears the insulating layer of the power line. Moreover, the increase of the upper surface of the cantilever 3A also inevitably increases the overall size of the camera module, which is not conducive to miniaturization.

SUMMARY

One main advantage of the present disclosure is to provide a camera apparatus, an SMA driving device and a manufacturing method, a driving method and a wiring method, wherein a lens of the camera apparatus is intermediately placed, and the lens is driven by the SMA driving device to move upward and downward.

Another advantage of the present disclosure is to provide a camera apparatus, an SMA driving device and a manufacturing method, a driving method and a wiring method, wherein the lens of the camera apparatus is intermediately placed, and wherein the lens is driven by the SMA driving device to move up and down at an intermediate position (neutral position), so that the maximum stroke of the unidirectional movement of the SMA driving device is halved, and the response speed of movement of the lens is improved.

Another advantage of the present disclosure is to provide a camera apparatus, an SMA driving device and a manufacturing method, a driving method and a wiring method, wherein the lens of the camera apparatus is intermediately placed, and the response time of the SMA driving device to drive the lens to move is reduced, thereby improving the focusing speed of the camera apparatus.

Another advantage of the present disclosure is to provide a camera apparatus, an SMA driving device and a manufacturing method, a driving method and a wiring method, wherein the lens is intermediately placed, and the lens is moved bidirectionally by the SMA driving device, and wherein the maximum driving current in one direction of the SMA driving device is reduced, thereby reducing the power consumption of the SMA driving device.

Another advantage of the present disclosure is to provide a camera apparatus, an SMA driving device and a manufacturing method, a driving method and a wiring method, wherein the SMA driving device comprises an upgoing driver and a downgoing driver, and wherein the upgoing driver drives the lens to move upward, and the downgoing driver drives the lens to move downward. Therefore, the process of pulling up and returning the lens is completed by the SMA driving device, wherein the SMA driving device equalizes the moving speed of the lens, thereby improving the uniformity of the focusing speed of the camera apparatus.

Another advantage of the present disclosure is to provide a camera apparatus, an SMA driving device and a manufacturing method, a driving method and a wiring method, wherein the upgoing driver and the downgoing driver of the SMA driving device are disposed inversely, and wherein the upgoing driver and the downgoing driver jointly drive the lens to keep the lens placed at the intermediate position, reducing the unidirectional movement stroke of the SMA driving device.

Another advantage of the present disclosure is to provide a camera apparatus, an SMA driving device and a manufacturing method, a driving method and a wiring method, wherein the SMA driving device adjusts the driving direction of the SMA driving device by means of adjusting the current of the upgoing driver and the downgoing driver to control the movement direction of the lens.

Another advantage of the present disclosure is to provide a camera apparatus, an SMA driving device and a manufacturing method, a driving method and a wiring method, wherein the SMA driving device controls the movement direction of the lens by means of adjusting the current magnitudes of the upgoing driver and the downgoing driver: increasing the current of the upgoing driver and reducing the current of the downgoing driver enables the upgoing driver to drive the lens to move upward; and increasing the current of the downgoing driver and reducing the current of the upgoing driver enables the downgoing driver to drive the lens to move downward.

Another advantage of the present disclosure is to provide a camera apparatus, an SMA driving device and a manufacturing method, a driving method and a wiring method, wherein the upgoing driver and the downgoing driver of the SMA driving device each comprise two SMA lines, and wherein the two SMA lines jointly drive the lens to move, so that the driving force of the SMA driving device is increased, thereby improving the speed at which the SMA driving device drives the lens to move.

Another advantage of the present disclosure is to provide a camera apparatus, an SMA driving device and a manufacturing method, a driving method and a wiring method, wherein the SMA lines of the upgoing driver and the downgoing driver of the SMA driving device are symmetrically disposed on the lens. Therefore, when the upgoing driver or the downgoing driver drives the lens to move, the lens receives balanced forces from both sides, and by means of the SMA driving device, the lens is maintained to be balanced during moving, improving the driving stability of the SMA driving device.

Another advantage of the present disclosure is to provide a camera apparatus, an SMA driving device and a manufacturing method, a driving method and a wiring method, wherein a plane where the SMA line of the SMA driving device is located is parallel to an optical axis of the camera apparatus, and wherein the SMA driving device provides a force parallel to a direction of the optical axis to the lens, thereby stabilizing the lens in the direction of the optical axis.

Another advantage of the present disclosure is to provide a camera apparatus, an SMA driving device and a manufacturing method, a driving method and a wiring method, wherein the camera apparatus further comprises an upper elastic piece and a lower elastic piece, and wherein the upper elastic piece and the lower elastic piece balance received forces of the lens in all directions, so that the smoothness of the received force of the lens when the lens is driven by the SMA driving device is improved. In other words, the upper elastic piece and the lower elastic piece balance the received forces of the lens in all directions, improving the smoothness of the force of the SMA driving device.

Another advantage of the present disclosure is to provide a camera apparatus, an SMA driving device and a manufacturing method, a driving method and a wiring method, wherein the SMA driver drives a lens of the camera apparatus to move in a dual-driven manner, improving the driving speed of the lens.

Another advantage of the present disclosure is to provide a camera apparatus, an SMA driving device and a manufacturing method, a driving method and a wiring method, wherein the SMA driver drives the lens to move jointly by means of internal driving and external driving to improve the speed at which the lens is driven to move, thereby reducing the response time of the camera apparatus for focusing.

Another advantage of the present disclosure is to provide a camera apparatus, an SMA driving device and a manufacturing method, a driving method and a wiring method, wherein the SMA driver comprises an inner SMA driving apparatus and an outer SMA driving apparatus, wherein the inner SMA driving apparatus drives the movement of the lens, and wherein the outer SMA driving apparatus drives the inner SMA driving apparatus to move and then drives the movement of the lens, increasing the movement stroke of the lens.

Another advantage of the present disclosure is to provide a camera apparatus, an SMA driving device and a manufacturing method, a driving method and a wiring method, wherein the inner SMA driving apparatus and the outer SMA driving apparatus of the SMA driver may drive the lens to move in a manner of translation or rotation within a range of space, so that the focus range of the lens becomes larger, thereby increasing the capturing range of the camera apparatus.

Another advantage of the present disclosure is to provide a camera apparatus, an SMA driving device and a manufacturing method, a driving method and a wiring method, wherein while the inner SMA driving apparatus of the SMA driver drives the lens to move, the outer SMA driving apparatus drives the inner SMA driving apparatus to move in the same direction to improve the speed at which the SMA driver drives the lens to move.

Another advantage of the present disclosure is to provide a camera apparatus, an SMA driving device and a manufacturing method, a driving method and a wiring method, wherein when the inner SMA driving apparatus of the SMA driver drives the lens to move, the inner SMA driving apparatus and the outer SMA driving apparatus can be adjusted to hold the lens at a stable imaging position, thereby stabilizing the imaging of the camera apparatus.

Another advantage of the present disclosure is to provide a camera apparatus, an SMA driving device and a manufacturing method, a driving method and a wiring method, wherein the inner SMA driving apparatus of the SMA driver is disposed inside the outer SMA driving apparatus, and the movement of the inner SMA driving apparatus is driven by means of the outer SMA driving apparatus, and wherein the inner SMA driving apparatus drives the movement of the lens under the supporting action of the outer SMA driving apparatus, thereby realizing internal and external driving of the lens, and then increasing the stroke distance of the lens.

Another advantage of the present disclosure is to provide a camera apparatus, an SMA driving device and a manufacturing method, a driving method and a wiring method, wherein while the inner SMA driving apparatus of the SMA driver is driven by the outer SMA driving apparatus to move, it drives the lens to move, so that the lens is driven jointly by the inner SMA driving apparatus and the outer SMA driving apparatus, speeding up the movement of the lens and reducing the time for the lens to move to a specified position, thereby reducing the response time of the camera apparatus for focusing.

Another advantage of the present disclosure is to provide a camera apparatus, an SMA driving device and a manufacturing method, a driving method and a wiring method, wherein the inner SMA driving apparatus of the SMA driver comprises at least two inner driving unit, wherein the outer SMA driving apparatus comprises at least two outer driving units, wherein the inner driving units symmetrically drive the lens to move, and wherein the outer driving units are symmetrically disposed outside the inner SMA driving apparatus, and the stability of the lens during the movement is maintained by means of the inner driving units and the outer driving units.

Another advantage of the present disclosure is to provide a camera apparatus, an SMA driving device and a manufacturing method, a driving method and a wiring method, wherein the SMA driver further comprises at least one suspension system, wherein the suspension system is disposed in the inner SMA driving apparatus and the outer SMA driving apparatus, and wherein the suspension system provides the lens with opposite forces to support the inner SMA apparatus and the lens to move smoothly during the movement.

Another advantage of the present disclosure is to provide a camera apparatus, an SMA driving device and a manufacturing method, a driving method and a wiring method, wherein the number of the inner driving units and the number of the outer driving units of the SMA driver are four, and the inner driving units and the outer driving units are symmetrically disposed at four side positions of the lens, and through driving of the inner driving units and the outer driving units on different sides, the lens is driven to translate or rotate based on any direction in space, so that the lens acquires images in a larger range, thereby causing the focus range of the camera apparatus to become larger.

Another advantage of the present disclosure is to provide a camera apparatus, an SMA driving device and a manufacturing method, a driving method and a wiring method, wherein the inner driving unit and the outer driving unit of the SMA driver further comprise a pair of SMA lines disposed in mutually different planes, and wherein the SMA lines in the mutually different planes provide the same force so that the SMA driver drives the lens to move smoothly.

Another advantage of the present disclosure is to provide a camera apparatus, an SMA driving device and a manufacturing method, a driving method and a wiring method, which optimize the wiring of the internal power line to reduce the overall size of the camera apparatus and simplify the internal structure of the camera apparatus.

Another advantage of the present disclosure is to provide a camera apparatus, an SMA driving device and a manufacturing method, a driving method and a wiring method, which are suitable for reliable and rapid wiring on the cantilever of the camera apparatus.

Other advantages and features of the present disclosure are fully embodied by the following detailed description and can be realized by the combination of means and apparatuses specifically pointed out in the appended claims.

According to one aspect of the present disclosure, an SMA driving device of the present disclosure that can achieve the foregoing objectives and other objectives and advantages, comprising:
- a lens carrier;
- at least one upgoing driver, wherein the lens carrier is drivably connected to the upgoing driver, and the upgoing driver supports the lens carrier upwardly in a thermally driven manner, and pulls the lens carrier to move upward; and
- at least one downgoing driver, wherein the lens carrier is drivingly connected to the downgoing driver, and the downgoing driver supports the lens carrier downwardly in a thermally driven manner, and pulls the lens carrier to move downward.

According to one embodiment of the present disclosure, in an initial state, the lens carrier is supported upwardly by the upgoing driver and drawn downwardly by the downgoing driver, and is held at an intermediate position, and wherein the lens carrier can be moved up and down based on the upgoing driver and the downgoing driver.

According to one embodiment of the present disclosure, the upgoing driver and the downgoing driver provide the lens carrier with a force in a manner of being driven by electric heating, wherein the upgoing driver and the downgoing driver support the lens carrier at the intermediate position in a case of being (electrically) powered on, and drive the lens carrier to move.

According to one embodiment of the present disclosure, a (an electric) current of the upgoing driver is increased, and a (an electric) current of the downgoing driver is reduced, so that the upgoing driver has an enhanced thermal driving effect, and the downgoing driver has a reduced thermal driving effect, and wherein the upgoing driver drives the lens carrier to move upward.

According to one embodiment of the present disclosure, a (an electric) current of the downgoing driver is increased, and a (an electric) current of the upgoing driver is reduced, so that the downgoing driver has an enhanced thermal driving effect, and the upgoing driver has a reduced thermal driving effect, wherein the downgoing driver drives the lens carrier to move downward.

According to one embodiment of the present disclosure, the upgoing driver comprises at least one upgoing driving unit and at least one upper bending member, wherein the upper bending member is disposed on the lens carrier, and wherein the upgoing driving unit is drivably connected to the upper bending member, and the upgoing driving unit provides the lens carrier with an upward force through the upper bending member, so that the upper bending member drives the lens carrier upwardly to move.

According to one embodiment of the present disclosure, the number of the upgoing driving units and the number of the upper bending members of the upgoing driver are two, wherein the upgoing driving units and the upper bending members are disposed in the lens carrier in a symmetrical manner.

According to one embodiment of the present disclosure, the downgoing driver comprises at least one downgoing driving unit and at least one lower bending member, wherein the lower bending member is disposed on the lens carrier, and wherein the downgoing driving unit is drivingly connected to the upper bending member, and the downgoing driving unit provides the lens carrier with a downward force through the lower bending member, so that the lower bending member drives the lens carrier downwardly to move.

According to one embodiment of the present disclosure, the number of the downgoing driving units and the number of the lower bending members of the downgoing driver are two, wherein the downgoing driving units and the lower bending members are disposed in the lens carrier in a symmetrical manner.

According to one embodiment of the present disclosure, wherein the upper bending member and the lower bending member are formed by integrally extending outwardly from an outer edge of the lens carrier.

According to one embodiment of the present disclosure, the upgoing driver comprises at least one upgoing driving unit and at least one upper actuator, wherein the upper actuator is disposed below the lens carrier, and wherein the upgoing driving unit is drivingly connected to the upper actuator, and the upgoing driving unit provides the lens carrier with an upward force through the upper actuator, so that the upper actuator drives the lens carrier upwardly to move.

According to one embodiment of the present disclosure, the downgoing driver comprises at least one downgoing driving unit and at least one lower actuator, wherein the lower actuator is disposed above the lens carrier, and wherein the downgoing driving unit is drivingly connected to the lower actuator, and the downgoing driving unit provides the lens carrier with a downward force through the lower actuator, so that the lower actuator drives the lens carrier downwardly to move.

According to one embodiment of the present disclosure, the number of the upgoing driving units of the upgoing driver and the number of the downgoing driving units of the downgoing driver are two, and wherein the upgoing driving units and the downgoing driving units are adjacently disposed on sides of the lens carrier.

According to one embodiment of the present disclosure, the upgoing driving units of the upgoing driver are symmetrically disposed on the lens carrier, and wherein the downgoing driving units of the downgoing driver is symmetrically disposed on the lens carrier.

According to one embodiment of the present disclosure, the upper actuator further comprises an upper actuator main body and at least one upper hook, wherein the upper hook is disposed on a side of the upper actuator main body, wherein the upper hook is formed by integrally extending upwardly from an outer side of the upper actuator main body, and wherein the upgoing driving unit applies an upward force to the upper actuator main body through the upper hook, so that the upper actuator main body drives the lens carrier to move upward.

According to one embodiment of the present disclosure, the upper hook has a downward opening, wherein the upgoing driving unit passes through the opening and is hooked on the upper hook.

According to one embodiment of the present disclosure, the lower actuator further comprises a lower actuator main body and at least one lower hook, wherein the lower hook is disposed on a side of the lower actuator main body, wherein the lower hook is formed by integrally extending downwardly from an outer side of the lower actuator main body, and wherein the downgoing driving unit applies a downward force to the lower actuator main body through the lower hook, so that the lower actuator main body drives the lens carrier to move downward.

According to one embodiment of the present disclosure, the lower hook has an upward opening, wherein the downgoing driving unit passes through the opening and is hooked on the lower hook.

According to one embodiment of the present disclosure, the number of the upper hooks of the upper actuator and the number of the lower hooks of the lower actuator are two, wherein the upper hooks are symmetrically disposed at middle positions of a side of the upper actuator main body, and wherein the lower hooks are symmetrically disposed at middle positions of a side of the lower actuator main body.

According to one embodiment of the present disclosure, the upper actuator main body of the upper actuator and the lower actuator main body of the lower actuator are rigid sheets.

According to one embodiment of the present disclosure, the upgoing driving unit further comprises at least one upper drive SMA line and at least two upper drive fixing apparatuses, wherein two end parts of the upper drive SMA line are fixed to the upper drive fixing apparatuses, and when the upper drive SMA line thermally shrinks, the upper drive SMA line is enabled to provide the upper bending member with an upward force by means of the upper drive fixing apparatuses.

According to one embodiment of the present disclosure, the downgoing driving unit further comprises at least one lower drive SMA line and at least two lower drive fixing apparatuses, wherein two end parts of the lower drive SMA line are fixed to the lower drive fixing apparatuses, and when the lower drive SMA line thermally shrinks, the lower drive SMA line is enabled to provide the lower bending member with a downward force by means of the lower drive fixing apparatuses.

According to one embodiment of the present disclosure, the upper drive SMA line passes below the upper bending member, wherein when the upper drive SMA line thermally shrinks, the upper drive SMA line is supported by the upper drive fixing apparatus and provides the upper bending member with an upward supporting force.

According to one embodiment of the present disclosure, the lower drive SMA line passes above the lower bending member, wherein when the lower drive SMA line thermally shrinks, the lower drive SMA line is supported by the lower drive fixing apparatus and provides the upper bending member with a downward supporting force.

According to one embodiment of the present disclosure, the upper bending member is further provided with at least one upper chamfered plane, wherein the upper chamfered plane guides the upper drive SMA line to bend upwardly and deform, and wherein the upper drive SMA line is guided by the upper chamfered plane and deformed to form a "V"-shaped SMA segment.

According to one embodiment of the present disclosure, the lower bending member is further provided with at least one lower chamfered plane, wherein the lower chamfered plane guides the lower drive SMA line to bend downwardly and deform, and wherein the lower drive SMA line is guided by the lower chamfered plane and deformed to form an inverted "V"-shaped SMA segment.

According to one embodiment of the present disclosure, the upper bending member and the lower bending member are located at middle positions of an outer edge of the lens carrier.

According to one embodiment of the present disclosure, the upper bending member bends the upper drive SMA line to form two upper drive SMA line segments, wherein the lower bending member bends the lower drive SMA line to form two lower drive SMA line segments, and wherein a plane where the upper drive SMA line segments are located and a plane where the lower drive SMA line segments are located are parallel to an axis of the lens carrier, so that the upper drive SMA line and the lower drive SMA line only provide a force along a direction of the axis when thermally shrinking.

According to one embodiment of the present disclosure, the upper bending member further comprises an upper chamfered end and at least one upper limit end, wherein a side surface of the upper chamfered end forms the upper chamfered plane, and wherein the upper limit end protrudes from the upper chamfered plane, so that the upper drive SMA line is limited in the upper chamfered plane by the upper limit end, further preventing the upper SMA line from being detached from the upper bending member.

According to one embodiment of the present disclosure, the lower bending member further comprises a lower chamfered end and at least one lower limit end, wherein a side surface of the lower chamfered end forms the lower chamfered plane, and wherein the lower limit end protrudes from the lower chamfered plane, so that the lower drive SMA line is limited in the lower chamfered plane by the lower limit end, further preventing the lower SMA line from being detached from the lower bending member.

According to one embodiment of the present disclosure, the SMA driving device further comprises a supporting base, wherein the upgoing driver and the downgoing driver are mounted on the supporting base, and the upgoing driver and the downgoing driver are supported by means of the supporting base.

According to one embodiment of the present disclosure, the upper drive fixing apparatus further comprises an upper drive fixed end and an upper drive traction end formed by integrally extending upwardly from the upper drive fixed end, wherein the upper drive fixed end is disposed on the supporting base, and wherein an end part of the upper drive SMA line is fixed to the upper drive traction end, and the upper drive SMA line is supported by means of the upper drive traction end to shrink upwardly for driving when thermally shrinking.

According to one embodiment of the present disclosure, a height of the upper drive traction end of the upper drive fixing apparatus is higher than a height of the upper bending member.

According to one embodiment of the present disclosure, the lower drive fixing apparatus further comprises a lower drive fixed end and a lower drive traction end formed by integrally extending downwardly from the lower drive fixed end, wherein the lower drive fixed end is disposed on the supporting base, and wherein an end part of the lower drive SMA line is fixed to the lower drive traction end, and the lower drive SMA line is supported by means of the lower drive traction end to shrink downwardly for driving when thermally shrinking.

According to one embodiment of the present disclosure, a height of the lower drive traction end of the lower drive fixing apparatus is lower than a height of the lower bending member.

According to one embodiment of the present disclosure, the supporting base is further provided with at least four mounting portions, wherein the upper drive fixing apparatus and the lower drive fixing apparatus are mounted in the mounting portions of the supporting base in an embedded/engaged manner.

According to one embodiment of the present disclosure, the supporting base is further provided with at least four mounting portions, wherein the upper drive fixing apparatus and the lower drive fixing apparatus are mounted in the mounting portions of the supporting base in an integrally formed manner.

According to one embodiment of the present disclosure, the SMA driving device further comprises at least one upper elastic piece and at least one lower elastic piece, wherein the upper elastic piece is disposed above the lens carrier, the lower elastic piece is disposed below the lens carrier, and when the lens carrier is driven to move up and down, the upper elastic piece and/or the lower elastic piece are driven by the lens carrier to produce elastic deformation so as to balance received forces of the lens carrier in all directions.

According to one embodiment of the present disclosure, the lower elastic piece is disposed above the supporting base, and the lower elastic piece is supported by the supporting base, and wherein when the SMA driving device is in an unpowered state, the lower elastic piece supports the lens carrier upwardly.

According to one embodiment of the present disclosure, the upper drive fixing apparatus and the lower drive fixing apparatus are electrically connected to the lower elastic piece. By way of example but not limitation, the lower elastic piece may guide base fixed ends of the upper drive fixing apparatus and the lower drive fixing apparatus to a side surface of the driving apparatus.

According to one embodiment of the present disclosure, the SMA driving device further comprises at least one limiting apparatus, wherein the limiting apparatus limits a maximum distance that the lens carrier 21 is driven to move upward and downward, and wherein when the lens carrier moves in an up and down direction, the limiting apparatus is blocked, so that the lens carrier reaches an upper limit position and a lower limit position.

According to one embodiment of the present disclosure, the limiting apparatus further comprises at least one upper limiting unit and at least one lower limiting unit, wherein the upper limiting unit extends integrally at an upper end of the lens carrier, wherein the lower limiting unit is integrally disposed on the supporting base, wherein a distance between the upper elastic piece and an inner surface of an upper end of a housing defines an upper limit distance of upward movement of the lens carrier, and wherein a distance between a lower end of the lens carrier and the lower limiting unit defines a lower limit movement distance of downward movement of the lens carrier.

According to one embodiment of the present disclosure, an angle between the upper drive SMA line segment and a horizontal direction is greater than 10°, and an angle between the lower drive SMA line segment and the horizontal direction is greater than 10°.

According to one embodiment of the present disclosure, the lower elastic piece comprises a lower elastic piece bearing ring and at least one lower elastic piece supporting end formed by extending outwardly from the lower elastic piece bearing ring, and wherein the lower elastic piece supporting end is fixedly disposed on the supporting base, and the lens carrier is supported upwardly by means of the lower elastic piece bearing ring.

According to one embodiment of the present disclosure, the lower elastic piece is divided into at least two independent parts, and each part has a function of circuit conduction.

According to one embodiment of the present disclosure, the SMA driving device further comprises at least one spacer apparatus, and wherein the spacer apparatus is disposed between the lens carrier and the housing, and separates the lens carrier and an inner wall of the housing to form a gap so as to limit the SMA line from contacting the housing.

According to one embodiment of the present disclosure, the spacer apparatus is integrally disposed on the lens carrier, and wherein the spacer apparatus is formed by integrally extending outwardly from a side of the lens carrier, and the spacer apparatus protrudes outwardly from the upgoing driver and the downgoing driver.

According to another aspect of the present disclosure, the present disclosure further provides a camera apparatus, comprising:
  at least one circuit board;
  a photosensitive chip, wherein the photosensitive chip is disposed and attached above the circuit board;
  at least one lens, wherein the lens is located above the photosensitive chip, and the lens focuses light on the photosensitive chip;
  a lens holder, wherein the lens holder comprises a lens holder main body and at least one color filter disposed on the lens holder main body, and wherein the color filter is supported between the lens and the photosensitive chip by the lens holder main body; and
  an SMA driving device, wherein the lens is disposed on the lens carrier of the SMA driving device, wherein the SMA driving device drives the lens to move up and down, and wherein the SMA driving device comprises:
  a lens carrier;
  at least one upgoing driver, wherein the lens carrier is drivably connected to the upgoing driver, and the upgoing driver supports the lens carrier upwardly in a thermally driven manner, and pulls the lens carrier to move upward; and
  at least one downgoing driver, wherein the lens carrier is drivingly connected to the downgoing driver, and the downgoing driver supports the lens carrier downwardly in a thermally driven manner, and pulls the lens carrier to move downward.

According to one embodiment of the present disclosure, the lens comprises at least one lens sheet, and wherein the lens sheet of the lens and the photosensitive chip are disposed along an optical axis of the camera apparatus.

According to one embodiment of the present disclosure, the camera apparatus further comprises at least one housing, wherein the housing is disposed above the lens holder, and the housing is further provided with an accommodating space and a light entrance hole, and wherein the lens and the SMA driving device are located in the accommodating space, and the light entrance hole communicates with the accommodating space.

According to one embodiment of the present disclosure, the lens carrier of the SMA driving device comprises a carrier main body and is further provided with a carrier cavity, wherein the lens is held in the carrier cavity by the carrier main body, and wherein the carrier main body drives the lens located in the carrier cavity to move up and down with the carrier.

According to one embodiment of the present disclosure, the carrier main body further comprises a carrier ring and a carrier bracket, and the carrier ring has a carrier inner wall, wherein the lens is fixed to the carrier inner wall, wherein the carrier bracket integrally extends outwardly from the carrier ring, and wherein the upgoing driver and the downgoing driver apply a driving force to the carrier ring through the carrier bracket, and the lens is driven by means of the carrier ring to move up and down.

According to another aspect of the present disclosure, the present disclosure further provides a manufacturing method for an SMA driving device, wherein the manufacturing method comprises the following steps:

(a) placing a lens carrier in an intermediate position, so that the lens carrier can be driven to move up and down;

(b) disposing at least one upgoing driver and at least one downgoing driver on the lens carrier, so that the lens carrier is driven by means of the upgoing driver to move upward, and the lens carrier is driven by means of the downgoing driver to move downward; and (c) mounting at least one upper elastic piece above the lens carrier, and mounting at least one lower elastic piece between the lens carrier and a supporting base so as to manufacture the SMA driving device.

According to one embodiment of the present disclosure, in the step (b), two upgoing driving units of the upgoing driver and two downgoing driving units of the downgoing driver are symmetrically disposed on sides of the lens carrier.

According to one embodiment of the present disclosure, in the step (b), two upper drive fixing apparatuses of the upper driving unit and two lower drive fixing apparatuses of the lower driving unit are fixedly mounted on the supporting base, and the upgoing driver and the downgoing driver are supported by means of the supporting base.

According to one embodiment of the present disclosure, in the step (b), at least one upper drive SMA line is pressed against the upper drive fixing apparatus, and at least a lower drive SMA line is pressed against the lower drive fixing apparatus to manufacture the upgoing driving unit and the downgoing driving unit.

According to one embodiment of the present disclosure, in the step (c) of the above method, the lower elastic piece is disposed on the supporting base, and the lens carrier is supported above the supporting base by means of the lower elastic piece in such a manner that the lens carrier is mounted above the lower elastic piece.

According to another aspect of the present disclosure, the present disclosure further provides a driving method for an SMA driving device, wherein the driving method comprises the following steps:

(I) in an initial state, at least one upper drive SMA line of at least one upgoing driving unit of at least one upgoing driver thermally shrinking, and at least one lower drive SMA line of at least one downgoing driving unit of at least one downgoing driver thermally shrinking, and drawing a lens carrier by means of joint shrinkage of the upper drive SMA line and the lower drive SMA line to hold the lens carrier at a position that can move up and down; and (II) differently controlling temperature of the upper drive SMA line of the upgoing driving unit and temperature of the lower drive SMA line of the downgoing driving unit to control the upper drive SMA line and the lower drive SMA line to draw and support the lens carrier with different degrees of tension, so as to drive the lens carrier to move.

According to one embodiment of the present disclosure, in the above step (I), in the initial state of the SMA driving device, the upper drive SMA line and the lower drive SMA line are electrically heated to increase the temperature of the SMA lines, so that the lens carrier is supported in a manner of thermal shrinkage.

According to one embodiment of the present disclosure, in the above step (II), the SMA driving device differently controls current magnitudes of the upper drive SMA line and the lower drive SMA line to control the temperature for thermal driving of the upper drive SMA line and the lower drive SMA line.

According to one embodiment of the present disclosure, in the above step (II), when a current of the upper drive SMA line of the upgoing driving unit is increased, and a current of the lower drive SMA line of the downgoing driving unit is decreased, the upper drive SMA line is tightened as the temperature rises, and the lower drive SMA line is relaxed as the temperature drops.

According to one embodiment of the present disclosure, in the above step (II), when a current of the lower drive SMA line of the downgoing driving unit is increased, and a current of the upper drive SMA line of the upgoing driving unit is decreased, the lower drive SMA line is tightened as the temperature rises, and the upper drive SMA line is relaxed as the temperature drops.

Further objectives and advantages of the present disclosure will be fully embodied through the understanding of the following description and the drawings.

According to one aspect of the present disclosure, an SMA driver of the present disclosure that can achieve the foregoing objectives and other objectives and advantages, adapted to drive a lens to move, and comprising:

an inner SMA driving apparatus, wherein the lens is disposed on the inner SMA driving apparatus, and the inner SMA driving apparatus drives the lens to move;

an outer SMA driving apparatus, wherein the outer SMA driving apparatus is located on an outer side of the inner SMA driving apparatus, and the inner SMA driving apparatus is drivably supported by the outer SMA driving apparatus, and the outer SMA driving apparatus drives the inner SMA driving apparatus to move, so that the inner SMA driving apparatus drives movement of the lens.

According to one embodiment of the present disclosure, the outer SMA driving apparatus is provided with an accommodating space, wherein the inner SMA driving apparatus is built in the accommodating space, and the inner SMA driving apparatus is driven by the outer SMA driving apparatus and drives the lens to move in the accommodating space.

According to one embodiment of the present disclosure, the inner SMA driving apparatus comprises a lens carrier, at least two inner driving units, and a supporting carrier, and the lens carrier further has an optical axis, wherein the lens is mounted on the lens carrier based on the optical axis, the inner driving units are drivably supported by the lens carrier on the supporting carrier, and the inner driving units are supported by the supporting carrier and draw the lens carrier to move.

According to one embodiment of the present disclosure, two of the inner driving units are symmetrically disposed on side surfaces of the lens carrier, and wherein each of the inner driving units synchronously drives the lens carrier with the same driving force based on the supporting carrier, so that the lens moves along the direction of the optical axis.

According to one embodiment of the present disclosure, the number of the inner driving units is four, wherein the four inner driving units are symmetrically disposed on four side surfaces of the lens carrier, and wherein each of the inner driving units drives the lens carrier to move in a differential speed manner based on the supporting carrier, so that the lens carrier drives the lens to translate in a horizontal direction perpendicular to the optical axis or rotate.

According to one embodiment of the present disclosure, the outer SMA driving apparatus comprises at least one bearing apparatus and at least two outer driving units, wherein the outer driving unit connects the supporting carrier to the bearing apparatus, and the outer driving unit is supported by means of the bearing apparatus and draws the inner SMA driving apparatus and the lens to move.

According to one embodiment of the present disclosure, the outer driving units are symmetrically disposed on side surfaces of the supporting carrier, and the outer driving units synchronously drive the supporting carrier with the same driving force based on the bearing apparatus, so that the inner SMA driving apparatus and the lens move along the direction of the optical axis.

According to one embodiment of the present disclosure, the number of the outer driving units is four, wherein the four outer driving units are symmetrically disposed on four side surfaces of the lens carrier, and wherein each of the outer driving units drives the supporting carrier to move in a differential speed manner based on the supporting carrier, so that the supporting carrier drives the lens carrier and the lens to translate in a horizontal direction perpendicular to the optical axis or rotate.

According to one embodiment of the present disclosure, the lens carrier comprises a carrier main body and is further provided with at least one lens accommodating cavity, wherein the lens accommodating cavity is formed in the carrier main body, and wherein the carrier main body fixes the lens in the lens accommodating cavity.

According to one embodiment of the present disclosure, the carrier main body is further provided with a carrier inner wall, wherein the lens is mounted on the carrier inner wall of the carrier main body, and wherein the lens is mounted by means of one or more selected from threaded connection, glued connection and snap connection.

According to one embodiment of the present disclosure, the supporting carrier further comprises at least two supporting carrier units, wherein the supporting carrier units are symmetrically disposed on both sides of the lens carrier, and wherein the inner driving unit drives the lens carrier to move based on the supporting carrier unit, the supporting carrier unit is drivably connected to the outer SMA driving apparatus, and the outer driving unit drives movement of the lens carrier through the supporting carrier units.

According to one embodiment of the present disclosure, the number of the supporting carrier units of the supporting carrier is four, and the supporting carrier units of the supporting carrier are sequentially connected to form an integral ring-shaped supporting frame.

According to one embodiment of the present disclosure, the supporting carrier units of the supporting carrier forms an internal drive space, wherein the lens carrier is supported in the internal drive space by the supporting carrier, and the inner driving units drive the lens carrier to move in the internal drive space in a manner of thermal shrinkage.

According to one embodiment of the present disclosure, in an initial state of the SMA driver, the lens carrier is held by the supporting carrier close to a position below the internal drive space, and the inner driving units draw the lens carrier to move upward based on the supporting carrier units.

According to one embodiment of the present disclosure, in an initial state of the SMA driver, the lens carrier is held by the supporting carrier close to a position above the internal drive space, and the inner driving units draw the lens carrier to move downward based on the supporting carrier units.

According to one embodiment of the present disclosure, the lens carrier is further provided with four carrier outer walls, and the supporting carrier unit is further provided with a carrier inner side surface, and wherein the inner driving unit is disposed to connect a lower end of the carrier outer wall to an upper end part of the carrier inner side surface, and the inner driving units draw the lens carrier to move upward in a manner of thermal shrinkage based on the supporting carrier units.

According to one embodiment of the present disclosure, the lens carrier is further provided with four carrier outer walls, and the supporting carrier unit is further provided with a carrier inner side surface, and wherein the inner driving unit is disposed to connect an upper end of the carrier outer wall to a lower end part of the carrier inner side surface, and the inner driving units draw the lens carrier to move downward in a manner of thermal shrinkage based on the supporting carrier units.

According to one embodiment of the present disclosure, the inner driving unit comprises at least one inner drive SMA line, wherein the carrier outer wall of the lens carrier is connected to the carrier inner side surface of the supporting carrier unit by the inner drive SMA line, and wherein the inner drive SMA line thermally shrinks in an electric heating manner and drives the lens carrier to move.

According to one embodiment of the present disclosure, the number of the inner drive SMA lines of the inner driving unit is two, and wherein the inner drive SMA line of the inner driving unit connects the lens carrier to the supporting carrier units in a different plane, wherein the inner drive SMA lines of the inner driving unit are in mutually different planes, and when the inner drive SMA lines shrink by the same amount of thermal shrinkage, component forces generated by the inner drive SMA lines in a horizontal direction cancel each other out, so that the inner driving unit provides the lens carrier with a force along the direction of the optical axis and keeps the lens carrier moving smoothly.

According to one embodiment of the present disclosure, the inner SMA driving apparatus further comprises a plurality of inner SMA line fixing apparatuses, wherein the inner SMA line fixing apparatus fixes one end of the inner drive SMA line to the carrier outer wall of the lens carrier and fixes the other end of the inner drive SMA line to the carrier inner side surface of the supporting carrier.

According to one embodiment of the present disclosure, the inner SMA line fixing apparatus is integrally disposed on the carrier outer wall of the lens carrier and is integrally disposed on the carrier inner side surface of the supporting carrier.

According to one embodiment of the present disclosure, the bearing apparatus comprises at least two bearing units, wherein the bearing units are symmetrically disposed on outer sides of the supporting carrier, and the bearing units of the bearing apparatus form the accommodating space, and wherein the outer driving unit is supported by the bearing unit, and the outer driving unit drives the lens carrier to move in a manner of thermal shrinkage.

According to one embodiment of the present disclosure, the number of the bearing units of the bearing apparatus is four, and wherein the bearing units are connected in sequence to form an integral ring-shaped supporting frame.

According to one embodiment of the present disclosure, when the SMA driver is in an initial state, the supporting carrier of the inner driving apparatus is supported by the bearing apparatus on a lower end of the accommodating space, and the outer driving unit draws the supporting carrier to move upward based on the bearing unit.

According to one embodiment of the present disclosure, when the SMA driver is in an initial state, the supporting carrier of the inner driving apparatus is supported by the bearing apparatus on an upper end of the accommodating space, and the outer driving unit draws the supporting carrier to move downward based on the bearing unit.

According to one embodiment of the present disclosure, the supporting carrier is further provided with four carrier outer side surfaces, and the bearing unit of the bearing apparatus is further provided with a bearing surface, wherein the outer driving unit is disposed to connect a lower end of the carrier outer side surface to an upper end part of the bearing surface, and the outer driving unit draws the lens carrier to move upward in a manner of thermal shrinkage based on the bearing unit.

According to one embodiment of the present disclosure, the supporting carrier is further provided with four carrier outer side surfaces, and the bearing unit of the bearing apparatus is further provided with a bearing surface, wherein the outer driving unit is disposed to connect an upper end of the carrier outer side surface to a lower end part of the bearing surface, and the outer driving unit draws the lens carrier to move downward in a manner of thermal shrinkage based on the bearing unit.

According to one embodiment of the present disclosure, the outer driving unit comprises at least one outer drive SMA line, wherein the outer drive SMA line connects the carrier outer side surface of the supporting carrier to the bearing surface of the bearing unit, and wherein the outer drive SMA line thermally shrinks in an electric heating manner and drives the supporting carrier to move.

According to one embodiment of the present disclosure, the number of the outer drive SMA lines of the outer driving unit is two, wherein the outer drive SMA line of the outer driving unit connects the supporting carrier to the bearing unit in a different plane, wherein the outer drive SMA lines of the outer driving unit are in mutually different planes, and when the outer drive SMA lines shrink by the same amount of thermal shrinkage, component forces generated by the outer drive SMA lines in a horizontal direction cancel each other out, so that the outer driving unit provides the supporting carrier with a force along the direction of the optical axis and keeps the supporting carrier and the lens carrier moving smoothly.

According to one embodiment of the present disclosure, the outer SMA driving apparatus further comprises a plurality of outer SMA line fixing apparatuses, wherein the outer SMA line fixing apparatus fixes one end of the outer drive SMA line to the carrier outer side surface of the supporting carrier and fixes the other end of the outer drive SMA line to the bearing surface of the bearing unit.

According to one embodiment of the present disclosure, the SMA driver further comprises a suspension system, wherein the suspension system is disposed to be reversely supported on the inner SMA driving apparatus and the outer SMA driving apparatus, and the suspension system, the inner SMA driving apparatus, and the outer SMA driving apparatus work together to keep the lens balanced.

According to one embodiment of the present disclosure, the suspension system comprises an inner suspension apparatus and an outer suspension apparatus, wherein the inner suspension apparatus is disposed on the inner SMA driving apparatus and provides the lens carrier with a force opposite to the inner driving unit, and wherein the outer suspension apparatus is disposed on the outer SMA driving apparatus, and provides the supporting carrier with a force opposite to the outer driving unit to maintain the lens carrier balanced and drive the lens carrier to return to an initial position.

According to one embodiment of the present disclosure, the inner suspension apparatus further comprises at least two inner suspension units, wherein the lens carrier is connected to the supporting carrier by the inner suspension units, the inner suspension units are supported by the supporting carrier, and the inner suspension units provide a force opposite to the inner driving unit to balance a received force of the lens carrier and drive the lens carrier to move to an initial position.

According to one embodiment of the present disclosure, the inner suspension units are symmetrically disposed on side surfaces of the lens carrier, wherein the inner suspension unit is connected to an upper end of the carrier outer wall of the lens carrier in a plane different from the inner driving unit and a lower end part of the carrier inner side surface of the supporting carrier, and the inner suspension unit is supported by the supporting carrier and draws the lens carrier to move.

According to one embodiment of the present disclosure, the outer suspension apparatus further comprises at least two outer suspension units, wherein the outer suspension unit is connected to the supporting carrier and the bearing apparatus, and the outer suspension unit is supported by the bearing apparatus and provides a force opposite to the outer driving unit to balance a received force of the supporting carrier and drive the supporting carrier to move to an initial position.

According to one embodiment of the present disclosure, the outer suspension units are symmetrically disposed on side surfaces of the supporting carrier, wherein the outer suspension unit is connected to an upper end of the carrier outer side surface of the supporting carrier and a lower end part of the bearing surface of the bearing apparatus in a plane different from the outer driving unit, and the outer suspension unit is supported by the bearing apparatus and draws the lens carrier to move.

According to one embodiment of the present disclosure, the inner suspension unit further comprises at least one inner suspension wire, wherein the inner suspension wire connects the lens carrier to the supporting carrier, and wherein when the inner driving unit drives the lens carrier to move, the lens carrier draws the inner suspension wire to produce elastic deformation, and when the inner driving unit cools and relaxes, the inner suspension wire drives the lens carrier to an initial position under elastic action.

According to one embodiment of the present disclosure, the number of the inner suspension wires of the inner suspension unit is two, wherein the inner suspension wires are in mutually different planes, and wherein the inner suspension wires are in the planes different from the inner driving unit, so that component forces of the inner suspension unit and the inner driving unit in a vertical direction cancel each other out.

According to one embodiment of the present disclosure, the outer suspension unit further comprises at least one outer suspension wire, wherein the outer suspension wire connects the supporting carrier to the bearing apparatus, and wherein when the outer driving unit drives the lens carrier to move, the supporting carrier draws the outer suspension wire to produce elastic deformation, and when the outer driving unit cools and relaxes, the outer suspension wire drives the supporting carrier to an initial position under elastic action.

According to one embodiment of the present disclosure, the number of the outer suspension wires of the outer suspension unit is two, wherein the outer suspension wires are in mutually different planes, and wherein the outer suspension wires are in the planes different from the outer driving unit, so that component forces of the outer suspension unit and the outer driving unit in a vertical direction cancel each other out.

According to one embodiment of the present disclosure, the inner suspension wire and the outer suspension wire are elastic metal wires.

According to one embodiment of the present disclosure, the inner SMA driving apparatus further comprises a plurality of inner suspension wire fixing apparatuses, wherein the inner suspension wire fixing apparatus fixes one end of the inner suspension wire to the carrier outer wall of the lens carrier and fixes the other end of the inner suspension wire to the carrier inner side surface of the supporting carrier.

According to one embodiment of the present disclosure, the outer SMA driving apparatus further comprises a plurality of outer suspension wire fixing apparatuses, wherein the outer suspension wire fixing apparatus fixes one end of the outer suspension wire to the carrier outer side surface of the supporting carrier and fixes the other end of the outer suspension wire to the bearing surface of the bearing apparatus.

According to one embodiment of the present disclosure, the SMA driver further comprises a supporting base, wherein the bearing apparatus of the outer SMA driving apparatus is disposed on the supporting base, and the outer SMA driver is supported by means of the supporting base.

According to one embodiment of the present disclosure, the inner suspension apparatus further comprises an inner suspension upper elastic piece and an inner suspension lower elastic piece, wherein the inner suspension upper elastic piece is disposed above the lens carrier and provides the lens carrier with a downward supporting force, and wherein the inner suspension lower elastic piece is disposed below the supporting carrier, and provides the supporting carrier with an upward supporting force.

According to one embodiment of the present disclosure, the outer suspension apparatus further comprises an outer suspension upper elastic piece and an outer suspension lower elastic piece, wherein the outer suspension upper elastic piece is disposed above the supporting carrier and provides the supporting carrier with a downward supporting force, and wherein the outer suspension lower elastic piece is fixed below the bearing apparatus.

According to one embodiment of the present disclosure, the inner suspension apparatus further comprises at least two inner suspension units, wherein the inner suspension units are symmetrically disposed on both sides of the lens carrier, wherein the inner suspension unit is telescopically connected to the inner suspension upper elastic piece and the inner suspension lower elastic piece, and when the inner driving unit drives the lens carrier to move, the lens carrier draws the inner suspension unit to stretch and produce elastic deformation, and wherein when the inner driving unit cools and relaxes, the inner suspension unit draws the lens carrier to return to an initial position under elastic action.

According to one embodiment of the present disclosure, the outer suspension apparatus further comprises at least two outer suspension units, wherein the outer suspension units are symmetrically disposed on both sides of the supporting carrier, wherein the outer suspension unit is telescopically connected to the outer suspension upper elastic piece and the outer suspension lower elastic piece, and when the outer driving unit drives the supporting carrier to move, the supporting carrier draws the outer suspension unit to stretch and produce elastic deformation, and wherein when the outer driving unit cools and relaxes, the outer suspension unit draws the supporting carrier to return to an initial position under elastic action.

According to another aspect of the present disclosure, the present disclosure further provides a camera apparatus, comprising:
  at least one circuit board;
  a photosensitive chip, wherein the photosensitive chip is attached to the circuit board;
  at least one lens, wherein the lens is located above the photosensitive chip, and the lens focuses light on the photosensitive chip;
  a lens holder, wherein the lens holder comprises a lens holder main body and at least one color filter disposed on the lens holder main body, and wherein the color filter is supported between the lens and the photosensitive chip by the lens holder main body; and
  an SMA driver, wherein the lens is disposed on the SMA driver, and the SMA driver drives the lens to move above the lens holder, and wherein the SMA driver comprises:
    an inner SMA driving apparatus, wherein the lens is disposed on the inner SMA driving apparatus, and the inner SMA driving apparatus drives the lens to move;
    an outer SMA driving apparatus, wherein the outer SMA driving apparatus is located on an outer side of the inner SMA driving apparatus, and the inner SMA driving apparatus is drivably supported by the outer SMA driving apparatus, and the outer SMA driving apparatus drives the inner SMA driving apparatus to move, so that the inner SMA driving apparatus drives movement of the lens.

According to another aspect of the present disclosure, the present disclosure further provides a driving method for an SMA driving apparatus, wherein the driving method comprises the following steps:
  (a) being supported on an outer SMA driving apparatus, and driving a lens carrier to move by means of at least one inner driving unit of an inner SMA driving apparatus; and
  (b) driving a supporting carrier of the inner SMA driving apparatus to move, and driving the lens carrier to move by means of the supporting carrier.

According to one embodiment of the present disclosure, step (a) and step (b) of the driving method may be performed at the same time without any time difference before and after.

According to one embodiment of the present disclosure, in step (a), at least one inner SMA line of the inner driving unit thermally shrinks, and the lens carrier is drawn by means of the supporting carrier through the inner drive SMA line to move.

According to one embodiment of the present disclosure, in step (a), the inner driving unit draws the lens carrier to move along a direction of the optical axis; or draws the lens carrier to move in a horizontal direction in a manner of translation; or draws the lens carrier to move in a manner of rotation.

According to one embodiment of the present disclosure, step (a) of the above driving method further comprises: being driven by the inner SMA driving apparatus to cause an inner suspension apparatus of a suspension system to produce elastic deformation, and drawing the lens carrier to return to an initial position under elastic action by means of the inner suspension apparatus.

According to one embodiment of the present disclosure, step (b) of the above driving method further comprises: being driven by the outer SMA driving apparatus to cause an outer suspension apparatus of the suspension system to produce elastic deformation, and drawing the supporting carrier to return to an initial position under elastic action by means of the outer suspension apparatus.

According to another aspect of the present disclosure, the present disclosure further provides a camera apparatus, comprising a movable member, a supporting member, a lens provided on the movable member, a cantilever elastically connecting the movable member and the supporting member, a plurality of driving units for driving the lens to move, and a plurality of power lines electrically connected to each of the driving units, wherein the cantilever has at least two mounting surfaces, and each of the power lines is arranged along at least two of the mounting surfaces of the cantilever.

According to one embodiment of the present disclosure, the respective mounting surfaces are sequentially disposed along a height direction of the lens.

According to one embodiment of the present disclosure, the cantilever has a U-shaped section, the cantilever has a first mounting surface, a second mounting surface, a third mounting surface and a fourth mounting surface, the first mounting surface and the second mounting surface face outwards, the third mounting surface and the fourth mounting surface are opposite, and at least a part of the power lines are arranged between the third mounting surface and the fourth mounting surface.

According to one embodiment of the present disclosure, outer ends of the third mounting surface and the fourth mounting surface are close to each other.

According to one embodiment of the present disclosure, a part of the power lines are arranged on the first mounting surface and/or the second mounting surface, and another part of the power lines are arranged between the third mounting surface and the fourth mounting surface.

According to one embodiment of the present disclosure, a plurality of the driving units comprise four shape memory alloy driving lines, the movable member has two connection ends at diagonal positions, one end of the driving line is connected to the connection end, and the other end is connected to the supporting member, so that movement of the movable member in a plane perpendicular to an optical axis of the camera apparatus is realized by controlling expansion and contraction of the respective driving lines, the movable member and the supporting member are elastically connected by two cantilevers to allow the movable member to move relative to the supporting member under action of the respective driving lines, the cantilever has a first end connected to the movable member and a second end connected to the supporting member, a plurality of the power lines extend along the cantilever from the second end to the first end, and then extend to the movable member, and at least a part of the power lines extending to the movable member are electrically connected to corresponding driving lines at the connection end.

According to one embodiment of the present disclosure, a plurality of the driving units further comprise a motor disposed on the movable member, the motor is used for driving the lens to move along a direction of the optical axis of the camera apparatus relative to the movable member, and at least one of the power lines extending to the movable member extends to the motor and is electrically connected to the motor.

According to another aspect of the present disclosure, the present disclosure further provides a power line arrangement method for arranging power lines on a cantilever of a camera apparatus, wherein the camera apparatus comprises a movable member, a supporting member, a lens provided on the movable member, a cantilever elastically connecting the movable member and the supporting member, a plurality of driving units for driving the lens to move, and a plurality of power lines electrically connected to each of the driving units, wherein the cantilever has at least two mounting surfaces, and each of the power lines is arranged along at least two of the mounting surfaces of the cantilever, and wherein the power line arrangement method comprises the following steps:

S811: providing a metal sheet with a V-shaped section, the metal sheet being used to form the cantilever;

S812: disposing at least one power line on an inner side of the metal sheet;

S813: squeezing both sides of the metal sheet inwardly so that the inner side of the metal sheet is attached to the power line and the metal sheet is shaped into the cantilever.

According to one embodiment of the present disclosure, after the step S813, the power line arrangement method further comprises step S814: arranging a power line on at least one outer side of the cantilever.

According to another aspect of the present disclosure, the present disclosure further provides a power line arrangement method for arranging power lines on a cantilever of a camera apparatus, wherein the camera apparatus comprises a movable member, a supporting member, a lens provided on the movable member, a cantilever elastically connecting the movable member and the supporting member, a plurality of driving units for driving the lens to move, and a plurality of power lines electrically connected to each of the driving units, wherein the cantilever has at least two mounting surfaces, and each of the power lines is arranged along at least two of the mounting surfaces of the cantilever, and wherein the power line arrangement method comprises the following steps:

S821: providing a metal sheet for forming the cantilever;

S822: using at least one power line as a stamping guide member to stamp the metal sheet, so that an inner side of the metal sheet is attached to the power line and the metal sheet is shaped into the cantilever.

According to one embodiment of the present disclosure, after the step S822, the power line arrangement method further comprises step S823: arranging a power line on at least one outer side of the cantilever.

Further objectives and advantages of the present disclosure will be fully embodied through the understanding of the following description and the drawings.

These and other objectives, features and advantages of the present disclosure are fully embodied by the following detailed description, drawings and claims.

DETAILED DESCRIPTION

Figure 1A:
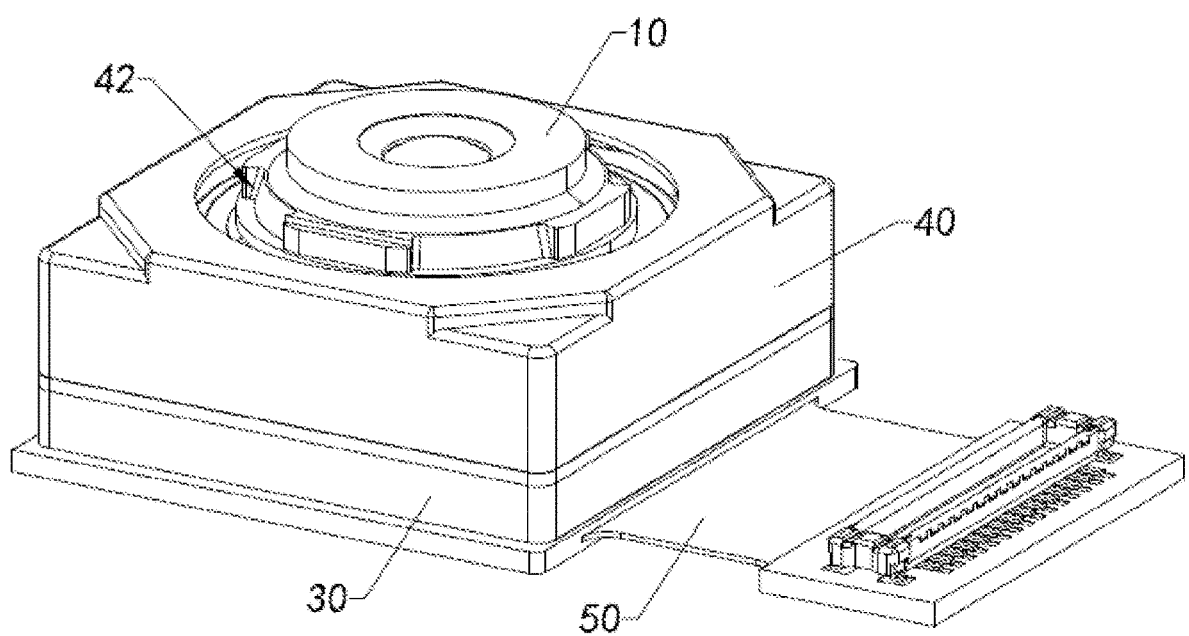
FIG. 1A is an overall schematic view of a camera apparatus according to a first preferred embodiment of the present disclosure.

The following description is presented to disclose the present application to enable those skilled in the art to practice the present application. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present disclosure.

It should be understood by those skilled in the art that in the disclosure of the present application, the orientation or positional relationship indicated by the terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned apparatus or element must have a particular orientation and be constructed and operated in the particular orientation. Therefore, the above terms cannot be understood as a limitation of the present disclosure.

It may be understood that the term "a" or "an" should be understood to mean "at least one" or "one or more", that is, in one embodiment, the number of an element may be one, and in other embodiments, the number of the element may be multiple. The term "a" or "an" cannot be understood as a limitation on the number.

Referring to FIGS. 1A to 6 of the drawings of the specification of the present disclosure, a camera apparatus according to a first preferred embodiment of the present disclosure is explained in the following description. The camera apparatus includes at least one lens 10, an SMA driving device 20, a lens holder 30, and a housing 40, wherein the lens 10 and the SMA driving device 20 are disposed in the housing 40. The lens 10 is intermediately placed in the housing 40 by the SMA driving device, wherein the SMA driving device 20 drives the lens 10 to move up and down to focus the optical imaging of the lens 10 at different positions. The lens holder 30 is disposed below the housing 40, wherein the SMA driving device 20 is disposed on the lens holder 30, and the SMA driving device 20 is supported by the lens holder 30, so that the SMA driving device 20 provides the lens 10 with upward and downward driving forces.

The camera apparatus further includes a circuit board 50, and at least one photosensitive element 60 disposed on the circuit board 50, wherein the SMA driving device 20 drives the lens 10 to move up and down, so that the optical imaging of the lens 10 is focused on the photosensitive element 60 for the photosensitive element 60 to receive the light focused by the lens 10. Correspondingly, the camera apparatus is provided with an optical axis O, wherein the lens 10 and the photosensitive element 60 of the camera apparatus are disposed along an optical axis direction, so that the lens 10 focuses an image on the photosensitive element 60.

Figure 1B:
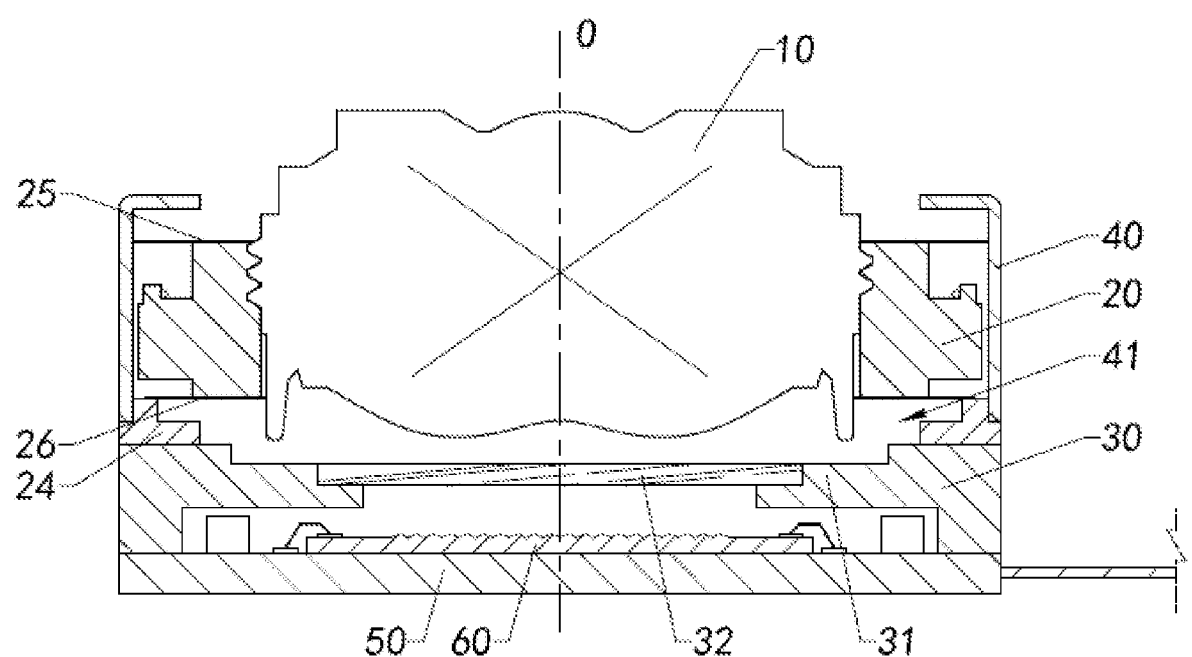
FIG. 1B is a cross-sectional view of the camera apparatus according to the above preferred embodiment of the present disclosure.
Figure 2:
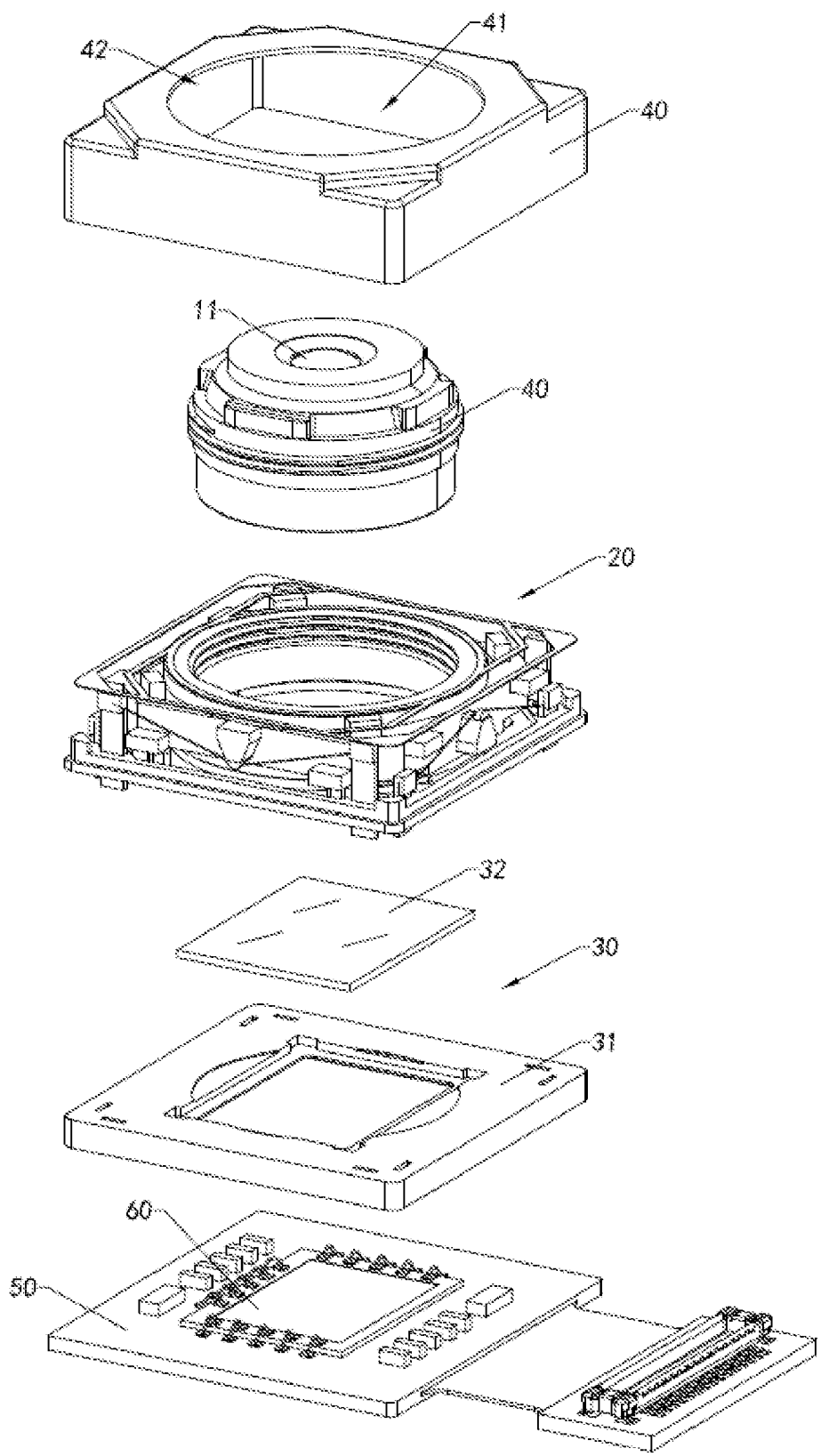
FIG. 2 is an exploded schematic view of the camera apparatus according to the above preferred embodiment of the present disclosure.

As shown in FIGS. 1B and 2, the lens 10 is drivably disposed on the SMA driving device 20, wherein in an initial state, the SMA driving device 20 holds the lens 10 at an intermediate position (neutral position), and wherein the lens 10 is kept at a certain height from the photosensitive element 60 along the direction of the optical axis O. When the imaging position of the lens 10 needs to be adjusted, the SMA driving device 20 drives the lens 10 to move up and down along the direction of the optical axis O, so as to adjust the height of the lens 10 from the photosensitive element 60. Correspondingly, the lens 10 further includes at least one lens sheet 11, wherein the lens sheet 11 and the photosensitive element 60 are disposed along the optical axis O, so that an optical system composed of the lens sheet 11 focuses an image to the photosensitive element 60.

The lens holder 30 further includes a lens holder main body 31 and at least one color filter 32 disposed on the lens holder main body 31, wherein the color filter 32 is disposed between the lens 10 and the photosensitive element 60 along the direction of the optical axis O.

The housing 40 is disposed outside the lens 10 and the SMA driving device 20, wherein the housing 40 is provided with an accommodating space 41 and a light entrance hole 42, and wherein the light entrance hole 42 is formed in an upper part of the housing 40 and communicates with the accommodating space 41, and light enters the lens 10 through the light entrance hole 42 for the lens 10 to receive light incident from the outside. The lens 10 is held by the SMA driving device 20 in the accommodating space 41, and is driven by the SMA driving device 20 to move up and down in the accommodating space 41. In the initial state, the lens 10 is held by the SMA driving device 20 at one position in the middle of the accommodating space 41, and the SMA driving device 20 drives the lens 10 to move up and down along the direction of the optical axis O in the accommodating space 41, to adjust the height distance between the lens 10 and the photosensitive element 60.

The SMA driving device 20 is disposed on the lens holder 30, and the SMA driving device 20 is supported by the lens holder 30, so that the SMA driving device 20 stretches the SMA driving device 20 upwardly and draws the lens 10 downwardly based on the lens holder 30.

Figure 3:
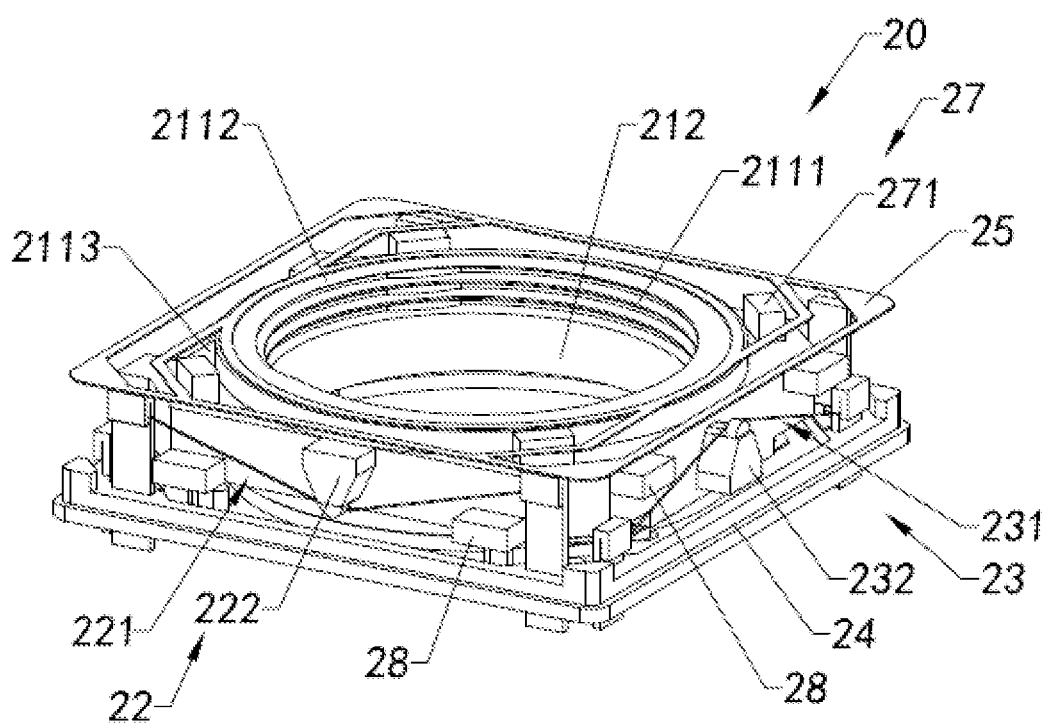
FIG. 3 is an overall schematic view of an SMA driving device of the camera apparatus according to the above preferred embodiment of the present disclosure.
Figure 4:
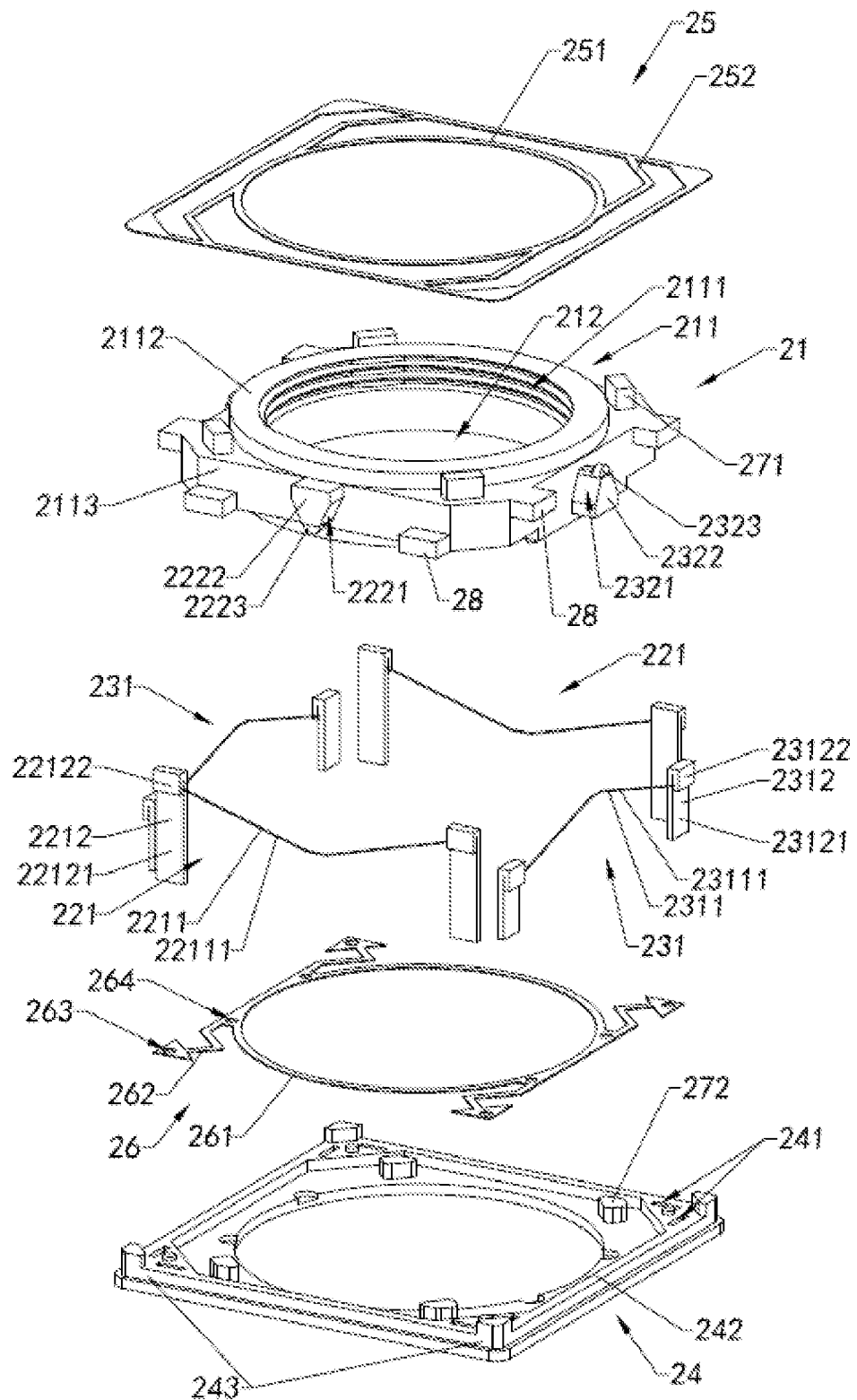
FIG. 4 is an exploded schematic view of the SMA driving device of the camera apparatus according to the above preferred embodiment of the present disclosure.

As shown in FIGS. 3 and 4, the SMA driving device 20 includes a lens carrier 21, at least one upgoing driver 22, and at least one downgoing driver 23, wherein the upgoing driver 22 and the downgoing driver 23 are disposed to be drivingly connected to the lens carrier 21, and wherein the upgoing driver 22 drives the lens carrier 21 to move upward, and the downgoing driver 23 drives the lens 21 to move downward. Correspondingly, the lens 10 is disposed on the lens carrier 21, wherein the lens 10 is driven to move synchronously with the lens carrier 21.

The lens carrier 21 includes a carrier main body 211 and is further provided with a carrier cavity 212, wherein the lens 10 is held in the carrier cavity 212 by the carrier main body 211. The carrier main body 211 is further provided with a carrier inner wall 2111, wherein the inner wall 2111 of the carrier main body 211 has a threaded structure connected to the lens 10. Preferably, in the first preferred embodiment of the present disclosure, the lens 10 is disposed to be mounted on the inner wall 2111 of the carrier main body 211. It is worth mentioning that the connection and mounting manner of the lens 10 and the lens carrier 21 is merely exemplary in nature here, and not limiting. Therefore, the lens carrier 21 may also be mounted with the lens in other ways without threads, such as a glued connection.

Correspondingly, the shape of the carrier inner wall 2111 of the carrier main body 211 is adapted to the outer peripheral shape of the lens 10. The carrier main body 211 of the lens carrier 21 further includes a carrier ring 2112 and a carrier bracket 2113, wherein the carrier bracket 2113 is integrally disposed on the outer periphery of the carrier ring 2112, and wherein the upgoing driver 22 and the downgoing driver 23 provide the carrier ring 2112 with upward and downward forces through the carrier bracket 2113, to drive the lens 10 to move upward or downward. It is worth mentioning that the inner wall of the carrier ring 2112 of the carrier main body 211 forms the carrier space 212 in which the lens 10 is loaded.

It is worth mentioning that the upgoing driver 22 drives the lens carrier 21 to move upward, wherein the lens carrier 21 is driven by the upgoing driver 22 and pulls up the lens 10 to move upward. Correspondingly, the downgoing driver 23 reversely drives the lens carrier 21 to move downward, wherein the lens carrier 21 is driven by the downgoing driver 23 and draws the lens 10 to move downward.

The SMA driving device 20 further includes a supporting base 24, wherein the upgoing driver 22 and the downgoing driver 23 are disposed on the supporting base 24, and the upgoing driver 22 and the downgoing driver 23 are fixed to the lens holder 30 by means of the supporting base 24. It can be understood that, under the supporting action of the supporting base 24, the upgoing driver 22 and the downgoing driver 23 provide upward and downward forces for the carrier main body 211, thereby driving the lens 10 to move upward or downward.

As shown in FIGS. 3 and 4, the upgoing driver 22 further includes at least one upgoing driving unit 221 and at least one upper bending member 222, wherein the upper bending member 222 is disposed on the lens carrier 21. The upgoing driving unit 221 is disposed to be drivingly connected to the upper bending member 222, and the upgoing driving unit 221 provides the upper bending member 222 with an upward force to drive the lens carrier 21 to move upward by means of the upper bending member 222. The downgoing driver 23 further includes at least one downgoing driving unit 231 and at least one lower bending member 232, wherein the lower bending member 232 is disposed on the lens carrier 21. The downgoing driving unit 231 is disposed to be drivingly connected to the lower bending member 232, and the downlink driving unit 231 provides the lower bending member 232 with a downward traction force to drive the lens carrier 21 to move downward by means of the lower bending member 232.

Preferably, in the first preferred embodiment of the present disclosure, the number of the upgoing driving units 221 and the number of the upper bending members 222 of the upgoing driver 22 are two. More preferably, the upgoing driving units 221 and the upper bending members 222 of the upgoing driver 22 are symmetrically disposed on sides of the lens carrier 21. As an example, the upgoing driving units 221 are adjacently disposed on the left and right sides of the lens carrier 21. Correspondingly, the number of the downgoing driving units 232 and the number of the lower bending members 232 of the downgoing driver 23 are two. More preferably, the downgoing driving units 231 and the lower bending members 232 of the downgoing driver 23 are symmetrically disposed on the sides of the lens carrier 21. As an example, the downgoing driving units 231 are adjacently disposed on the front side and the rear side of the lens carrier 21. It is worth mentioning that, in the first preferred embodiment of the present disclosure, the positions where the upgoing driver 22 and the downgoing driver 23 are mounted are merely exemplary in nature here, and not limiting.

Preferably, in the first preferred embodiment of the present disclosure, the upper bending member 222 of the upgoing driver 22 and the lower bending member 232 of the downgoing driver 23 are integrally disposed on the lens carrier 21. The upper bending member 222 and the lower bending member 232 extend outwardly to the carrier bracket 2113 of the lens carrier 21. Optionally, the upper bending member 222 and the lower bending member 232 may also be embodied as bolts mounted on the outer side of the carrier bracket 2113, wherein the upgoing driving unit 221 and the downgoing driving unit 231 provide the lens carrier 21 with upward and downward driving forces through the upper bending member 222 and the lower bending member 232. Therefore, in the first preferred embodiment of the present disclosure, the manner in which the upper bending member 222 and the lower bending member 232 are implemented is merely exemplary in nature here, and not limiting.

In detail, the upgoing driver 22 in each of the upgoing driving units 221 further includes at least one upper drive SMA line 2211 and two upper drive fixing apparatuses 2212, wherein both ends of the upper drive SMA line 2211 are disposed on the upper drive fixing apparatuses 2212, and the upper drive SMA line 2211 is fixed to the supporting base 24 by means of the upper drive fixing apparatuses 2212. The upper SMA line 2211 of the upgoing driver 22 is disposed below the upper bending member 222, wherein the upper SMA line 2211 of the upgoing driver 22 shrinks in a thermally driven manner to pull up the upper bending member 222 to move upward.

It is worth mentioning that in the present disclosure, the SMA line realizes the thermal driving by means of heating by itself or by a heat source. That is to say, the SMA line can be heated by itself or by other heat sources, so as to shrink the length of the SMA line, thereby driving the movement of the movable member. Preferably, in the first preferred embodiment of the present disclosure, the thermally driven manner of the SMA line is a manner of self-electric heating to realize thermal driving, and the magnitude of the driving force of the SMA line is controlled by controlling the magnitude of the current of the SMA line. In short, when the current of the SMA line is increased, the temperature at which the SMA line is electrically heated increases, and the SMA line thermally shrinks, so that the driving force of the SMA line increases; and when the current of the SMA line is decreased, the temperature at which the SMA line is electrically heated decreases or the temperature of the SMA line at ambient temperature drops, and the SMA line is relaxed, so that the driving force of the SMA line decreases.

The upper drive SMA line 2211 of the upgoing driver 22 passes below the upper bending member 222, wherein the upper drive SMA line 2211 is thermally driven to shrink and draws the upper bending member 222 upwardly to move upward. The upper bending member 222 forms at least one upper chamfered plane 2221 that guides the upper drive SMA line 2211 upwardly to deform, wherein the upper drive SMA line 2211 is guided by the upper bending member 222, and is bent upwardly from the upper chamfered plane 2221 to deform. In other words, the upper drive SMA line 2211 passes from the upper chamfered plane 2221 of the upper bending member 222, and is guided by the upper chamfered plane 2221 to bend and deform upwardly.

Correspondingly, the upper bending member 222 further includes an upper chamfered end 2222, wherein the upper chamfered end 2222 forms the upper chamfered plane 2221. The upper bending member 222 further includes an upper limit end 2223, wherein the upper limit end 2223 is disposed on the outer side of the upper chamfered end 2222, and wherein the upper limit end 2223 limits the movement of the upper drive SMA line 2211 to prevent the upper drive SMA line 2211 from detaching from the upper chamfered plane 2221. It can be understood that the upper limit end 2223 protrudes from the upper chamfered end 2222.

It is worth mentioning that the upper chamfered plane 2221 formed by the upper chamfered end 2222 is a plane inclined downwardly, wherein the upper drive SMA line 2211 passes below the upper chamfered plane 2221 of the upper bending member 222.

The upper drive fixing apparatus 2212 of the upgoing driver 22 further includes an upper drive fixed end 22121 and an upper drive traction end 22122 integrally extending upwardly from the upper drive fixed end 22121, wherein the upper drive fixed end 22121 of the upper drive fixing apparatus 2212 is disposed on the supporting base 24. An end part of the upper drive SMA line 2211 is fixed to the upper drive traction end 22122 of the upper drive fixing apparatus 2212, wherein when the upper drive SMA line 2211 is thermally driven to shrink, the upper drive traction end 22122 draws the upper drive SMA line 2211 to shrink, so as to pull the upper bending member 222 upwardly, and then drive the lens carrier 21 to move upward. It can be understood that the height of the upper drive traction end 22122 is higher than the height of a plane where the upper chamfered plane 2221 of the upper bending member 222 is located.

The upper drive SMA line 2211 is disposed on the upper drive traction end 22122, wherein when the upper drive SMA line 2211 thermally shrinks, the upper drive traction end 22122 draws the end part of the upper drive SMA line 2211, so that the upper drive SMA line 2211 draws the upper bending member 222 in a shrinkage manner. Preferably, in the first preferred embodiment of the present disclosure, the upper drive SMA line 2211 is fixed to the upper drive traction end 22122 in a crimping manner, wherein the upper drive traction end 22122 is fixed to two end parts of the upper drive SMA line 2211.

Preferably, in the first preferred embodiment of the present disclosure, the upper bending member 222 is disposed at a middle position of the two upper drive fixing apparatuses 2212. Correspondingly, the upper drive SMA line 2211 includes two upper drive SMA line segments 22111, wherein the upper drive SMA line segments 22111 have the same length. Preferably, the two upper drive SMA line segments 22111 are on the same plane, and the plane where the upper drive SMA line segment 22111 is located is parallel to the optical axis O of the camera apparatus. When the upper drive fixing apparatus 2212 is thermally driven to shrink, the upper drive SMA line segment 22111 shrinks and is in a stretched state, wherein the upper drive SMA line segment 22111 not only generates a tensile force in a direction along the optical axis O, but also has a component force in a direction perpendicular to the optical axis O. Therefore, in order to realize the mutual cancellation of the component forces in the direction perpendicular to the optical axis, the upper drive SMA line segments 22111 at both ends of the upper bending member 222 when assembling have the same length, the same angle to the horizontal direction, and the same degree of tension. In other words, the upper drive SMA line segments 22111 of the upper drive SMA line 2211 are symmetrically disposed based on the upper bending member 222.

In other words, when the lens 10 is in a stationary state or is driven by the upper drive SMA line 2211 to move upward to any position, the upper drive SMA line 2211 only provides an upward force along the optical axis O during driving the upper bending member 222, and does not provide a component force in any direction perpendicular to the optical axis O. Correspondingly, there is also no torque about a direction perpendicular to the optical axis O or along the optical axis O. Therefore, the angular offset of the carrier about the optical axis can be reduced.

Correspondingly, each of the downgoing driving units 231 of the downgoing driver 23 further includes at least one lower drive SMA line 2311 and two lower drive fixing apparatuses 2312, wherein both ends of the lower drive SMA line 2311 are disposed on the lower drive fixing apparatuses 2312, and the lower drive SMA line 2311 is fixed to the supporting base 24 by means of the lower drive fixing apparatuses 2312. The lower SMA line 2311 of the downgoing driver 23 is disposed below the lower bending member 232, wherein the lower SMA line 2311 of the downgoing driver 23 shrinks in a thermally driven manner and draws the lower bending member 232 to move downward.

It is worth mentioning that in the present disclosure, the SMA line realizes the thermal drive by means of heating by itself or by a heat source. That is to say, the SMA line can be heated by itself or by other heat sources, so as to shrink the length of the SMA line, thereby driving the movement of the movable member. Preferably, in the first preferred embodiment of the present disclosure, the thermal driving manner of the SMA line is a manner of self-electric heating to realize thermal driving, and the magnitude of the driving force of the SMA line is controlled by controlling the magnitude of the current of the SMA line. In short, when the current of the SMA line is increased, the temperature at which the SMA line is electrically heated increases, and the SMA line thermally shrinks, so that the driving force of the SMA line increases; and when the current of the SMA line is decreased, the temperature at which the SMA line is electrically heated decreases or the temperature of the SMA line at ambient temperature drops, and the SMA line is relaxed, so that the driving force of the SMA line decreases.

The lower drive SMA line 2311 of the downgoing driver 23 passes below the lower bending member 232, wherein the lower drive SMA line 2311 is thermally driven to shrink and draws the lower bending member 232 downwardly to move downward. The lower bending member 232 forms at least one lower chamfered plane 2321 that guides the lower drive SMA line 2311 downwardly to deform, wherein the lower drive SMA line 2311 is guided by the lower bending member 232, and is bent downwardly from the lower chamfered plane 2321 to deform. In other words, the lower drive SMA line 2311 passes from the lower chamfered plane 2321 of the lower bending member 232, and is guided by the lower chamfered plane 2321 to bend and deform downwardly.

Correspondingly, the lower bending member 232 further includes a lower chamfered end 2322, wherein the lower chamfered end 2322 forms the lower chamfered plane 2321. The lower bending member 232 further includes a lower limit end 2323, wherein the lower limit end 2323 is disposed on the outer side of the lower chamfered end 2322, and wherein the lower limit end 2323 limits the movement of the lower drive SMA line 2311 to prevent the lower drive SMA line 2311 from detaching from the lower chamfered plane 2321. It can be understood that the lower limit end 2323 protrudes from the lower chamfered end 2322.

It is worth mentioning that the upper chamfered plane 2321 formed by the lower chamfered end 2322 is a plane inclined upwardly, wherein the lower drive SMA line 2311 passes above the lower chamfered plane 2321 of the lower bending member 232.

The lower drive fixing apparatus 2312 of the downgoing driver 23 further includes a lower drive fixed end 23121 and a lower drive traction end 23122 integrally extending upwardly from the lower drive fixed end 23121, wherein the lower drive fixed end 23121 of the lower drive fixing apparatus 2312 is disposed on the supporting base 24. An end part of the lower drive SMA line 2311 is fixed to the lower drive traction end 23122 of the lower drive fixing apparatus 2312, wherein when the lower drive SMA line 2311 is thermally driven to shrink, the lower drive traction end 23122 draws the lower drive SMA line 2311 to shrink, so as to draw the lower bending member 232 downwardly, and then drive the lens carrier 21 to move downward. It can be understood that the height of the lower drive traction end 23122 is lower than the height of a plane where the lower chamfered plane 2321 of the lower bending member 232 is located.

The lower drive SMA line 2311 is disposed on the lower drive traction end 23122, wherein when the lower drive SMA line 2311 thermally shrinks, the lower drive traction end 23122 draws the end part of the lower drive SMA line 2311, so that the lower drive SMA line 2311 draws the lower bending member 232 in a shrinkage manner. Preferably, in the first preferred embodiment of the present disclosure, the lower drive SMA line 2311 is disposed on the lower drive traction end 23122 in a crimping manner, wherein the lower drive traction end 23122 is fixed to two end parts of the lower drive SMA line 2311. In other words, the lower drive SMA line 2311 is pressed in the lower drive traction end 23122, and the lower drive SMA line 2311 is drawn by means of the lower drive traction end 23122.

Preferably, in the first preferred embodiment of the present disclosure, the lower bending member 232 is disposed at a middle position of the two lower drive fixing apparatuses 2312. Correspondingly, the lower drive SMA line 2311 includes two lower drive SMA line segments 23111, wherein the lower drive SMA line segments 23111 have the same length. Preferably, the two lower drive SMA line segments 23111 are on the same plane, and the plane where the lower drive SMA line segment 23111 is located is parallel to the optical axis O of the camera apparatus. When the lower drive fixing apparatus 2312 is thermally driven to shrink, the lower drive SMA line segment 23111 shrinks and is in a stretched state, wherein the lower drive SMA line segment 23111 not only generates a tensile force in a direction along the optical axis O, but also has a component force in a direction perpendicular to the optical axis O. Therefore, in order to realize the mutual cancellation of the component forces in the direction perpendicular to the optical axis, the lower drive SMA line segments 23111 at both ends of the lower bending member 232 when assembling have the same length, the same angle to the horizontal direction, and the same degree of tension. The lower drive SMA line segments 23111 of the lower drive SMA line 2311 are symmetrically disposed based on the lower bending member 232.

In other words, when the lens 10 is in a stationary state or is driven by the lower drive SMA line 2311 to move downward to any position, the lower drive SMA line 2311 only provides a downward force along the optical axis O during driving the lower bending member 232, and does not provide a component force in any direction perpendicular to the optical axis O. Correspondingly, there is also no torque about a direction perpendicular to the optical axis O or along the optical axis O. In short, the upgoing driver 22 and the downgoing driver 23 are symmetrically disposed on sides of the lens carrier 21, respectively. It is worth mentioning that the upgoing driving units 221 of the upgoing driver 22 and the downgoing driving units 231 of the downgoing driver 23 are disposed on four side surfaces of the lens carrier 21.

It is worth mentioning that, in the first preferred embodiment of the present disclosure, the height of the upper drive fixing apparatus 2212 is greater than a high end of the lower drive fixing apparatus 2312, wherein the upper drive fixing apparatus 2212 supports two ends of the upper drive SMA line 2211, so that the upper drive SMA line 2211 passes through the upper bending member 222 to form a "V"-shaped traction structure. Correspondingly, the lower drive fixing apparatus 2312 supports two ends of the lower drive SMA line 2311, so that the lower drive SMA line 2311 passes through the lower bending member 232 to form an inverted "V"-shaped traction structure. In short, the upgoing driver 22 and the downgoing driver 23 of the SMA driving device 20 provide the lens carrier 21 with opposite forces, and the lens 10 is driven by means of the lens carrier 21 to move upward and downward.

Figure 6:
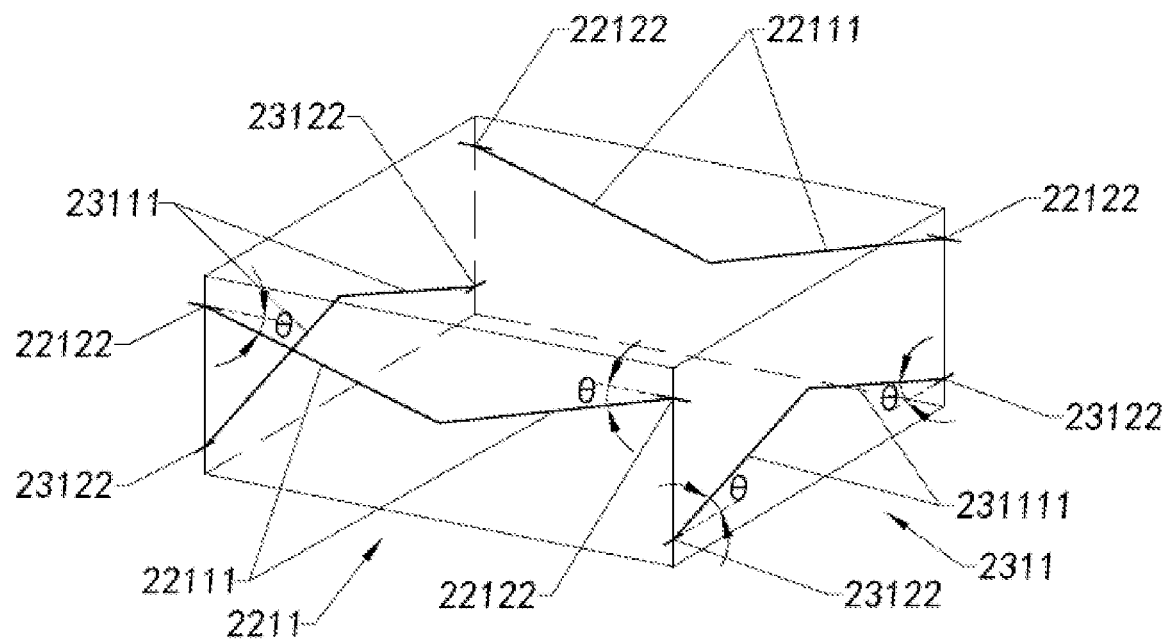
FIG. 6 is a perspective view of the SMA driving device of the camera apparatus according to the above preferred embodiment of the present disclosure.

As shown in FIG. 6, an included angle between the SMA line (the SMA line of the upgoing driver 22 and the SMA line of the downgoing driver 23) and the horizontal direction is θ. When the stroke distance the upgoing driver 22 and the downgoing driver 23 drive the lens 10 to move upward or the stroke distance the upgoing driver 22 and the downgoing driver 23 drive the lens 10 to move downward remains unchanged, the smaller the included angle θ is, the longer the length of the SMA line is, and the greater the shrinkage amount of the SMA line is. If the included angle θ is smaller, then the driving force provided by the SMA line along the optical axis O direction is smaller. Therefore, in order to reduce the driving power consumption while ensuring the driving stroke of the driver 22, preferably, the included angle θ between the SMA line and the horizontal direction is greater than 10° (including) 10°.

The upper drive fixing apparatus 2212 of the upgoing driver 22 and the lower drive fixing apparatus 2312 of the downgoing driver 23 are disposed on the supporting base 24, and the upper drive fixing apparatus 2212 is fixedly mounted by means of the supporting base 24. Correspondingly, the supporting base 24 is further provided with at least four mounting portions 241 for mounting the upper drive fixing apparatus 2212 and the lower drive fixing apparatus 2312, wherein the upper drive fixing apparatus 2212 and the lower drive fixing apparatus 2312 are embeddedly mounted to the mounting portions 241. Optionally, the upper drive fixing apparatus 2212 and the lower drive fixing apparatus 2312 are integrally disposed on the mounting portions 241. It is worth mentioning that, in the first preferred embodiment of the present disclosure, the manners of mounting and fixing the upper drive fixing apparatus 2212 and the lower drive fixing apparatus 2312 to the mounting portions 241 are merely exemplary in nature here, and not limiting.

As shown in FIGS. 3 and 4, the supporting base 24 is mounted on the lens holder 30 by the housing 40, wherein the supporting base 24 further includes a base main body 242 and at least one boss 243, wherein the boss 243 is disposed at a corner of the base main body 242, and wherein the boss 243 extends upwardly from the corner of the base main body 242 and is used for positioning and mounting between the housing 40 and the supporting base 24. It can be understood that the boss 243 protrudes upwardly from a plane where the base main body 242 is located.

As shown in FIGS. 3 and 4, the SMA driving device 20 further includes at least an upper elastic piece 25 and at least a lower elastic piece 26, and wherein the upper elastic piece 25 is disposed above the lens carrier 21, and the lower elastic piece 26 is disposed below the lens carrier 21. The upper elastic piece 25 and the lower elastic piece 26 are embodied as elastic apparatuses having an elastic supporting function, wherein the upper elastic piece 25 and the lower elastic piece 26 support the lens carrier 21. Correspondingly, the upper elastic piece 25 provides the lens carrier 21 with a downward elastic force, and the lower elastic piece 26 provides the lens carrier 21 with an upward supporting force. In a stationary and unpowered state, the upper elastic piece 25 and the lower elastic piece 26 jointly support the lens carrier 21, and the lens 10 is maintained in the intermediate position by means of the lens carrier 21. That is to say, when being stationary and not powered on, under the joint supporting action of the upper elastic piece 25 and the lower elastic piece 26, the lens 10 is kept only by the lens carrier 21 in the intermediate position.

When the lens carrier 21 is driven upwardly or downwardly by the SMA driving device 20, the upper elastic piece 25 and the lower elastic piece 26 equalize the supporting forces received by the lens carrier 21 in all directions, so that the lens carrier 21 receives the same driving force in all directions, and the stability of the lens 10 in the horizontal direction when it is driven to move is maintained by means of the lens carrier 21.

The upper elastic piece 25 includes an upper elastic piece ring 251 and at least one upper elastic piece extending portion 252 extending outwardly from the upper elastic piece ring 251, wherein the upper elastic piece ring 251 is disposed on the carrier ring 2112 of the lens carrier 21, wherein the size of the upper elastic piece ring 251 is adapted to the carrier ring 2112, and wherein the upper elastic piece 25 is a sheet-like elastic body with a hollowed-out structure, and the upper elastic piece 25 can bear a certain force, and returns to its original shape under the elastic action. Preferably, in the first preferred embodiment of the present disclosure, the upper elastic piece 25 is made by means of mechanical stamping or etching forming. It is worth mentioning that, in the present disclosure, the structure and manufacturing manner of the upper elastic piece 25 are merely exemplary in nature here, and not limiting.

Figure 5A:
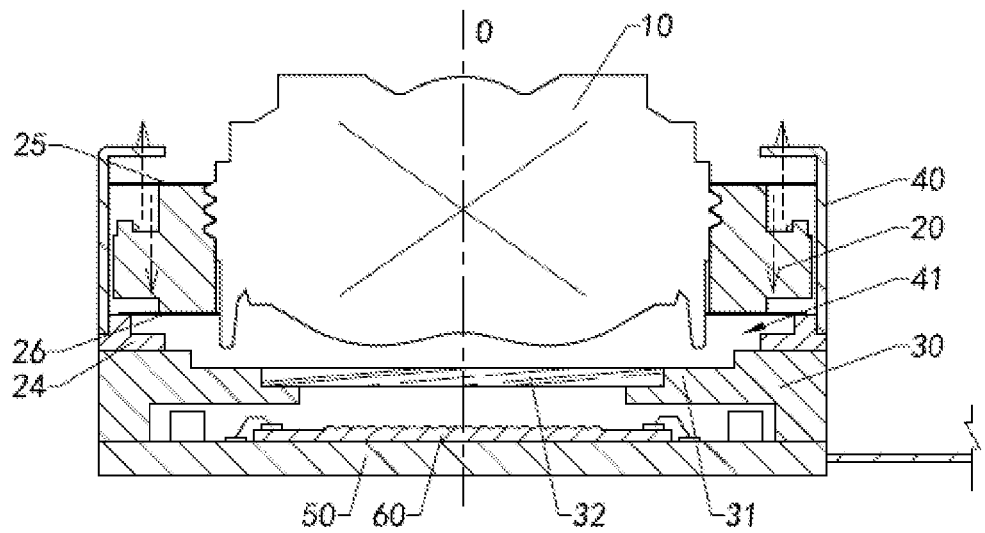
FIG. 5A is a schematic view of movement of a lens of the camera apparatus according to the above preferred embodiment of the present disclosure when it is at an intermediate position.

As shown in FIG. 5A, the upper elastic piece ring 251 of the upper elastic piece 25 may be driven by the lens carrier 21 to move upward, wherein the lens carrier 21 drives a middle connecting part of the upper elastic piece ring 251 and the upper elastic piece extending portion 252 to elastically deform. Correspondingly, the upper elastic piece extending portion 252 of the upper elastic piece 25 is elastically deformed, wherein the upper elastic piece extending portion 252 provides the lens carrier 21 with a downward elastic force. Preferably, in an initial state, the upper elastic piece 25 is in a naturally stretched state, wherein the upper elastic piece ring 251 and the upper elastic piece extending portion 252 are in the same horizontal plane.

Figure 7:
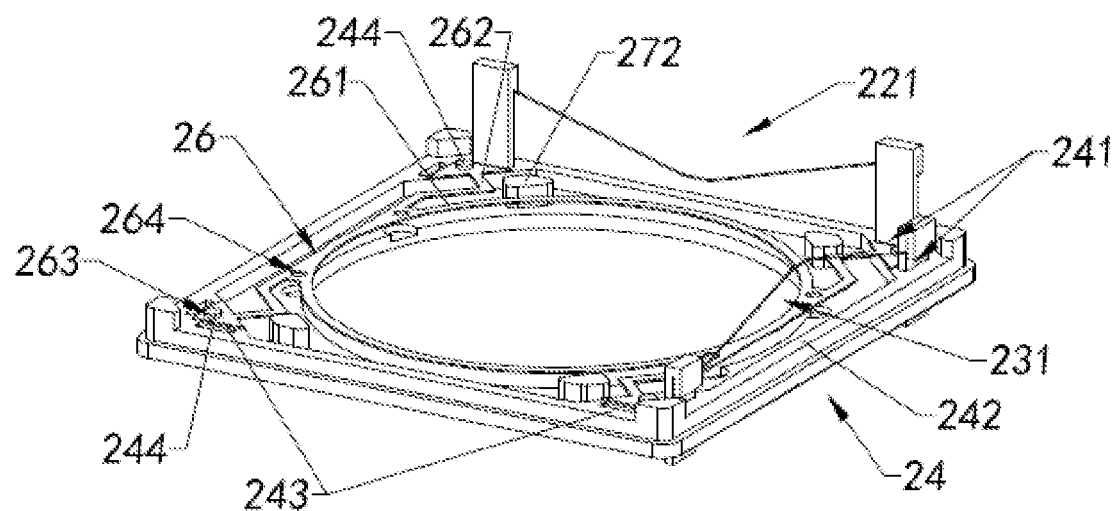
FIG. 7 is a structural schematic view of a supporting base and a lower elastic piece of the SMA driving device of the camera apparatus according to the above preferred embodiment of the present disclosure.

As shown in FIGS. 4 and 7, the lower elastic piece 26 further includes a lower elastic piece bearing ring 261 and at least one lower elastic piece supporting end 262 extending outwardly from the lower elastic piece bearing ring 261, wherein the lower elastic piece 26 is disposed on the supporting base 24. The lower elastic piece bearing ring 261 is disposed below the carrier ring 2112 of the lens carrier 21, wherein the size of the lower elastic piece bearing ring 261 is adapted to the carrier ring 2112, and the lens carrier 21 is provided with an upward supporting force by means of the lower elastic piece bearing ring 261. In the initial state, the lower elastic piece 26 supports the lens carrier 21 upwardly under the supporting action of the supporting base 24, and the lens 10 is maintained in the intermediate position by means of the lens carrier 21. The lower elastic piece supporting end 262 of the lower elastic piece 26 is disposed on the boss 243 of the supporting base 24, wherein the boss 243 provides the lower elastic piece bearing ring 261 with an upward supporting force by means of the lower elastic piece supporting end 262.

It is worth mentioning that, in the first preferred embodiment of the present disclosure, the lower elastic piece 26 and the upper elastic piece 25 may be embodied as an elastic apparatus made of metal, wherein the lower elastic piece 26 can support the lens carrier 21 in the initial state, and the lens 10 is maintained at the intermediate position by means of the lens carrier 21. Preferably, the lower elastic piece 26 is a sheet-like elastic body with a hollowed-out structure, and the lower elastic piece 26 can bear a certain force. More preferably, it is made by means of mechanical stamping or etching forming. It is worth mentioning that, in the present disclosure, the structure and manufacturing manner of the lower elastic piece 26 are merely exemplary in nature here, and not limiting. By way of example but not limitation, the lower elastic piece may be an elastic apparatus having an electrical connection function, wherein the upper bending member 231 and the lower bending member 232 are electrically connected to the SMA line on the lower elastic piece 26.

Figure 9A:
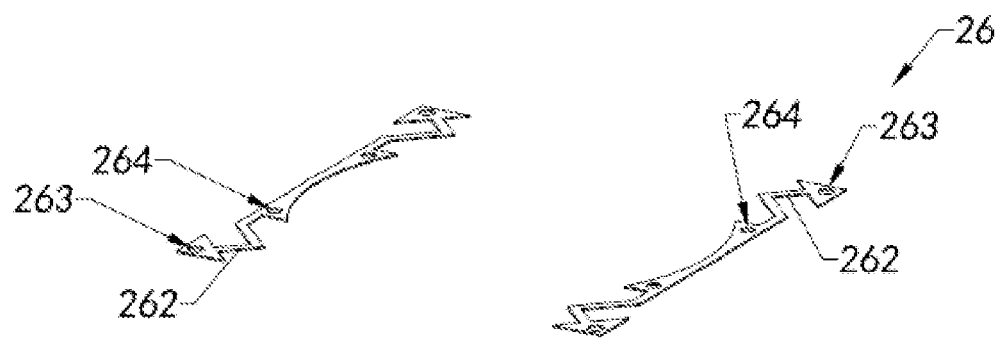
FIG. 9A is a schematic view of another optional implementation of a lower elastic piece of the SMA driving device of the camera apparatus according to the above preferred embodiment of the present disclosure.
Figure 9B:
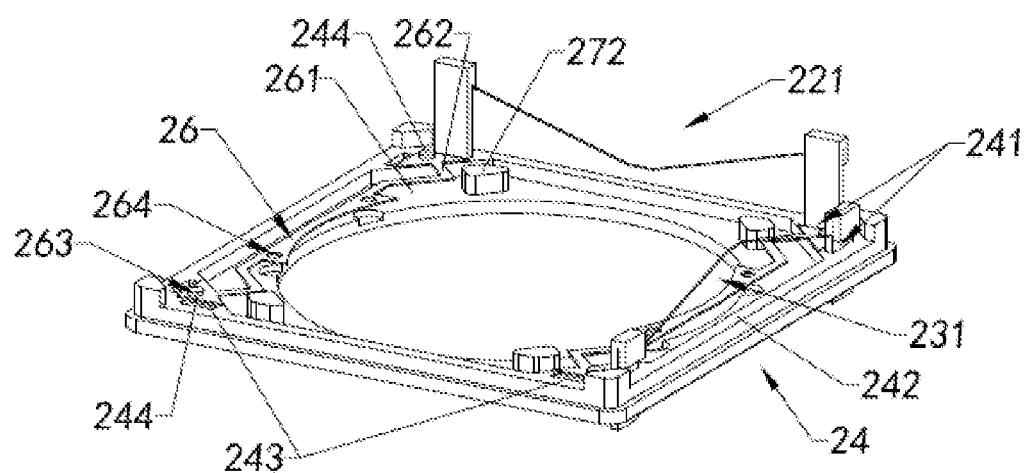
FIG. 9B is a schematic view of the elastic piece of the SMA driving device of the camera apparatus according to the above preferred embodiment of the present disclosure in a use state.

As shown in FIGS. 9A and 9B, according to another aspect of the present disclosure, the present disclosure further provides another optional implementation of the lower elastic piece 26. The lower elastic piece 26 is divided into at least two parts independent of each other, which are connected to two sets of upper drive fixing apparatuses 2212 or two sets of lower drive fixing apparatuses 2312, so that the two sets of upper drive fixing apparatuses 2212 or the two sets of lower drive fixing apparatuses 2312 can be driven integrally. In addition, another two sets of lower drive fixing apparatuses 2312 or upper drive fixing apparatuses 2212 realize electrical connection and conduction to the lower elastic piece 2 through a connection structure disposed on the supporting base 24, and the connection structure may be a conductive circuit provided on the surface or in the inside of the base, or may be another structure having the same function. Since the welding of the drive fixing apparatus changes from four sides to two sides, the complexity of the welding process is reduced. By way of example but not limitation, the lower elastic piece 26 may also be divided into more parts, such as three parts or four parts symmetrically spaced apart.

Figure 5B:
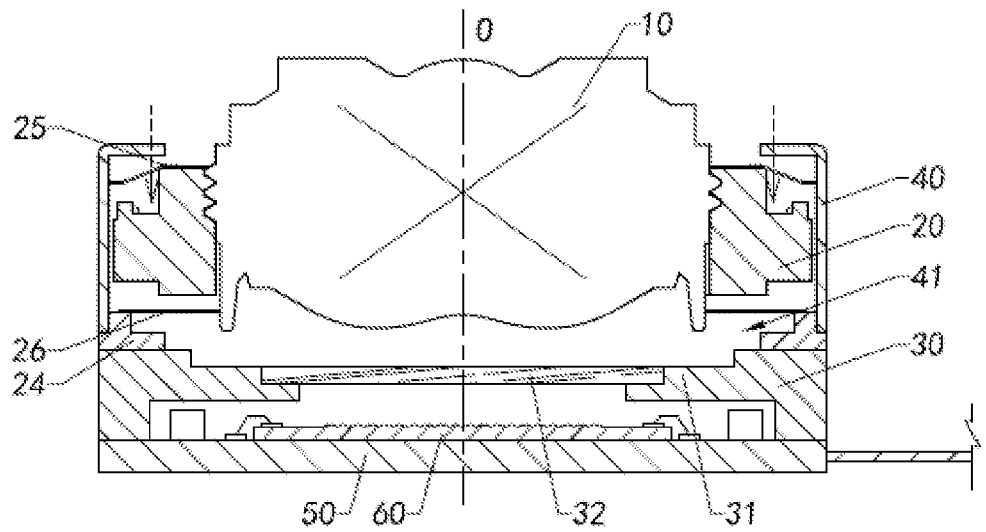
FIG. 5B is a schematic view of movement from a low position to a high position of the lens of the camera apparatus according to the above preferred embodiment of the present disclosure.
Figure 5C:
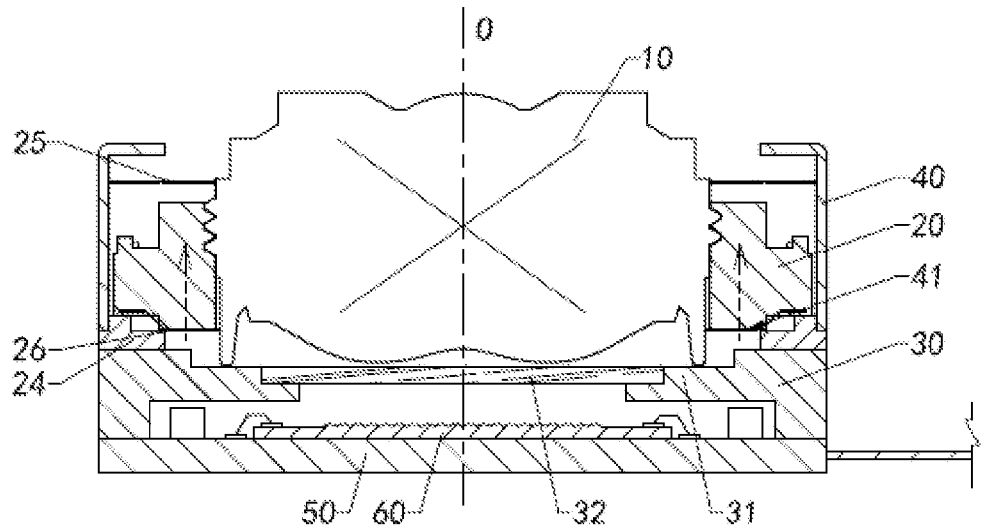
FIG. 5C is a schematic view of movement from a high position to a low position of the lens of the camera apparatus according to the above preferred embodiment of the present disclosure.

As shown in FIG. 5B, when the downgoing driver 23 of the SMA driving device 20 drives the lens carrier 21 to move downward, the lens carrier 21 squeezes the lower elastic piece 26 downwardly, so that the lower elastic piece supporting end 262 of the lower elastic piece 26 is elastically deformed. The lower elastic piece bearing ring 261 of the lower elastic piece 26 supports all parts of the lens carrier 21 to balance the received force in the horizontal direction. The lower elastic piece 26 provides the lens carrier 21 with an upward elastic force through the lower elastic piece bearing ring 261. When the position of the lens 10 returns from the bottom to the intermediate position of the lens 10, or the lens 10 is driven upwardly to move, the lower elastic piece 26 provides upward elastic supporting through elastic deformation to support the lens carrier 21 to move upward.

Preferably, in the first preferred embodiment of the present disclosure, the number of the lower elastic piece supporting ends 262 of the lower elastic piece 26 is four, wherein the lower elastic piece supporting ends 262 of the lower elastic piece 26 are disposed and mounted on the boss 243 of the supporting base 24. The lens carrier 21 is supported by the lower elastic piece 26 and held above the supporting base 24, and the lens 10 is maintained at the intermediate position by means of the lens carrier 21.

Correspondingly, the lower elastic piece 26 is further provided with at least one positioning hole 263 and at least one mounting hole 264, wherein the lens carrier 21 further includes at least one limiting bolt 213, and wherein the limiting bolt 213 is mounted on the lower elastic piece 26 through the mounting hole 264. The lens carrier 21 is disposed on the mounting base 24 by the lower elastic piece 26 through the mounting hole 264. Correspondingly, the mounting base 24 further includes at least one positioning pin 244, wherein the lower elastic piece 26 is positioned on the limiting pin 244 through the positioning hole 263. In the first preferred embodiment of the present disclosure, the positioning hole 263 is formed in the lower elastic piece supporting end 262 of the lower elastic piece 26, wherein the mounting hole 264 is formed in the lower elastic piece supporting end 261.

Figure 8:
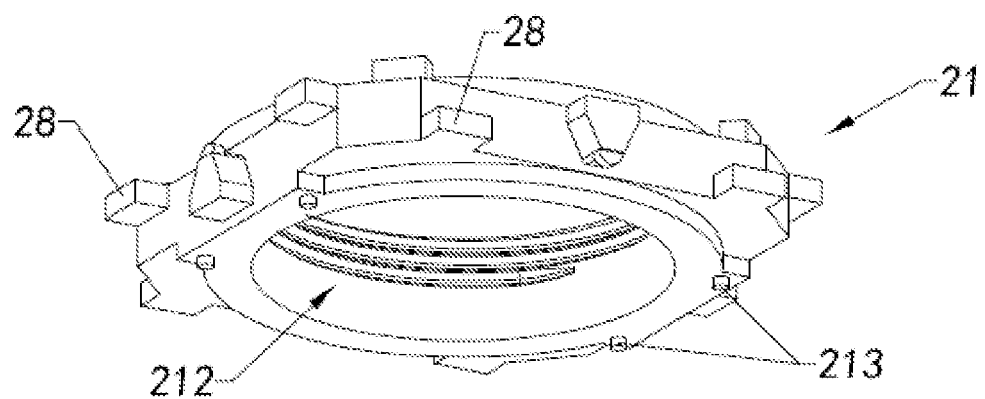
FIG. 8 is an overall structural schematic view of a lens carrier of the SMA driving device of the camera apparatus according to the above preferred embodiment of the present disclosure.

As shown in FIGS. 4 and 8, the SMA driving device 20 further includes at least one limiting apparatus 27, wherein the limiting apparatus 27 limits the maximum distance that the lens carrier 21 is driven to move upward and downward. In other words, the limiting apparatus 27 defines the farthest distances of upward and downward movement of the lens carrier 21, so as to define the limit positions of upward and downward movement of the lens 10.

In detail, the limiting apparatus 27 is disposed on the lens carrier 21, wherein the limiting apparatus 27 extends outwardly from the side of the lens carrier 21. In other words, the limiting apparatus 27 and the lens carrier 21 are an integral structure. The limiting apparatus 27 further includes at least one upper limiting unit 271 and at least one lower limiting unit 272, wherein the upper limiting unit 271 is disposed in an upper part of the lens carrier 21, and the upper limiting unit 271 is formed by integrally extending upwardly from an upper surface of the lens carrier 21. The lower limiting unit 272 of the limiting apparatus 27 is disposed on the supporting base 24 in a lower part of the lens carrier 21. Preferably, the lower limiting unit 272 is integrally formed on the supporting base 24, wherein the lower limiting unit 272 is formed by integrally extending upwardly from the upper surface of the supporting base.

The contact distance between the upper limiting unit 271 and the inner surface of the housing 40 is the maximum upward mechanical stroke of the lens carrier 21. In other words, when the lens carrier 21 is driven by the upgoing driver 22 upwardly to move, the upper limiting unit 271 moves to an inner surface of an upper part of the housing 40, wherein the housing 40 blocks the movement of the lens carrier 21, so that the lens carrier 21 is driven to the highest position. The distance between the lower limiting unit 272 and the lens carrier 21 is the limit distance of the downward movement of the lens 10. When the lens carrier 21 is driven by the downgoing driver 23 to move downward, the distance that the lens carrier 21 is moved downward to contact the lower limiting unit 272 is the maximum downward mechanical stroke of the lens carrier 21.

It is worth mentioning that, in the present disclosure, the maximum stroke of the lens 10 is divided into an upward movement stroke and a downward movement stroke, wherein the lens 10 is placed in a middle position. When the lens is in the initial position and is driven to move, the maximum stroke of the SMA driving device 20 to drive the lens 10 to move upward or downward is halved, thereby reducing the time required for the lens 10 to be driven to a suitable position, and improving the driving response speed of the lens 10.

As shown in FIGS. 4 and 8, the SMA driving device 20 further includes at least one spacer apparatus 28, wherein the spacer apparatus 28 is disposed between the lens carrier 21 and the housing 40 to separate the lens carrier 21 and the inner wall of the housing 40. Preferably, the spacer apparatus 28 is integrally disposed on the lens carrier 21, wherein the spacer apparatus 28 is formed by integrally extending outwardly from the side of the lens carrier 21. In other words, the spacer apparatus 28 protrudes outwardly from the side of the lens carrier 21, wherein the spacer apparatus 28 protrudes outwardly from the positions of the upgoing driver 22 and the downgoing driver 23, so that the spacer apparatus 28 limits the SMA lines of the upgoing driver 22 and the downgoing driver 23 from contacting the housing 40.

It is worth mentioning that the number of the spacer apparatuses 28 is four or more, wherein the spacer apparatuses are symmetrically disposed on four sides of the lens carrier 21.

As shown in FIG. 6, the upgoing driver 22 and the downgoing driver 23 of the SMA driving device 20 thermally drive the lens carrier 21 in an electric heating manner to move upward or downward. It can be understood that the SMA line is electrically heated when it is powered on, wherein when the SMA line is heated or self-heated, the SMA line thermally shrinks, and drivingly pulls up or draws the lens carrier 21 to move. Therefore, the SMA driving device 20 controls the forces of the upgoing driver 22 and the downgoing driver 23 by means of controlling the on/off and the magnitudes of the currents of the upgoing driver 22 and the downgoing driver 23, and further controls the movement of the lens carrier 21.

Preferably, in the present disclosure, the SMA driving device 20 controls the magnitudes of the forces of the upgoing driver 22 and the downgoing driver 23 based on the magnitudes of the currents of the upgoing driver 22 and the downgoing driver 23, thereby controlling the movement direction of the lens carrier 21.

When the camera apparatus is in the initial power-on state, the upgoing driver 22 and the downgoing driver 23 of the SMA driving device 20 are simultaneously electrically conductive, wherein the upper drive SMA line 2211 of the upgoing driving unit 221 and the lower drive SMA line 2311 of the downgoing driving unit 231 are simultaneously electrically heated, and are in a shrunken tension state. Therefore, the upper drive SMA line 2211 and the lower drive SMA line 2311 simultaneously stretch the lens carrier 21, and the lens 10 is maintained at the intermediate position by means of the lens carrier 21. It can be understood that the magnitudes of the currents of the upgoing driver 22 and the downgoing driver 23 in the initial state are relatively small, so that the driving and traction forces of the upgoing driver 22 and the downgoing driver 23 in the initial state are small, and they will not be too tight.

It can be understood that when the SMA driving device 20 in the stationary and unpowered state, the upgoing driver 22 and the downgoing driver 23 of the SMA driving device 20 are not powered on, wherein the SMA lines of the upgoing driver 22 and the downgoing driver 23 are in a stretched or relaxed state. When the camera apparatus is in a stationary and unpowered state, the SMA driving device 20 supports and holds the position of the lens carrier 21 through the upper elastic piece 25 and the lower elastic piece 26, and the position of the lens 10 is maintained by means of the lens carrier 21. For example, when the camera apparatus is in the stationary and unpowered state, the SMA driving device 20 supports the lens carrier 21 through the upper elastic piece and the lower elastic piece 26, so that the lens 10 is located below the intermediate position. When the camera apparatus is in the initial power-on state, the upgoing driver 22 and the downgoing driver 23 of the SMA driving device 20 drive the lens carrier 21 to move upward from a stationary and unpowered position, so that the lens 10 is in the intermediate position.

When the lens 10 is in the lower position or the intermediate position and needs to be adjusted higher, the current of the upper drive SMA line 2211 of the upgoing driving unit 221 is increased, the upper drive SMA line 2211 is electrically heated, and the upper drive SMA line 2211 is tightened as the temperature rises, wherein the current of the lower drive SMA line 2311 of the lower driving unit 231 is decreased, and the temperature of the lower drive SMA line 2311 in the environment temperature drops, which causes the lower-drive SMA line 2311 to relax. The upper drive SMA line 2211 of the downgoing driving unit 221 drives the lens carrier 21 to move upward. Correspondingly, when the lens 10 is at a higher position or the intermediate position and needs to be adjusted lower, the current of the upper drive SMA line 2211 of the upgoing driving unit 221 is decreased, and the upper drive SMA line 2211 is relaxed as the temperature drops, wherein the current of the downgoing driver SMA line 2311 of the downgoing driving unit 231 is increased, and the downgoing driver SMA line 2311 is tightened as the temperature rises. Correspondingly, the lower drive SMA line 2311 of the downgoing driving unit 231 drives the lens carrier 21 to move downward.

When the lens 10 is driven upwardly by the SMA driving device 20 from the intermediate position, as the lens carrier 21 moves upward, the upper elastic piece 25 is driven by the lens carrier 21 to undergo elastic deformation. Correspondingly, when the lens 10 returns to the initial position from a high position, the downgoing driver 23 and the upper elastic piece 25 of the SMA driving device 20 jointly drive the lens carrier 21 to move downward, and the lens 10 is driven by means of the lens carrier 21 to move downward, so as to drive the lens 10 to return to the initial position. Correspondingly, when the lens 10 is driven downwardly by the SMA driving device 20 from the intermediate position, as the lens carrier 21 moves downward, the lower elastic piece 26 is driven by the lens carrier to undergo elastic deformation. Correspondingly, when the lens 10 returns to the initial position from a low position, the upgoing driver 22 and the lower elastic piece 26 of the SMA driving device 20 jointly drive the lens carrier 21 to move downward, and the lens 10 is driven by means of the lens carrier 21 to return to the intermediate position.

The upgoing driver 22 drives the lens carrier 21 to move upward, and the lens 10 is pulled up by means of the lens carrier 21 from a low position to a high position. The downgoing driver 23 drives the lens carrier 21 to move downward, and the lens 10 is drawn by means of the lens carrier 21 from a high position to a low position. It can be understood that the movement speed of the lens 10 is controlled by controlling the magnitudes of the currents of the upgoing driver 22 and the downgoing driver 23 of the SMA driving device 20. Therefore, the SMA driving device can drive the lens 10 to move up and down at a uniform speed.

It is worth mentioning that the currents of the two upgoing driving units 221 of the upper drive SMA driver 22 are adjusted synchronously. When the upper drive SMA driver 22 drives the lens carrier 21 to move upward, the upgoing driving units 221 on both sides of the upper drive lens carrier 21 synchronously drive the lens carrier 21 to move upward. Correspondingly, when the two downgoing driving units 231 of the lower drive SMA driver 23 are adjusted synchronously, the lens carrier 21 is synchronously driven downward.

It is worth mentioning that, in the first preferred embodiment of the present disclosure, in the initial state, the initial position of the lens 10 is located in a position in the middle of the highest limit position (including the highest limit position) and the lowest limit position (including the lowest limit position), wherein the lens 10 may be driven by the SMA driving device 20 to move upward and downward based on the initial position. Preferably, in the first preferred embodiment of the present disclosure, in the initial state, the initial position of the lens 10 is located in a middle position of the overall stroke of the lens 10, wherein the stroke distance the lens 10 is driven to move upward is equal to the stroke distance the lens 10 is driven to move downward. In short, the lens 10 is held in the intermediate position by the SMA driving device 20 in the initial state.

Figure 10:
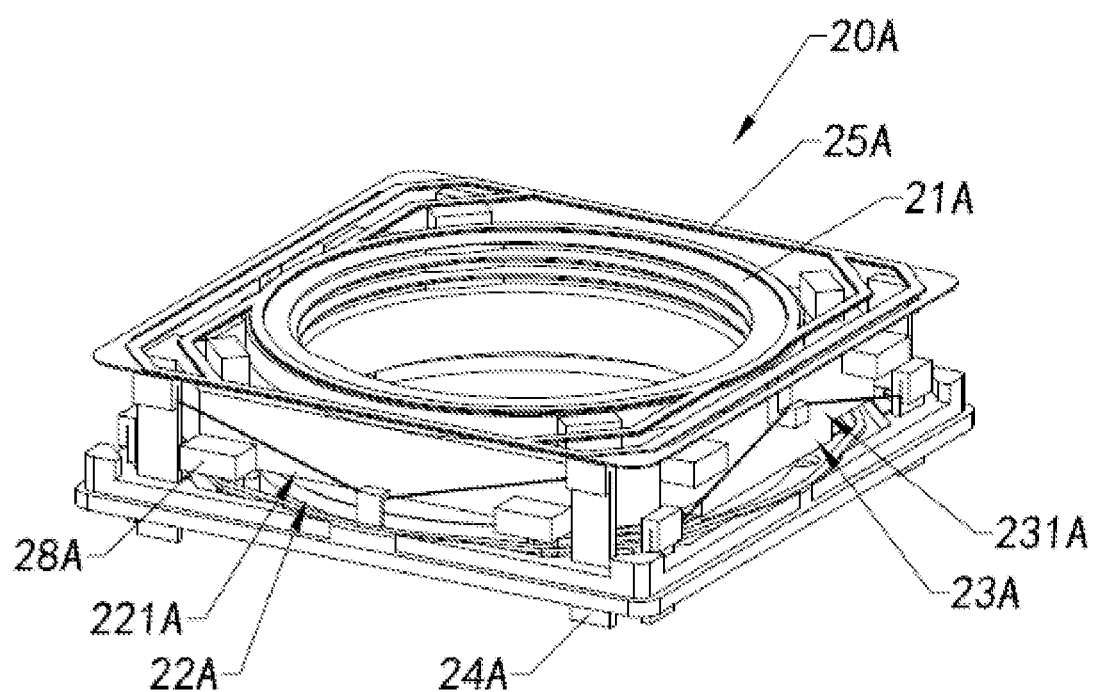
FIG. 10 is an overall schematic view of another optional implementation of an SMA driving device of the camera apparatus according to the above preferred embodiment of the present disclosure.
Figure 11:
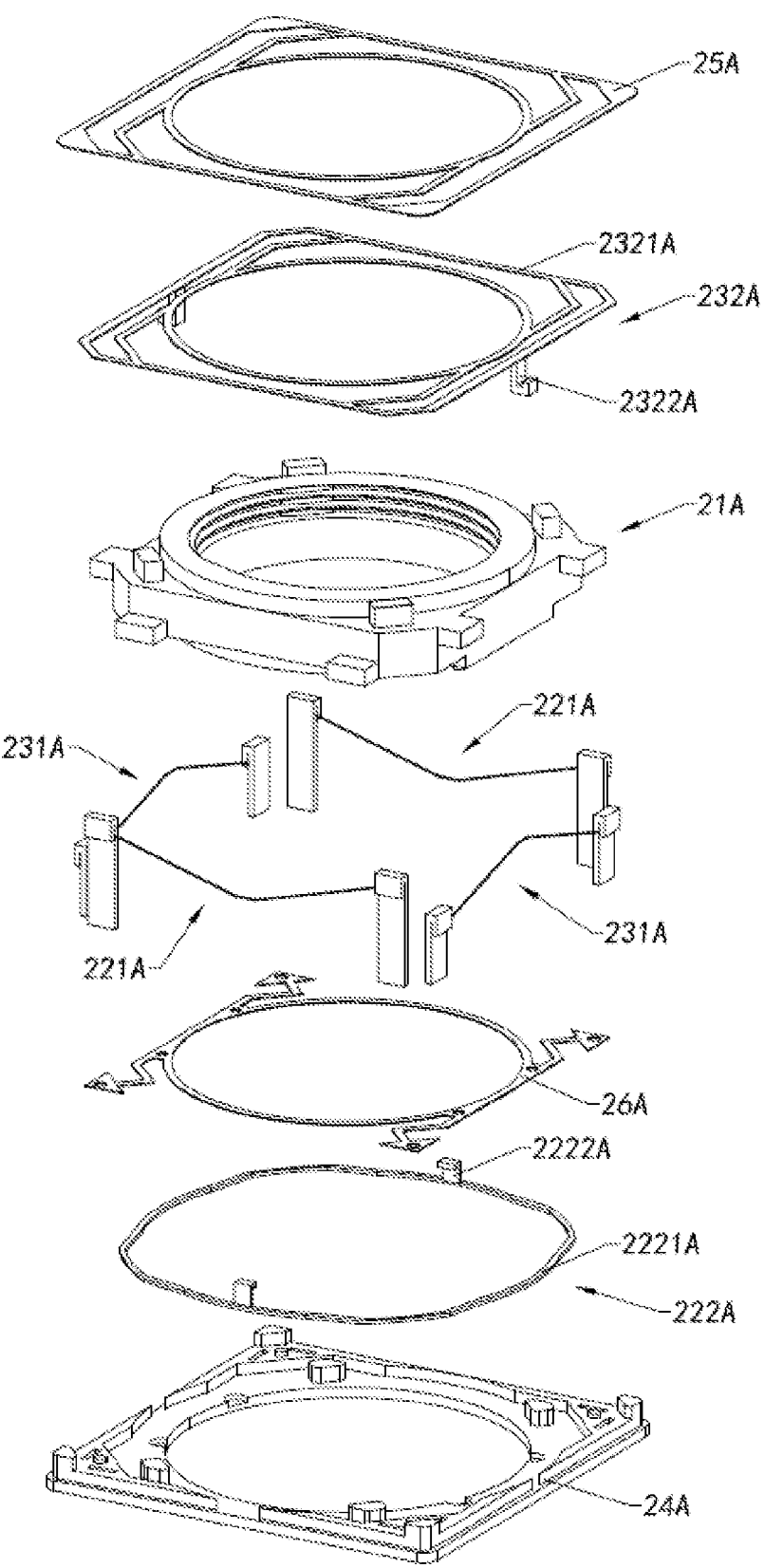
FIG. 11 is an exploded schematic view of the SMA driving device of the camera apparatus according to the above preferred embodiment of the present disclosure.

Referring to FIGS. 10 and 11 of the drawings of the specification of the present disclosure, another optional implementation of an SMA driving device 20A of the camera apparatus according to the above preferred embodiment of the present disclosure is explained in the following description. The SMA driving device 20A includes a lens carrier 21A, at least one upgoing driver 22A, at least a downgoing driver 23A, a supporting base 24A, at least one upper elastic piece 25A, at least one lower elastic piece 26A, and at least one limiting apparatus 27A, wherein in this preferred embodiment of the present disclosure, the lens carrier 21A, the downgoing driver 23A, the supporting base 24A, the at least one upper elastic piece 25A, the at least one lower elastic piece 26A, and the at least one limiting apparatus 27A have the same structures and functions as those in the above first preferred embodiment except for the differences in the upgoing driver 22A and the downgoing driver 23A.

In detail, the upgoing driver 22A includes at least one upgoing driving unit 221A and at least one upper actuator 222A, wherein the upper actuator 222A is disposed below the lens carrier 21A. The upgoing driving unit 221A provides the upper actuator 222A with an upward force, wherein the upper actuator 222A drives the lens carrier 21 to move upward. Correspondingly, the downgoing driver 23A includes at least one downgoing driving unit 231A and at least one lower actuator 232A, wherein the lower actuator 232A is disposed above the lens carrier 21A. The downgoing driving unit 231A provides the lower actuator 232A with a downward force, wherein the lower actuator 232A drives the lens carrier 21 to move downward.

Preferably, in this optional implementation of the SMA driving device 20A of the present disclosure, the number of the upgoing driving units 221A of the upgoing driver 22A and the number of the downgoing driving units 231A of the downgoing driver 23A are two. More preferably, the downgoing driving units 221A of the upgoing driver 22A and the downgoing driving units 231A of the downgoing driver 23A are symmetrically disposed on the lens carrier 21A. In other words, the upgoing driving units 221A and the downgoing driving units 231A are adjacently disposed on four sides of the lens carrier 21A.

It is worth mentioning that in this modified implementation of the present disclosure, the upgoing driving unit 221A of the upgoing driver 22A and the downgoing driving unit 231A of the downgoing driver 23A have the same structures and functions as those of the above first preferred embodiment. The upper actuator 222A is disposed between the lower elastic piece 26A and the lens carrier 21A, and the lens carrier 21A is provided with a downward driving force by means of the upper actuator 222A, wherein the lower actuator 232A is disposed between the upper elastic piece 25A and the lens carrier 21A, and the lens carrier 21A is provided with an upward driving force by means of the lower actuator 232A.

The upper actuator 222A includes an upper actuator main body 2221A and at least one upper hook 2222A, wherein the upper hook 2222A is disposed on the upper actuator main body 2221A. The upgoing driving unit 221A is hooked to the upper hook 2222A, and the upgoing driving unit 221A applies an upward driving force to the upper actuator main body 2221A through the upper hook 2222A.

Correspondingly, the lower actuator 232A includes a lower actuator main body 2321A and at least one lower hook 2322A, wherein the lower hook 2322A is disposed on the lower actuator main body 2321A. The downgoing driving unit 231A is hooked to the lower hook 2322A, and the downgoing driving unit 231A applies a downward driving force to the lower actuator main body 2321A through the lower hook 2322A.

Preferably, the upper actuator 222A is an integral structure, wherein the upper hook 2222A is formed by integrally extending upwardly from a side of the upper actuator main body 2221A. An opening of the upper hook 2222A faces downwards, wherein the upgoing driving unit 221A is hooked below the upper hook 2222A through the opening. When the upgoing driving unit 221A is powered on, the SMA line is electrically heated and shrinks, wherein the SMA line of the upgoing driving unit 221A shrinks, and the upper actuator main body 2221A is provided with an upward supporting force through the upper hook 2222A.

The lower hook 2322A of the lower actuator 232A is formed by integrally extending downwardly from the lower actuator main body 2321A. An opening of the lower hook 2322A faces upwards, wherein the downgoing driving unit 231A is hooked above the lower hook 2322A through the opening. When the downgoing driving unit 231A is powered on, the SMA line is electrically heated and shrinks, wherein the SMA line of the downgoing driving unit 231A thermally shrinks, and the lower actuator main body 2321A is provided with a downward supporting force through the lower hook 2322A.

It is worth mentioning that the upper actuator main body 2221A of the upper actuator 222A and the lower actuator main body 2321A of the lower actuator 232A are rigid sheets that actuate the lens carrier 21A to move. More preferably, the number of the upper hooks 2222A of the upper actuator 222A is two, and the shape of the upper actuator main body 2221A of the upper actuator 222A is a rectangular sheet adapted to the lens carrier 21A, wherein the upper hooks 2222A are symmetrically disposed at middle positions on the sides of the upper actuator main body 2221A.

Figure 12:
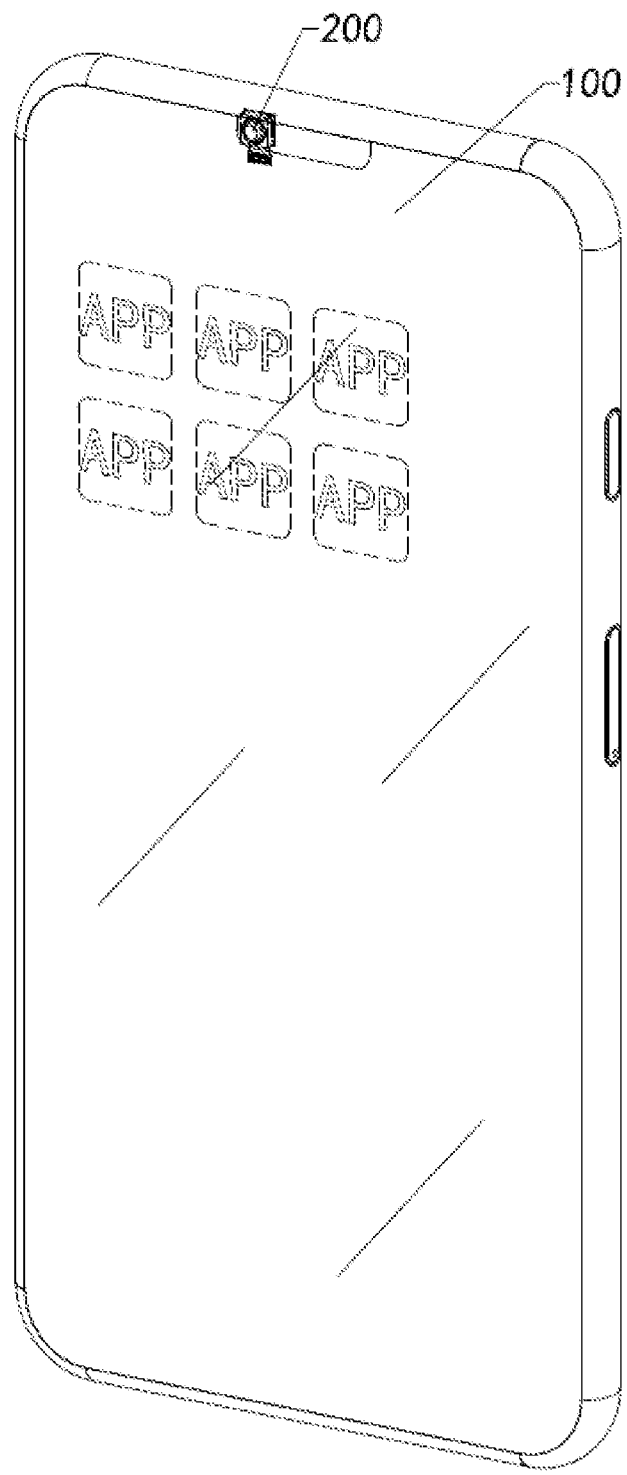
FIG. 12 is a schematic view of an application scene of the camera apparatus according to the above preferred embodiment of the present disclosure, wherein the camera apparatus is applied to a mobile electronic device.
Figure 13:
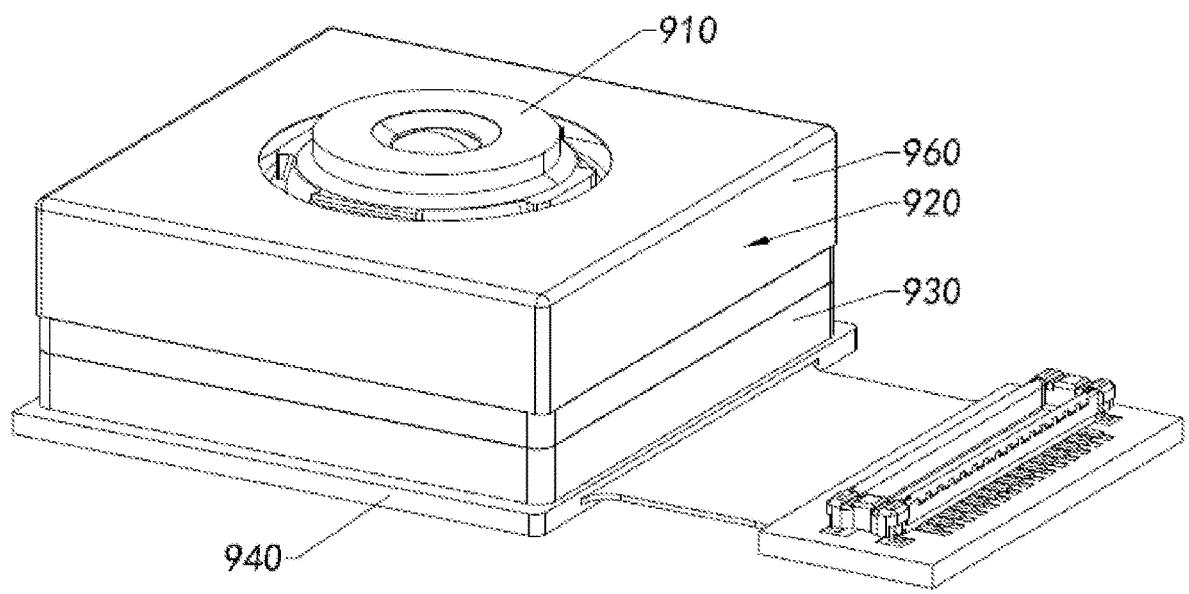
FIG. 13 is an overall schematic view of a camera apparatus according to a second preferred embodiment of the present disclosure.

As shown in FIG. 12 of the drawings in the specification of the present disclosure, an application of the camera apparatus according to the above preferred embodiment of the present disclosure is explained in the following description. The camera apparatus is mounted on an electronic device, such as a mobile phone, a tablet computer or the like. As an example, the electronic device includes a device main body 100 and at least one camera apparatus 200, wherein the camera apparatus 200 is mounted on the device main body 100, and wherein the device main body 100 supplies power to the camera apparatus 200 so as to support the operation of the camera apparatus 200. The camera apparatus 200 is controllably mounted on the device main body 100, wherein the device main body 100 controls the camera apparatus 200 to capture images or videos.

It is worth mentioning that in the present disclosure, the camera apparatus 200 is the camera apparatus in the above first preferred embodiment. Correspondingly, the camera apparatus 200 is communicatively connected to the device main body 100, wherein image data information captured by the camera apparatus 200 is transmitted to the device main body, so that the device main body obtains image or video information captured by the camera apparatus 200. The device main body 100 controls the movement of the SMA driving device 20 of the camera apparatus 200, and the lens of the camera apparatus 200 is driven by means of the SMA driving device to move up and down along the optical axis O, so as to obtain clear images at different near and far distances.

According to another aspect of the present disclosure, the present disclosure further provides a manufacturing method for an SMA driving device, wherein the manufacturing method comprises the following steps:

(a) A lens carrier is placed in an intermediate position, so that the lens carrier can be driven to move up and down.

(b) At least one upgoing driver 22 and at least one downgoing driver 23 are disposed on the lens carrier 21. In this step (b), the upgoing driver 22 and the downgoing driver 23 are adjacently disposed on sides of the lens carrier 21. The two upgoing driving units 221 of the upgoing driver 22 and the two lower driving units 231 of the downgoing driver 23 are symmetrically disposed on the sides of the lens carrier 21. Two upper drive fixing apparatuses 2212 of the upgoing driving unit 221 and two lower drive fixing apparatuses 2312 of the lower driving unit 231 are fixedly mounted on a supporting base 24, and the upgoing driving unit 221 and the lower driving unit 231 are adjacently disposed by means of the supporting base 24. In this step (b), at least one SMA line is pressed on the upper drive fixing apparatus 2212, and at least one SMA line is pressed on the lower drive fixing apparatus 2312, so as to manufacture the upgoing driver 22 and the downgoing driver 23.

The SMA line of the upgoing driving unit 221 passes below an upper bending member 222, so that the SMA line of the upgoing driving unit 221 supports the lens carrier 21 upwardly when thermally shrinking. The SMA line of the lower driving unit 231 passes above a lower bending member 232, so that the SMA line of the lower driving unit 231 draws the lens carrier 21 downwardly when thermally shrinking.

(c) At least one upper elastic piece 25 is mounted above the lens carrier 21, and at least one lower elastic piece 26 is mounted between the lens carrier 21 and the supporting base 24 to manufacture the SMA driving device. In a case of being unpowered, the upper elastic piece 25 and the lower elastic piece 26 support the lens carrier 21, and the lower elastic piece 26 supports the lens carrier 21 above the supporting base 24.

According to another aspect of the present disclosure, the present disclosure further provides a driving method for an SMA driving device 20, wherein the driving method comprises the following steps:

(I) In an initial state, at least one upper drive SMA line 2211 of at least one upgoing driving unit 221 of one upgoing driver 22 thermally shrinks, and at least one lower drive SMA line 2311 of at least one downgoing driving unit 231 of one downgoing driver 23 thermally shrinks, and a lens carrier 21 is drawn by means of joint shrinkage of the upper drive SMA line 2211 and the lower drive SMA line 2311 to hold the lens carrier 21 in a position that can move up and down. In this step (I) of the present disclosure, in the initial state of the SMA driving device, the upper drive SMA line 2211 and the lower drive SMA line 2311 are electrically heated to increase the temperature of the SMA lines, so that the lens carrier is supported in a manner of thermal shrinkage.

(II) The temperature of the upper drive SMA line 2211 of the upgoing driving unit 221 and the temperature of the lower drive SMA line 2311 of the downgoing driving unit 231 are differently controlled to control the upper drive SMA line 2211 and the lower drive SMA line 2311 to draw and support the lens carrier 21 with different degrees of tension, so as to drive the lens carrier 21 to move.

In this step (II) of the present disclosure, the SMA driving device 20 differently controls the magnitudes of currents of the upper drive SMA line 2211 and the lower drive SMA line 2311 to control the temperature for thermal driving of the upper drive SMA line 2211 and the lower drive SMA line 2311. When the current of the upper drive SMA line 2211 of the upgoing driving unit 221 is increased, and the current of the lower drive SMA line 2311 of the downgoing driving unit 231 is decreased, the upper drive SMA line 2211 is tightened as the temperature rises, and the lower drive SMA line is relaxed as the temperature drops. The upgoing driving unit 221 drives the lens carrier 21 to move upward. Correspondingly, when the current of the lower drive SMA line 2311 of the downgoing driving unit 231 is increased and the current of the upper drive SMA line 2211 of the downgoing driving unit 221 is decreased, the lower drive SMA line 2311 is tightened as the temperature rises, and the upper drive SMA line 2211 is relaxed as the temperature drops. The downgoing driving unit 231 draws the lens carrier 21 to move downward.

Referring to FIGS. 13 to 20C of the drawings of the specification of the present disclosure, a camera apparatus according to a second preferred embodiment of the present disclosure is explained in the following description. The camera apparatus includes at least one lens 910, an SMA driver 920, a lens holder 930, a circuit board 940, and at least one photosensitive element 950 disposed on the circuit board 940, wherein the SMA driver 920 is disposed on the lens holder 930. The lens 910 is disposed on the SMA driver 920, wherein the SMA driver 920 holds the lens 910 above the photosensitive element 950, and drives the lens 910 to move above the photosensitive element 950, so that the lens 910 focuses obtained light onto the photosensitive element 950, and image information is obtained by means of the photosensitive element 950.

The camera apparatus has an optical axis O, wherein the lens 910 and the photosensitive element 950 of the camera apparatus are disposed along a direction of the optical axis O. It is worth mentioning that the SMA driver 920 drives the lens 910 to move based on the direction of the optical axis O so as to adjust an imaging position of the lens 910 from the photosensitive element 950, thereby achieving the focus of images at different positions.

Figure 14:
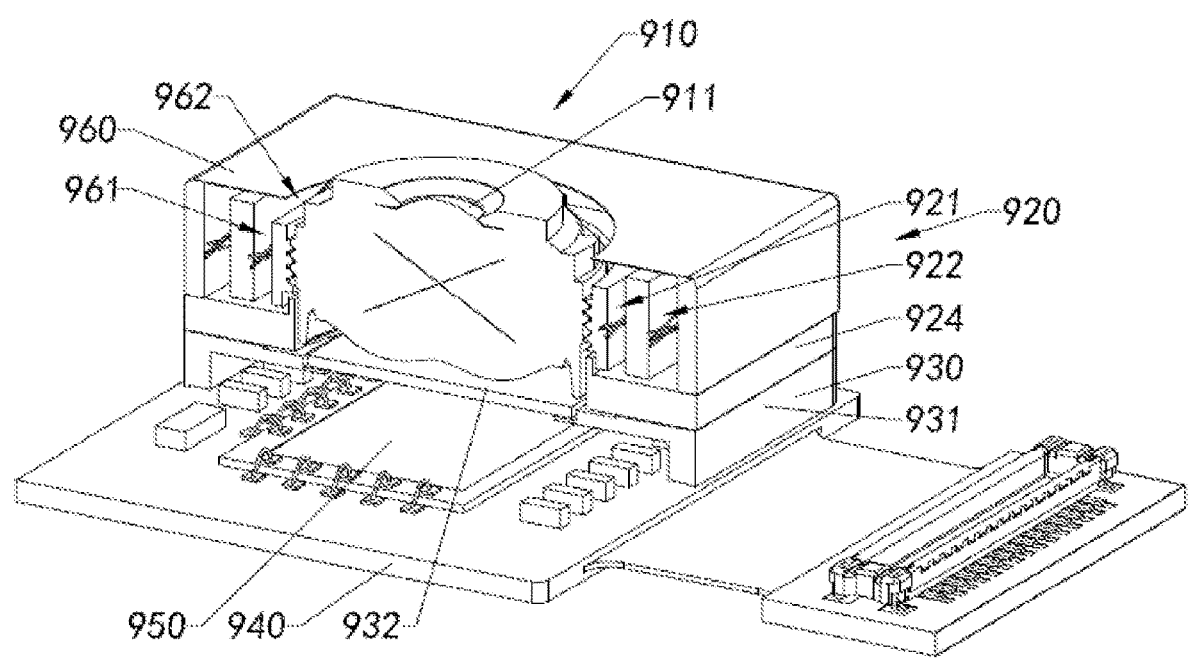
FIG. 14 is a perspective cross-sectional view of the camera apparatus according to the above preferred embodiment of the present disclosure.
Figure 15:
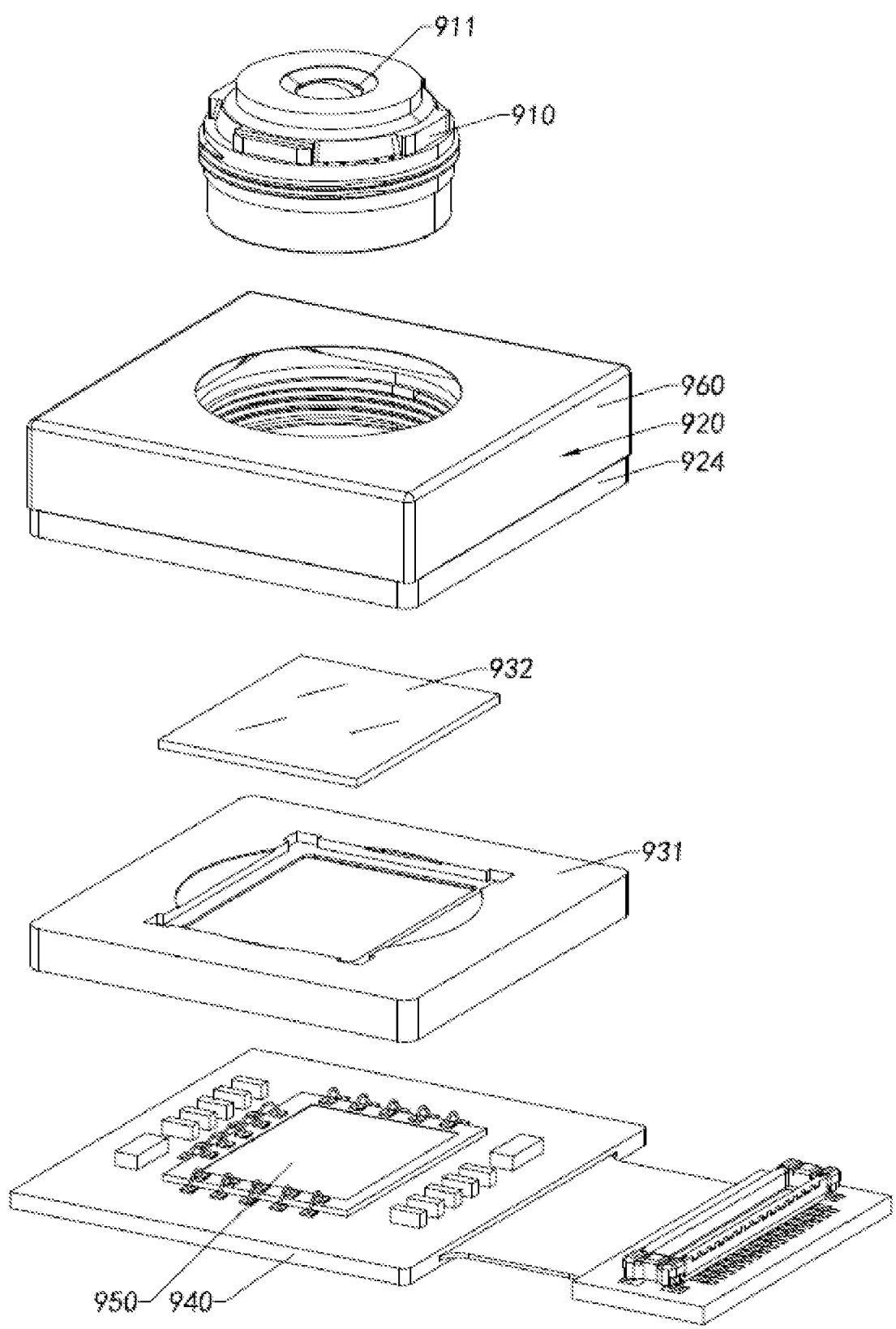
FIG. 15 is an exploded schematic view of the camera apparatus according to the above preferred embodiment of the present disclosure.

As shown in FIGS. 14 and 15, the lens 910 includes at least one lens sheet 911, wherein the lens sheet 911 forms an optical system of the camera apparatus, and wherein the lens sheet 911 is disposed above the photosensitive element 950 along the direction of the optical axis O, so that the optical system focuses the image light to the photosensitive element 950. The lens holder 930 comprises a lens holder main body 931 and at least one filter element 932 disposed on the lens holder main body 931, wherein the filter element 932 is supported between the lens 910 and the photosensitive element 950 by the lens holder main body 931 to filter light entering the lens 910. The camera apparatus further includes a housing 960, wherein the housing 960 is disposed outside the lens 910 and the SMA driver 920, and the lens 910 and the SMA driver 920 inside the housing 960 are protected by means of the housing 960. The housing 960 has an accommodating space 961 and at least one light entrance hole 962 communicating with the accommodating space 961, wherein the light entrance hole 962 is formed in an upper part of the housing 960, and light enters into the accommodating space 961 through the light entrance hole 962.

As shown in FIGS. 16 to 20C, the SMA driver 920 drives the lens 910 to move above the lens holder 930 in a dual-driven manner, wherein the SMA driver 920 drives the lens 910 to move in a manner of translation or rotation so that the focus range of the lens 910 becomes larger, and thus the camera apparatus obtains a greater image capturing range. When the lens 910 is driven by the SMA driver 920 and held at an imaging position, and when the SMA driver 920 drives the lens 910 to move to the imaging position in the direction of the optical axis O, the lens 910 may be driven by the SMA driver 920 to adjust the focus direction of the lens 910, thereby stabilizing the imaging quality of the camera apparatus.

In other words, in the second preferred embodiment of the present disclosure, the SMA driver 920 drives the lens 910 to move in the direction of the optical axis O in a dual-driven manner, and when the lens 910 reaches a specified position, the SMA driver 920 stabilizes the position of the lens 910, so that the lens 910 and the photosensitive element 950 cooperate to produce a clear image.

In detail, the SMA driver 920 includes an inner SMA driving apparatus 921, an outer SMA driving apparatus 922, and at least one suspension system 923, wherein the lens 910 is disposed on the inner SMA driving apparatus 921, and the SMA driving apparatus 921 drives the lens 910 to move. The outer SMA driving apparatus 922 is disposed on an outer side of the inner SMA driving apparatus 921, and the outer SMA driving apparatus drives the inner SMA driving apparatus 921 to move, wherein the lens 910 is driven by the outer SMA driving apparatus 922 to move along the inner SMA driver 921. The suspension system 923 is disposed on the inner SMA driving apparatus 921 and the outer SMA driving apparatus 922, and the suspension system 923 supports or draws the inner SMA driving apparatus 921 and the outer SMA driving apparatus 922 in a manner of driving forces opposite to the inner SMA driving apparatus 921 and the outer SMA driving apparatus 922 to balance received forces of the lens 910, thereby holding the lens 910 at the imaging position.

In other words, the lens 910 is held above the photosensitive element 950 under the joint action of the suspension system 923, the inner SMA driving apparatus 921 and the outer SMA driving apparatus 922. When the lens 910 is driven to move, the suspension system 923 provides the lens 910 with opposite forces through the inner SMA driving apparatus 921 and the outer SMA driving apparatus 922 to maintain the lens 910 to be stable during being driven to move. In short, the suspension system 923 supports and stabilizes the lens 910.

Figure 16:
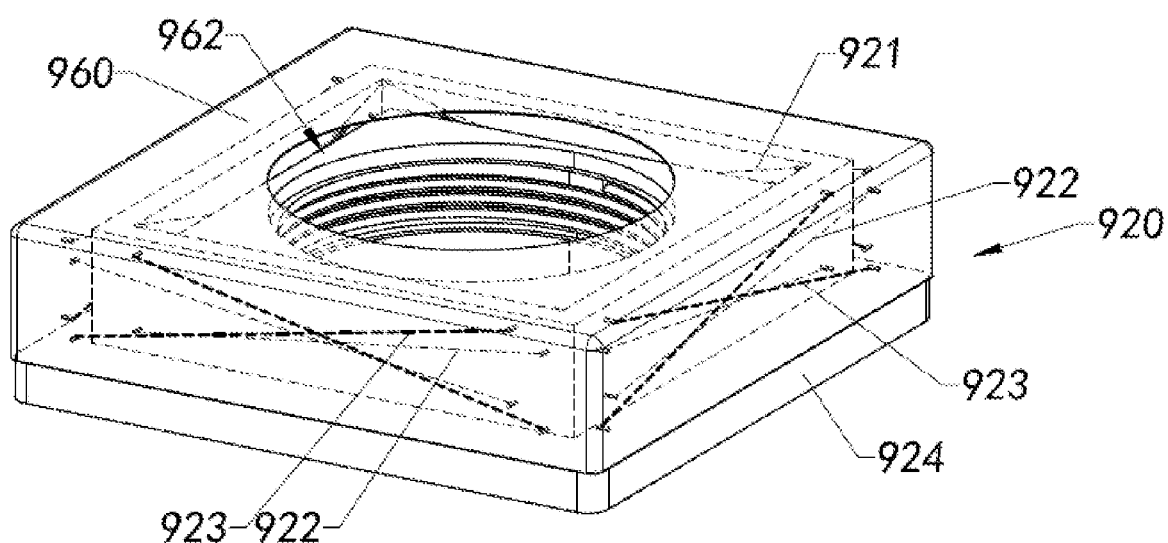
FIG. 16 is an overall schematic view of an SMA driver of the camera apparatus according to the above preferred embodiment of the present disclosure.
Figure 17A:
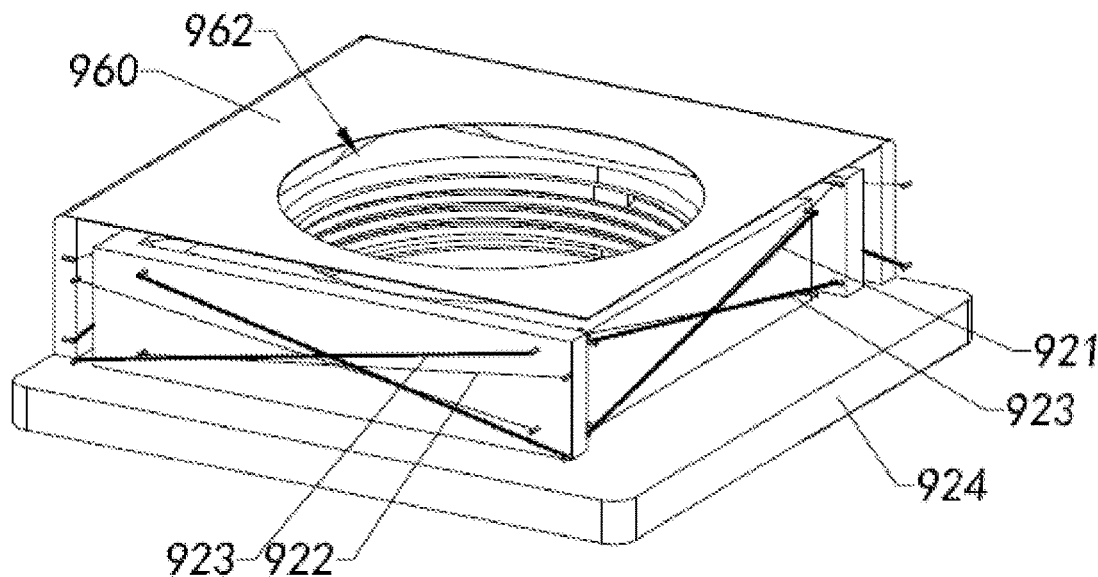
FIG. 17A is a perspective cross-sectional view of the SMA driver of the camera apparatus according to the above preferred embodiment of the present disclosure.
Figure 17B:
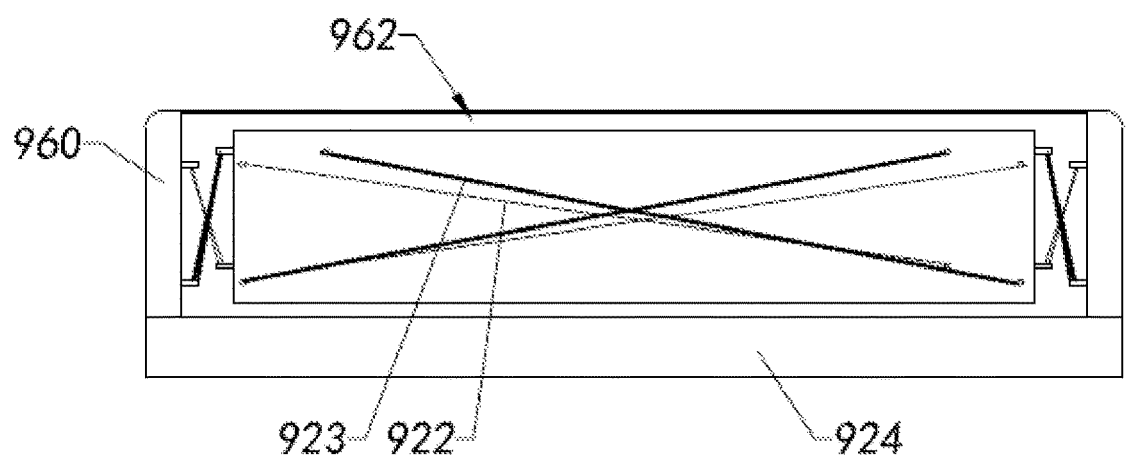
FIG. 17B is a partially detailed schematic view of the SMA driver of the camera apparatus according to the above preferred embodiment of the present disclosure.
Figure 18:
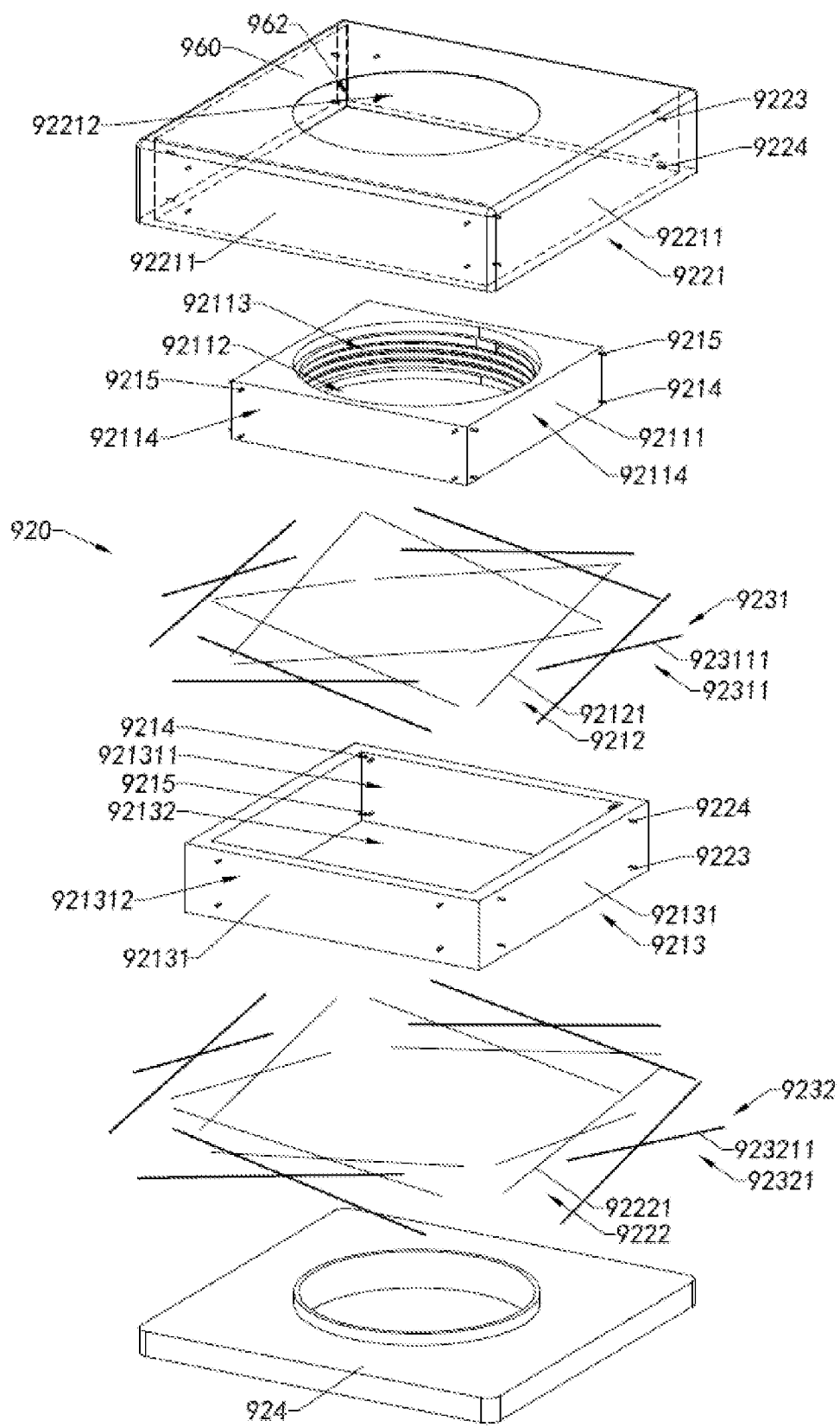
FIG. 18 is an exploded schematic view of the SMA driver of the camera apparatus according to the above preferred embodiment of the present disclosure.

As shown in FIGS. 16 to 18, the inner SMA driving apparatus 921 of the SMA driver 920 includes a lens carrier 9211, at least two inner driving units 9212, and a supporting carrier 9213, wherein the inner driving units 9212 are disposed on the lens carrier 9211 and the supporting carrier 9213. The supporting carrier 9213 supports the inner driving unit 9212, wherein the inner driving unit 9212 is telescopically connected to the lens carrier 9211 under the supporting action of the supporting carrier 9213, and the inner driving unit 9212 drives the lens carrier 9211 to move in a manner of thermal shrinkage. In other words, in the inner SMA driving apparatus 921, the inner driving unit 9212 drives the lens carrier 9211 to move in a shrinkage manner based on the position of the supporting carrier 9213, and the movement of the lens 910 is driven by means of the lens carrier 9211. Preferably, the inner driving units 9212 are symmetrically disposed on two sides of the lens carrier 9211. When the inner driving units 9212 thermally shrink, the at least two inner driving units 9212 provide the lens carrier 9211 with symmetrical forces based on the optical axis O. More preferably, in the second preferred embodiment of the present disclosure, the number of the inner driving units 9212 of the inner SMA driving apparatus 921 is four, wherein the inner driving units 9212 are symmetrically disposed on four side surfaces of the lens carrier 9211.

It can be understood that while the inner SMA driving apparatus 921 drives the lens 910 to move upward, the inner SMA driving apparatus 921 is driven by means of the outer SMA driving apparatus 922 to move in the same direction, so that the time for the lens to reach the specified position is shortened, and the response time of the camera apparatus for focusing is reduced.

As shown in FIGS. 16 to 18, the outer SMA driving apparatus 922 of the SMA driver 920 further includes at least one bearing apparatus 9221 and at least two outer driving units 9222, wherein the outer driving units 9222 are symmetrically disposed on the bearing apparatus 9221 and the supporting carrier 9213. The bearing apparatus 9221 is drivingly connected to the supporting carrier 9213 through the outer driving unit 9222, wherein the outer driving unit 9222 drives the supporting carrier 9213 to move based on the bearing apparatus 9221, and the movement of the lens carrier 9211 and the lens 910 is driven by means of the supporting carrier 9213. In other words, the outer SMA driving apparatus 922 is disposed for driving the movement of the inner SMA driving apparatus 921, and when the inner SMA driving apparatus 921 is driven to move, the inner SMA driving apparatus 921 drives the movement of the lens 910.

The bearing apparatus 9221 is disposed on the lens holder 930, and the bearing apparatus 9221 is supported by the lens holder 930, and provides the outer driving unit 9222 with a supporting force. The outer driving unit 9222 drives the inner SMA driving apparatus 921 to move in a manner of thermal shrinkage, wherein the inner SMA driving apparatus 921 is driven by the outer driving unit 9222 to drive the movement of the lens 910. More preferably, in the second preferred embodiment of the present disclosure, the number of the outer driving units 9222 of the outer SMA driving apparatus 922 is four, wherein the outer driving units 9222 are symmetrically disposed on four side surface positions of the inner SMA driving apparatus 921. The outer driving units 9222 of the outer SMA driving apparatus 922 jointly drive the movement of the inner SMA driving apparatus 921 to increase the movement speed of the lens 910.

It can be understood that the lens 910 is driven by the inner SMA driving apparatus 921 of the SMA driver 920 to move in a direct thermal shrinkage manner, wherein the lens 910 is indirectly driven by the outer SMA driving apparatus 922 through the inner SMA driving apparatus 921 to move. In other words, the lens 910 is driven by the SMA driver 920 to move in a dual-driven manner based on the position of the initial state.

As shown in FIGS. 16 to 18, the suspension system 923 is disposed on the inner SMA driving apparatus 921 and the outer SMA driving apparatus 922, the forces provided by the inner SMA driving apparatus 921 and the outer SMA driving apparatus 922 are balanced by means of the suspension system 923 to maintain the balance of the lens 910 when in the imaging position. The suspension system 923 provides driving forces opposite to the inner SMA driving apparatus 921 and the outer SMA driving apparatus 922, and when the SMA driving device drives the lens 910 to move to an imaging position, for example, when the lens 910 is driven by the inner SMA driving apparatus 921 and the outer SMA driving apparatus 922 upwardly to move, the suspension system 923 draws the inner SMA driving apparatus 921 and the outer SMA driving apparatus 922 downwardly so that the lens 910 is returned to the position of the initial state.

Correspondingly, the suspension system 923 further includes an inner suspension apparatus 9231 and an outer suspension apparatus 9232, wherein the inner suspension apparatus 9231 is disposed on the inner SMA driving apparatus 921, and the outer suspension apparatus 9232 is disposed on the outer SMA driving apparatus 922. The inner suspension apparatus 9231 provides a force opposite to the inner SMA driving apparatus 921 to pull the SMA driving apparatus 921 downwardly, and draws the lens 910 to return to an initial position by means of the inner SMA driving apparatus 921. The outer suspension apparatus 9232 provides a downward force opposite to the outer driving apparatus 922, and draws the inner SMA driving apparatus 921 and the lens 910 to return to initial positions by means of the outer SMA driving apparatus.

The inner suspension apparatus 9231 of the suspension system 923 is disposed between the lens carrier 9211 and the supporting carrier 9213 of the inner SMA driving apparatus 921 in a manner of being opposite to the inner driving unit 9212 in a different plane. It is worth mentioning that the inner suspension apparatus 9231 and the outer suspension apparatus 9232 of the suspension system 923 are elastic connecting apparatuses or an elastic connecting member, wherein when the inner SMA driving apparatus 921 and/or the outer SMA driving apparatus 922 of the SMA driver 920 drive/drives the lens 910 to move, the inner suspension apparatus 9231 and/or the outer suspension apparatus 9232 of the suspension system 923 are/is drawn by force to produce elastic deformation. When the lens 910 needs to return to the initial position, the inner suspension apparatus 9231 and/or the outer suspension apparatus 9232 of the suspension system 923 will draw the lens 910 to return to the initial position under the elastic action.

Correspondingly, the inner suspension apparatus 9231 further includes at least two inner suspension units 92311, wherein the inner suspension units 92311 are symmetrically disposed on the lens carrier 9211 and the supporting carrier 9213, and wherein the supporting carrier 9213 supports the inner suspension unit 92311 so as to draw the lens carrier 9211 with an elastic force to return to the initial position. The inner suspension unit 92311 is disposed on the lens carrier 9211 and the supporting carrier 9213 in a plane different from the inner driving unit 9212, and provides a force opposite to the inner driving unit 9212. Preferably, in the second preferred embodiment of the present disclosure, the number of the inner suspension units 92311 is four, wherein the inner suspension units 92311 are symmetrically disposed on four sides of the lens carrier 9211.

The outer suspension system 9232 of the suspension system 923 is disposed between the supporting carrier 9213 and the bearing apparatus 9221 of the outer SMA driving apparatus 922 in a plane different from the outer driving unit 9222. The outer suspension apparatus 9232 further includes at least two outer suspension units 92321, wherein the outer suspension units 92321 are symmetrically disposed on the supporting carrier 9213 and the bearing apparatus 9221, and wherein the bearing apparatus 9221 supports the outer suspension unit 92321 so as to draw the supporting carrier 9213 with an elastic force to return to the initial position. The outer suspension unit 92321 is disposed between the supporting carrier 9213 and the bearing apparatus 9221 in a plane different from the outer driving unit 9222, and provides a force opposite to the outer driving unit 9222. It is worth mentioning that, in the second preferred embodiment of the present disclosure, the outer suspension unit 92321 and the outer driving unit are in mutually different planes but are not in contact with each other. Preferably, in the second preferred embodiment of the present disclosure, the number of the outer suspension units 92321 is four, wherein the outer suspension units 92321 are symmetrically disposed on four sides of the supporting carrier 9213.

It is worth mentioning that in the second preferred embodiment of the present disclosure, the bearing apparatus 9221 of the outer SMA driving apparatus 922 and the housing 960 of the camera apparatus are an integral structure. In other words, the housing 960 and the bearing apparatus 9221 are the same apparatus. It can be understood that, in the present disclosure, the implementations of the housing 960 and the bearing apparatus 9221 are merely exemplary in nature here, and not limiting.

As shown in FIG. 18, the lens carrier 9211 of the inner SMA driving apparatus 921 includes a carrier main body 92111 and at least one lens accommodating cavity 92112, wherein the lens accommodating cavity 92112 is formed on the carrier main body 92111. The lens 910 is disposed and mounted on the carrier main body 92111 through the lens accommodating cavity 92112, wherein the carrier main body 92111 drives the lens 910 to move when receiving the driving force of the inner driving unit 9212 and drives the lens 910 to return to the initial position when receiving the force of the inner suspension unit 92311. The carrier main body 92111 of the lens carrier 9211 is further provided with a carrier inner wall 92113, wherein the lens 910 is disposed and mounted on the carrier inner wall 92113 of the carrier main body 92111. Preferably, in the second preferred embodiment of the present disclosure, the lens 910 is mounted on the carrier inner wall 92113 of the carrier main body 92111 in a threaded connection manner. It can be understood that, in the present disclosure, the connection manner of the lens 910 and the carrier main body 92111 is merely exemplary in nature here, and not limiting. Thus, the lens 910 may also be disposed on the carrier inner wall 92113 of the carrier main body 92111 in other mounting manners such as a glued manner.

As an example, in the second preferred embodiment of the present disclosure, the lens carrier 9211 of the SMA driving apparatus 921 is embodied as a supporting frame with a rectangular or square surface, wherein the inner driving unit 9212 and the inner suspension unit 92311 are symmetrically disposed on the side surfaces of the lens carrier 9211 in different planes. It can be understood that, in the present disclosure, the shape of the lens carrier 9211 is merely exemplary in nature here, and not limiting. Therefore, the lens carrier 9211 may also be embodied as a supporting frame with other shapes, such as a frame with a hexagonal surface.

Correspondingly, the lens carrier 9211 is further provided with four carrier outer walls 92114, wherein the inner driving unit 9212 and the inner suspension unit 92311 are disposed at one end to be driven or drawn on the carrier outer walls 92114 of the lens carrier 9211 to drive or draw the movement of the lens carrier 9211.

The supporting carrier 9213 of the inner SMA driving apparatus 921 is disposed outside the lens carrier 9211, wherein the supporting carrier 9213 is suspended in the accommodating space 961 by the outer SMA driving apparatus 922 and the outer suspension apparatus 9232 of the suspension system 923. The supporting carrier 9213 includes at least two supporting carrier units 92131, wherein the supporting carrier units 92131 are symmetrically disposed on both sides of the lens carrier 9211, and the supporting carrier 9213 is drivingly connected to the lens carrier 9211 and the bearing apparatus 9221 by means of the supporting carrier units 92131. Preferably, in the second preferred embodiment of the present disclosure, the number of the supporting carrier units 92131 of the supporting carrier 9213 is four, and the supporting carrier units 92131 are symmetrically disposed on four side surfaces of the lens carrier 9211.

Preferably, the supporting carrier 9213 is a rectangular ring-shaped supporting frame, wherein the supporting carrier units 92131 of the supporting carrier 9213 are connected to each other to form an integral structure. In other words, the supporting carrier units 92131 of the supporting carrier 9213 are sequentially connected to form the ring-shaped supporting frame.

Correspondingly, the supporting carrier units 92131 of the supporting carrier 9213 form an inner drive space 92132, wherein the supporting carrier units 92131 of the supporting carrier 9213 support the inner driving unit 9212 in the inner drive space 92132, and draw the lens carrier 9211 to move in a manner of thermal shrinkage. It can be understood that the lens carrier 9211 is driven by the inner driving unit 9212 to move in the inner drive space 92132, wherein the inner drive space 92132 moves with the movement of the supporting carrier unit 92131 of the supporting carrier 9213. It can be understood that the inner space 92132 of the supporting carrier 9213 penetrates upper and lower ends of the supporting carrier 9213, wherein the lens carrier 9211 is driven to move in the inner drive space 92132.

The supporting carrier unit 92131 of the supporting carrier 9213 is further provided with a carrier inner side surface 921311 and a carrier outer side surface 921312, wherein the carrier inner side surface 921311 faces towards the inner drive space 92132 of the supporting carrier 9213, and the carrier outer side surface 921312 faces towards the outside of the supporting carrier 9213. One end part of the inner driving unit 9212 and one end part of the inner suspension apparatus 9231 are connected to the carrier inner side surface 921311 of the carrier unit 92131, and provide the inner driving unit 9212 and the inner suspension apparatus 9231 with forces by means of the carrier inner side surface 921311. One end part of the outer driving unit 9222 and one end part of the outer suspension apparatus 9232 are disposed to be connected to the carrier outer side surface 921312 of the supporting carrier unit 92131, wherein the outer driving unit 9222 and the outer suspension apparatus 9232 apply forces to the supporting carrier 9213 by means of the carrier outer side surface 921312 to drive the movement of the supporting carrier 9213 and hold the supporting carrier 9213 at the imaging position.

Figure 19A:
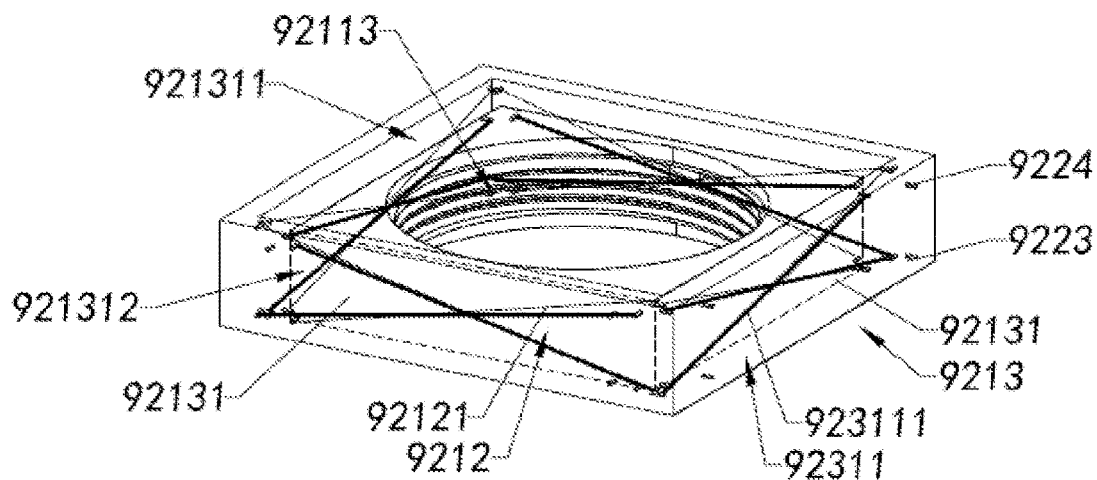
FIG. 19A is a schematic view of an inner driving unit and an outer driving unit of the SMA driver of the camera apparatus according to the above preferred embodiment of the present disclosure.
Figure 19B:
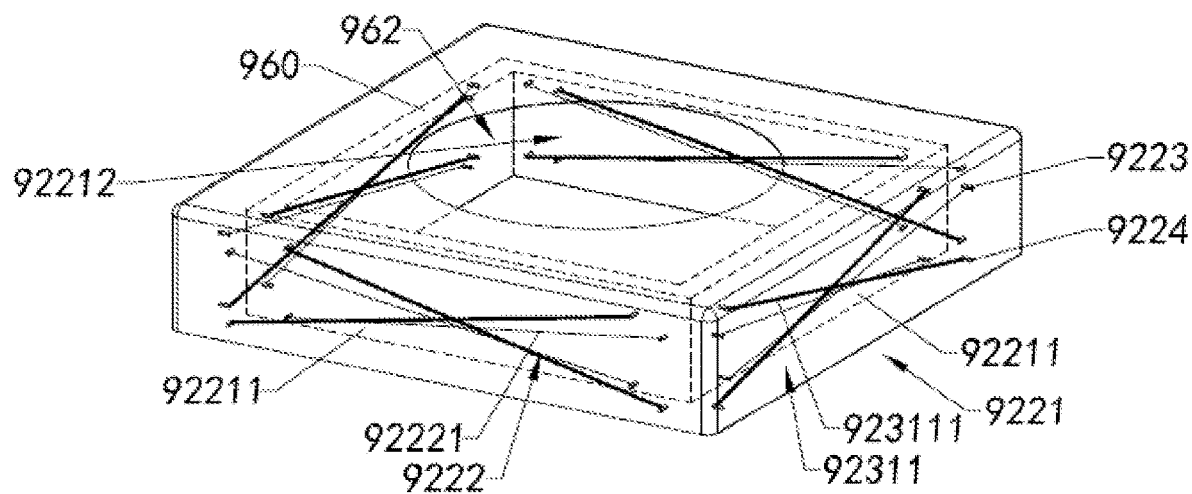
FIG. 19B is a schematic view of a suspension system of the SMA driver of the camera apparatus according to the above preferred embodiment of the present disclosure.

As shown in FIGS. 18 to 19B, the inner driving unit 9212 drivingly connects the lens carrier 9211 to the supporting carrier 9213, wherein the inner driving unit 9212 drives the lens carrier 9211 to move in a manner of thermal shrinkage under the supporting action of the supporting carrier 9213. The inner driving unit 9212 further includes at least one inner drive SMA line 92121, wherein the inner drive SMA line 92121 is disposed to drivably connect the lens carrier 9211 to the supporting carrier 9213. In the second preferred embodiment of the present disclosure, the lens carrier 9211 is driven by the inner driving unit 9212 to move upward. Correspondingly, the inner drive SMA line 92121 is connected to a lower end of the lens carrier 9211 and is connected to an upper end of the supporting carrier 9213, and the inner drive SMA line 92121 is supported by means of the supporting carrier 9213 to draw the lens carrier 9211 to move upward.

Preferably, in the second preferred embodiment of the present disclosure, the number of the inner drive SMA lines 92121 of the inner driving unit 9212 is two, and the inner drive SMA lines 92121 are connected to the lower end of the lens carrier 9211 and the upper end of the supporting carrier 9213 in different planes. It can be understood that when the inner drive SMA line 92121 of the inner driving unit 9212 thermally shrinks, the lens carrier 9211 is provided with an obliquely upward supporting force along a direction of the inner drive SMA line 92121. It can be understood that the inner drive SMA lines 92121 of the same inner driving unit 9212 are connected to the lens carrier 9211 and the supporting carrier 9213 in mutually different planes. Therefore, when the inner drive SMA lines 92121 disposed in the mutually different planes drive the lens carrier 9211 with the same amount of thermal shrinkage, forces of driving forces provided by the inner drive SMA lines 92121 in the mutually different planes in the horizontal direction cancel each other out, and the lens carrier 9211 is driven to move along the direction of the optical axis.

As shown in FIG. 19A, one of the inner drive SMA lines 92121 of the inner driving unit 9212 is connected from a lower left end part of the lens carrier 9211 to an upper right end part of the supporting carrier 9213, and the other inner drive SMA line 92121 is connected from the lower right end part of the lens carrier 9211 to an upper left end part of the supporting carrier 9213, so that the two inner drive SMA lines 92121 are in mutually different planes. It is worth mentioning that the two inner drive SMA lines 92121 are in mutually different planes, but are not in contact with each other. The inner drive SMA lines 92121 is disposed on two diagonal connecting lines, so that left and right components of the driving force generated by the inner drive SMA lines 92121 during synchronous thermal shrinkage cancel each other out, and only an obliquely upward force is generated. It can be understood that component forces of the driving forces provided by the two inner driving units 9212 opposite to the lens carrier 9211 in the horizontal direction can cancel each other out, and only a force along the direction of the optical axis O is generated to drive the lens 910 to move along the direction of the optical axis O.

Optionally, in the second preferred embodiment of the present disclosure, the inner driving unit 9212 includes two or more inner drive SMA lines 92121, wherein the inner drive SMA lines 92121 are connected to the lower end of the lens carrier 9211 and are connected to the upper end of the supporting carrier 9213, and the lens carrier 9211 is provided with a supporting force by means of the inner drive SMA lines 92121.

As shown in FIGS. 18 to 19B, the inner suspension unit 92311 of the inner suspension apparatus 9231 is connected to the lens carrier 9211 and the supporting carrier 9213 in a plane different from the inner driving unit 9212, wherein the inner suspension unit 92311 provides the lens carrier 9211 with a supporting force opposite to the inner driving unit 9212. The inner suspension unit 92311 further includes at least one inner suspension wire 923111, wherein the inner suspension wire 923111 is disposed to connect an upper end of the lens carrier 9211 to a lower end part of the supporting carrier 9213. The inner suspension apparatus 9231 and the outer suspension apparatus 9232 of the suspension system 923 are both connecting apparatuses with an elastic support or elastic traction function, wherein the inner suspension wire 923111 generates elastic deformation under force, and when the inner driving unit 9212 cools and relaxes, the inner suspension wire 923111 draws the lens carrier 9211 to return to the initial position under the elastic action.

It is worth mentioning that the inner suspension wire 923111 of the inner suspension unit 92311 is a metal wire with an elastic connection function, or an elastic metal line. Optionally, in the second preferred embodiment of the present disclosure, the inner suspension wire 923111 may also be embodied as an SMA line, wherein when the inner suspension unit 92311 is heated, the inner suspension wire 923111 shrinks and generates an elastic force that drives the lens 9211 to return.

Preferably, in the second preferred embodiment of the present disclosure, the number of the inner suspension wires 923111 of the inner suspension unit 92311 is two, wherein the inner suspension wires 923111 are connected to the lens carrier 9211 and the supporting carrier 9213 in mutually different planes. One end part of the inner suspension wire 923111 is disposed to be connected to an upper end part of the lens carrier 9211, and the other end part of the inner suspension wire 923111 is disposed to be connected to a lower end part of the supporting carrier 9213.

As shown in FIGS. 18 and 19B, one end part of one of the inner suspension wires 923111 of the inner suspension unit 92311 is connected to an upper left end part of the lens carrier 9211 and a lower right end part of the supporting carrier 9213, and one end of the other inner suspension wire 923111 is connected to an upper right end part of the carrier 9211 and a lower left end part of the supporting carrier 9213, so that the inner suspension wires 923111 of the inner suspension unit 92311 are in different planes. The inner suspension wires 923111 of the inner suspension unit 92311 are not in contact with each other. It can be understood that the inner driving unit 9212 on the same side of the lens carrier 9211 is in a plane different from the inner suspension unit 92311.

The inner SMA driving apparatus 921 further includes a plurality of inner SMA line fixing apparatuses 9214 and a plurality of inner suspension wire fixing apparatuses 9215, wherein the inner SMA line fixing apparatuses 9214 are disposed on the carrier outer wall 92114 of the lens carrier 9211 and the carrier inner side surface 921311 of the supporting carrier 9213. The inner SMA line fixing apparatus 9214 fixes the inner drive SMA line 92121 on the carrier outer wall 92114 of the lens carrier 9211 and the carrier inner side surface 921311 of the supporting carrier 9213. It can be understood that the inner SMA line fixing apparatus 9214 is fixedly disposed on left and right sides of a lower end of the carrier outer wall 92114 of the lens carrier 9211, and is fixedly disposed on left and right sides of an upper end of the carrier inner side surface 921311 of the supporting carrier 9213.

Preferably, in the second preferred embodiment of the present disclosure, the inner SMA line fixing apparatus 9214 is integrally formed on the carrier outer wall 92114 of the lens carrier 9211, and is integrally formed on the carrier inner side surface 921311 of the supporting carrier 9213. In other words, the inner SMA line fixing apparatus 9214 is integrally formed on the lens carrier 9211 and the supporting carrier 9213.

It is worth mentioning that the inner drive SMA line 92121 is disposed to be connected to the inner SMA line fixing apparatus 9214, and by means of the inner SMA line fixing apparatus 9214, the inner drive SMA line 92121 is fixedly connected to the lens carrier 9211, and the inner drive SMA line 92121 is fixedly connected to the supporting carrier 9213. The inner SMA line fixing apparatus 9214 is connected to one end part of the inner drive SMA line 92121 in a manner of crimping, welding or winding connection. It is worth mentioning that in the present disclosure, the connection relationships between the inner SMA line fixing apparatus 9214 and the inner suspension wire fixing apparatus 9215, and the lens carrier 9211 and the supporting carrier 9213 are merely exemplary in nature here, and not limiting. Therefore, the inner SMA line fixing apparatus 9214 and the inner suspension wire fixing apparatus 9215 may also be embodied to be connected to the lens carrier 9211 and the supporting carrier 9213 in an embedded/engaged mounting manner.

The inner suspension wire fixing apparatus 9215 is disposed on the carrier outer wall 92114 of the lens carrier 9211 and the carrier inner side surface 921311 of the supporting carrier 9213. The inner suspension wire fixing apparatus 9215 fixes the inner suspension wire 923111 to the carrier outer wall 92114 of the lens carrier 9211 and the carrier inner side surface 921311 of the supporting carrier 9213. It can be understood that the inner suspension wire fixing apparatus 9215 is fixedly disposed on left and right sides of an upper end of the carrier outer wall 92114 of the lens carrier 9211, and is fixedly disposed on left and right sides of a lower end of the carrier inner side surface 921311 of the supporting carrier 9213.

Preferably, in the second preferred embodiment of the present disclosure, the inner suspension wire fixing apparatus 9215 is integrally formed on the carrier outer wall 92114 of the lens carrier 9211, and is integrally formed on the carrier inner side surface 921311 of the supporting carrier 9213.

As shown in FIGS. 16 to 18, the outer SMA driving apparatus 922 of the SMA driver 920 and the outer suspension apparatus 9232 of the suspension system 923 jointly support the inner SMA driving apparatus 921 in the accommodating space 961, and drive the inner SMA driving apparatus 921 to move in the accommodating space 961.

In detail, the outer driving unit 9222 of the outer SMA driving apparatus 922 further includes at least one outer drive SMA line 92221, wherein the outer drive SMA line 92221 telescopically drivably connects the supporting carrier 9213 to the bearing apparatus 9221, wherein the outer drive SMA line 92221 drives the movement of the supporting carrier 9213 of the inner SMA driving apparatus 921 in a manner of thermal shrinkage under the supporting action of the bearing apparatus 9221, and the movement of the lens carrier 9211 and the lens 910 is driven by means of the supporting carrier 9213.

One end part of the outer drive SMA line 92221 is disposed to be connected to an upper end of the bearing apparatus 9221, wherein the other end part of the outer drive SMA line 92221 is disposed to be connected to a lower end of the supporting carrier 9213, and when the outer drive SMA line 92221 is driven by thermal shrinkage, the bearing apparatus 9221 supports the outer drive SMA line 92221 so that the outer drive SMA line 92221 draws the supporting carrier 9213 to move upward. Preferably, in the second preferred embodiment of the present disclosure, the outer drive SMA lines 92221 of each of the outer driving units 9222 are connected to the supporting carrier 9213 and the bearing apparatus 9221 in mutually different planes, and the outer drive SMA lines 92221 are in the mutually different planes.

Correspondingly, the bearing apparatus 9221 further includes at least two bearing units 92211, wherein the bearing units 92211 are symmetrically disposed on the outer side of the supporting carrier 9213 to support and connect the outer driving unit 9222. The bearing unit 92211 supports the outer driving unit 9222 to drive the movement of the inner SMA driving apparatus 921 in a manner of thermal shrinkage. Preferably, in the present disclosure, the number of the bearing units 92211 of the bearing apparatus 9221 is four, wherein the bearing apparatus 9221 is an integral bearing frame disposed on the supporting carrier 9213, and wherein the bearing units 92211 of the bearing apparatus 9221 are sequentially connected to each other to form the bearing frame. Preferably, the bearing apparatus 9221 and the housing 960 of the camera apparatus are the same apparatus, wherein the bearing apparatus 9221 is formed by surrounding the accommodating space 961, and the inner SMA driving apparatus 921 is driven by means of the outer driving unit 9222 to move in the accommodating space 961.

The bearing unit 92211 of the bearing apparatus 9221 further has a bearing surface 92212, wherein the outer driving unit 9222 and the outer suspension apparatus 9232 of the suspension system 923 are drivably connected to the bearing surface 92212 of the bearing unit 92211 and the carrier outer side surface 921312 of the supporting carrier 9213. In detail, the outer drive SMA line 92221 of the outer driving unit 9222 is drivably connected to an upper left end of the bearing surface 92212 of the bearing unit 9221 and a lower right end of the carrier outer side surface 921312 of the supporting carrier 9213. The other outer drive SMA line 92221 is drivably connected to an upper right end of the bearing surface 92212 of the bearing unit 92211 and lower left end of the carrier outer side surface 921312 of the supporting carrier 9213, so that the outer drive SMA lines 92221 are in the mutually different planes, forces of the outer drive SMA lines 92221 in the horizontal direction cancel each other out, and the inner SMA driving apparatus 921 is driven to move along the direction of the optical axis O.

The outer suspension unit 92321 of the outer suspension apparatus 9232 is disposed to provide the supporting carrier 9213 with a force opposite to the driving unit 9222. Correspondingly, the outer suspension unit 92321 includes at least one outer suspension wire 923211, wherein the outer suspension wire 923211 is disposed to be connected to the bearing surface 92212 of the bearing apparatus 9221 by the carrier outer side surface 921312 of the supporting carrier 9213. The outer suspension wire 923211 provides the supporting carrier 9213 with a force opposite to the outer driving unit 9222 based on the bearing surface 92212 of the bearing apparatus 9221. One end part of the outer suspension wire 923211 is disposed to be connected to an upper end of the supporting carrier 9213, wherein the other end part of the outer suspension wire 923211 is disposed to be connected to a lower end of the bearing apparatus 9221.

Preferably, in the second preferred embodiment of the present disclosure, the number of the outer suspension wires 923211 of each of the outer suspension units 92321 is two, wherein the outer suspension wires 923211 are connected to the supporting carrier 9213 and the bearing apparatus 9221 in mutually different planes. It is worth mentioning that the outer suspension wire 923211 of the outer suspension unit 92321 is in a plane different from the outer drive SMA line 92221 of the outer driving unit 9222, so that the outer suspension apparatus 9232 provide a force opposite to the outer SMA driving apparatus 9222.

It is worth mentioning that the outer suspension wire 923211 of the outer suspension unit 92321 is a metal wire with an elastic connection function, or an elastic metal line. Optionally, in the second preferred embodiment of the present disclosure, the outer suspension wire 923211 may also be embodied as an SMA line, wherein when the outer suspension unit 92321 is heated, the outer suspension wire 923211 shrinks and generates an elastic force that drives the lens 9211 to return.

Correspondingly, the outer suspension wire 923211 is disposed to be connected to an upper left end part of the carrier outer side surface 921312 of the supporting carrier 9213 and a lower right end part of the bearing surface 92212 of the bearing apparatus 9221, wherein the other outer suspension wire 923211 is disposed to be connected to an upper right end part of the carrier outer side surface 921312 of the supporting carrier 9213 and a lower left end part of the bearing surface 92212 of the bearing apparatus 9221.

The outer SMA driving apparatus 922 of the SMA driver 920 further includes a plurality of outer SMA line fixing apparatuses 9223 and a plurality of outer suspension wire fixing apparatuses 9224, wherein the outer SMA line fixing apparatus 9223 fixes one end of the outer drive SMA line 92221 to a lower end of the carrier outer side surface 921312 of the supporting carrier 9213, and fixes the other end of the SMA line 92221 to an upper end of the bearing surface 92212 of the bearing apparatus 9221. The outer suspension wire fixing apparatus 9224 fixes the outer suspension wire 923211 to an upper end of the carrier outer side surface 921312 of the supporting carrier 9213, and fixes the other end of the outer suspension wire 923211 to a lower end of the bearing surface 92212 of the bearing apparatus 9221.

Preferably, in the second preferred embodiment of the present disclosure, the outer SMA line fixing apparatus 9223 and the outer suspension wire fixing apparatus 9224 are integrally disposed on the carrier outer side surface 921312 of the supporting carrier 9213 and are integrally disposed on the bearing surface 92212 of the bearing apparatus 9221. It can be understood that in the second preferred embodiment of the present disclosure, the outer SMA line fixing apparatus 9223 and the outer suspension wire fixing apparatus 9224 are fixedly connected to the SMA line and the suspension wire in a crimping and fixing manner. Optionally, the SMA line fixing apparatus 9223 and the outer suspension wire fixing apparatus 9224 may also be connected to the outer drive SMA line in a manner of welding, winding connection, or glued connection. It is worth mentioning that, in the present disclosure, the connection manners between the outer SMA line fixing apparatus 9223 and the outer suspension wire fixing apparatus 9224, and the carrier outer side surface 921312 of the supporting carrier 9213 and the bearing surface 92212 of the bearing apparatus 9221 are merely exemplary in nature here, and not limiting. Therefore, the outer SMA line fixing apparatus 9223 and the outer suspension wire fixing apparatus 9224 may also be connected to the supporting carrier 9213 and the bearing apparatus 9221 in other connection manners, such as an embedded/engaged mounting manner.

As shown in FIG. 18, the SMA driver 920 further includes a supporting base 924, wherein the supporting base 924 is disposed below the bearing apparatus 9221.

The bearing apparatus 9221 is fixed to the supporting base 924, and by means of the supporting base 924, the bearing apparatus 9221 is fixedly connected to the lens holder 930. It can be understood that the inner SMA driving apparatus 921 and the outer SMA driving apparatus 922 of the SMA driver 920 drive the lens 910 to move in the accommodating space 961 under the supporting action of the supporting base 924.

Figure 20A:
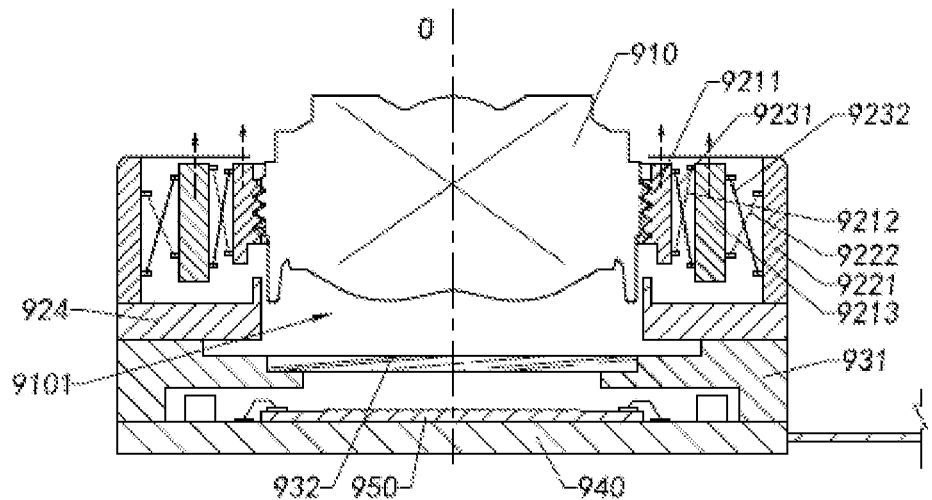
FIG. 20A is a schematic view of the SMA driver of the camera apparatus according to the above preferred embodiment of the present disclosure driving a lens to translate upward.
Figure 20B:
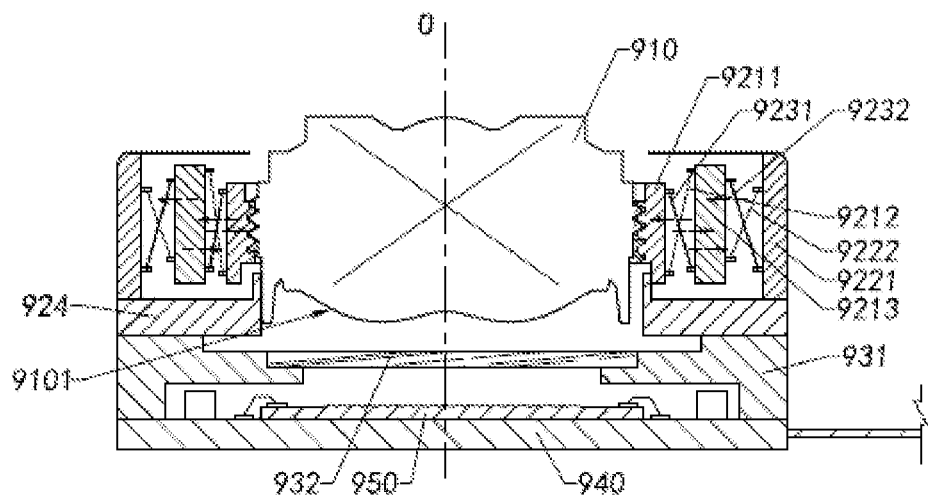
FIG. 20B is a schematic view of the SMA driver of the camera apparatus according to the above preferred embodiment of the present disclosure driving the lens to move in a horizontal direction.
Figure 20C:
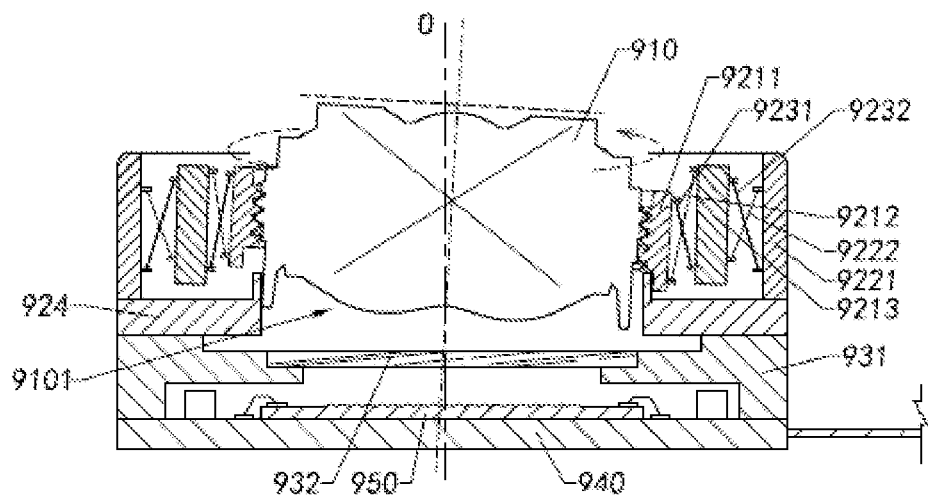
FIG. 20C is a schematic view of the SMA driver of the camera apparatus according to the above preferred embodiment of the present disclosure driving the lens to rotate in a spatial direction.

As shown in FIGS. 20A to 20C, the inner SMA driving apparatus 921 and the outer SMA driving apparatus 922 of the SMA driver 920 drive the lens 910 to move in the accommodating space 961, wherein under the joint cooperative action of the inner driving unit 9212 of the inner SMA driving apparatus 921 and the outer driving unit 9222 of the outer SMA driving apparatus 922, the lens 910 is driven to move in the accommodating space 961 in a manner of translation or rotation. It is worth mentioning that, in the second preferred embodiment of the present disclosure, when being in the initial position of the camera apparatus, the SMA driver 920 is in a relaxed state without being powered on, the lens 910 of the camera apparatus is at the lowest end. The SMA driver 920 thermally shrinks when being powered on and drives the lens 910 to move upward. When the lens 910 is driven to move to an imaging position, the suspension system 923 draws the inner SMA driving apparatus 921 and the outer SMA driving apparatus 922, and by means of the lens carrier 9211, the lens 910 is driven to return to the initial position.

As shown in FIG. 20A, when the inner driving units 9212 on opposite sides of the inner SMA driving apparatus 921 drive the lens carrier 9211 in the same amount of thermal shrinkage to move, the lens carrier 9211 and the outer suspension wire 923211 are disposed to be connected to the carrier outer side body 9211 of the supporting carrier 9213 to drive the lens 910 to move upward along the direction of the optical axis O. Correspondingly, when the outer driving units 9222 on opposite sides of the outer SMA driving apparatus 922 drive the inner SMA driving apparatus 921 in the same amount of thermal shrinkage to move, the lens carrier 9211 of the inner SMA driving apparatus 921 drives the lens 910 to move upward along the direction of the optical axis O.

As shown in FIG. 20B, when the inner driving units 9212 on left and right (or front and rear) sides of the inner SMA driving apparatus 921 drive the lens carrier 9211 in different amounts of thermal shrinkage to move; or when only one of the two inner driving units 9212 on opposite sides of the inner SMA driving apparatus 921 thermally shrinks and drives, and the other inner SMA driving apparatus 921 is in a relaxed state, the lens carrier 9211 receives a force in the horizontal direction and drives the lens 910 to move right and left (or back and forth) in the horizontal direction. Correspondingly, when the outer driving units 9222 on left and right (or front and rear) sides of the outer SMA driving apparatus 922 drive the inner SMA driving apparatus 921 in different amounts of thermal shrinkage to move; or when only one of the two outer driving units 9222 on opposite sides of the outer SMA driving apparatus 922 thermally shrinks and drives the inner SMA driving apparatus 921 to move, and the other outer driving unit 9222 is in a relaxed state, the inner SMA driving apparatus 921 receives a force in the horizontal direction, and by means of the inner SMA driving apparatus 921, the lens 910 is driven to move right and left (or back and forth) in the horizontal direction.

As shown in FIG. 20C, all inner driving units 9212 of the inner SMA driving apparatus 921 and all outer driving units 9222 of the outer SMA driving apparatus 922 each drive the lens 910 with a different driving force to move in the accommodating space 961 in a manner of rotation. It can be understood that when the inner drive SMA lines 92121 of the same inner driving unit 9212 are driven with different amounts of thermal shrinkage, the lens carrier 9211 is driven by the inner driving unit 9212 with an oblique force and drives the lens 910 to move obliquely. It can be understood that the inner driving units 9212 of different positions of the inner SMA driving apparatus 921 and the outer driving units 9222 of different positions of the outer SMA driving apparatus 922 are controlled to drive the lens carrier 9211 with different amounts of thermal shrinkage to move in a manner of tilting and drive the lens 910 to tilt.

Figure 21A:
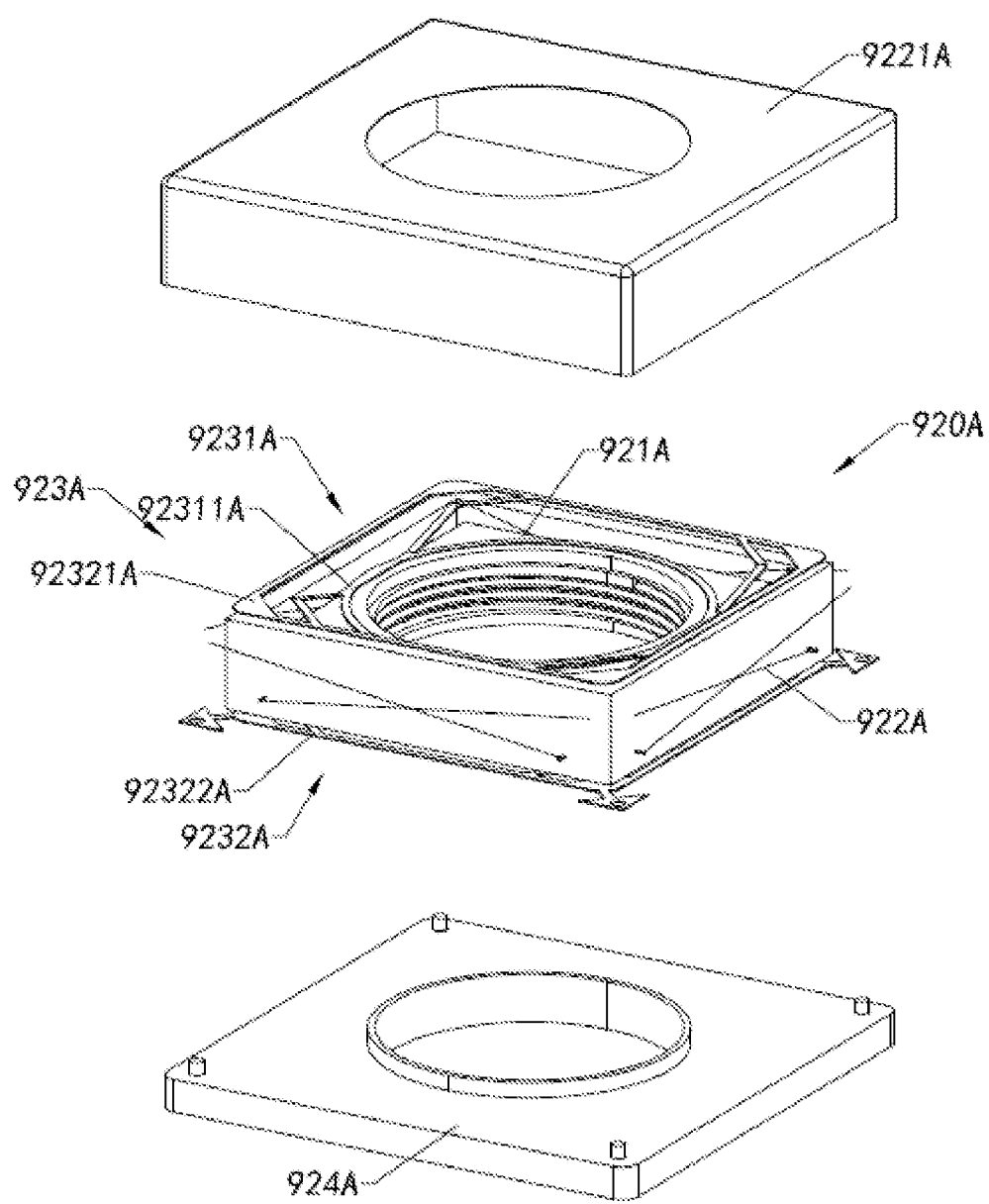
FIG. 21A is an overall schematic view of another optional embodiment of an SMA driver of the camera apparatus according to the above preferred embodiment of the present disclosure.
Figure 21B:
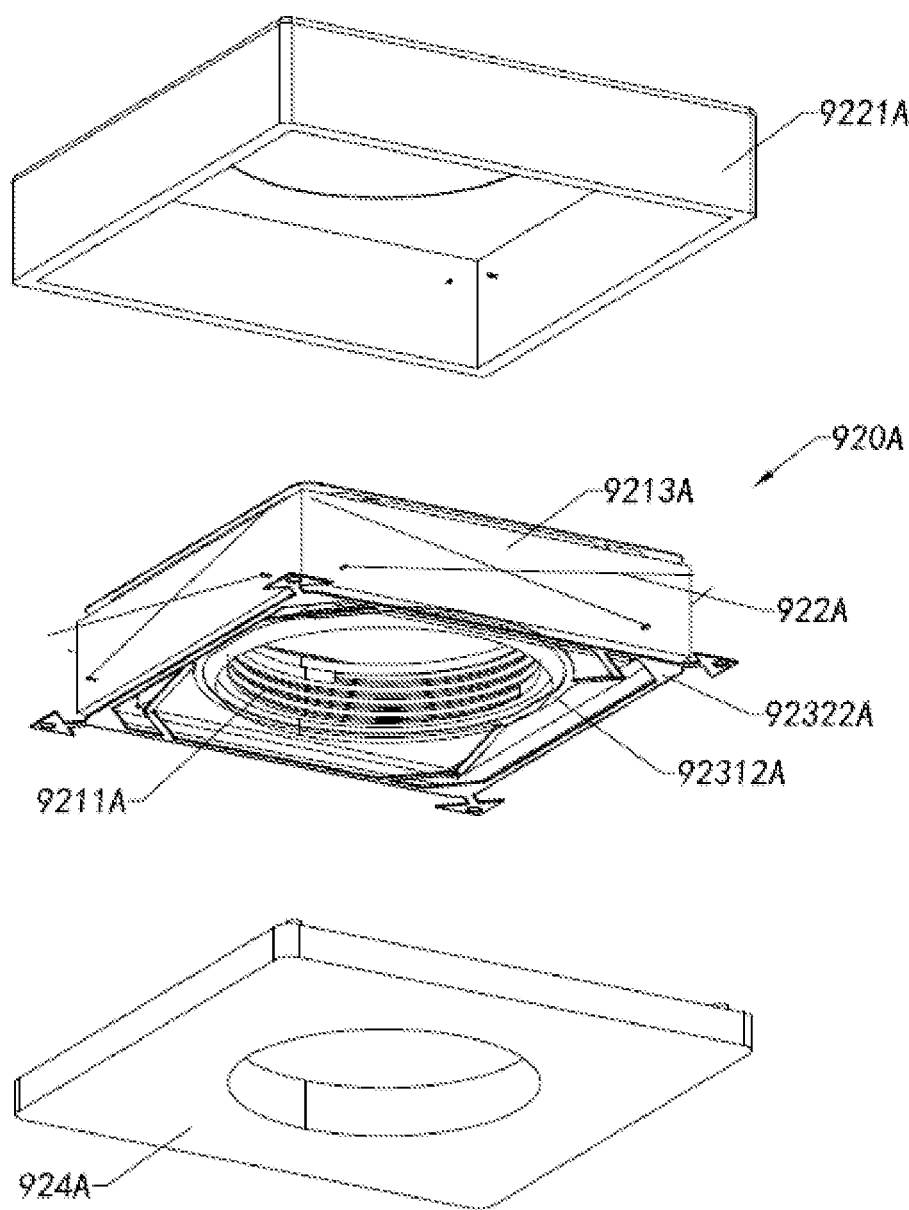
FIG. 21B is another overall schematic view of the SMA driver of the camera apparatus according to the above preferred embodiment of the present disclosure.
Figure 22:
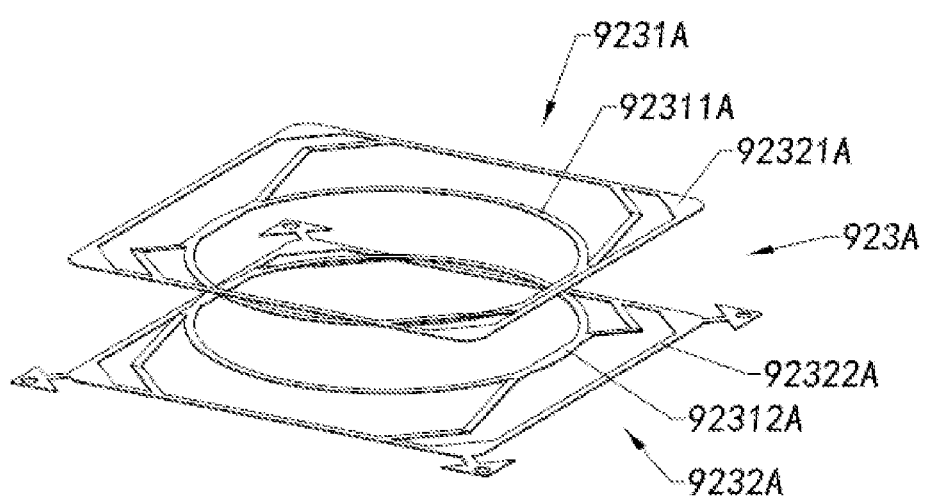
FIG. 22 is a schematic view of a suspension system of the SMA driver of the camera apparatus according to the above preferred embodiment of the present disclosure.

Referring to FIGS. 21A to 22 of the drawings of the specification of the present disclosure, another optional implementation of an SMA driver 920A of the camera apparatus according to the second preferred embodiment of the present disclosure is explained in the following description. The SMA driver 920A includes an inner SMA driving apparatus 921A, an outer SMA driving apparatus 922A, at least one suspension system 923A, and a supporting base 924A. It is worth mentioning that, in the optional implementation of the SMA driver 920A of the present disclosure, the inner SMA driving apparatus 921A and the outer SMA driving apparatus 922A, as well as the supporting base 924A have the same structures and functions as the inner SMA driving apparatus 921 and the outer SMA driving apparatus 922, as well as the supporting base 924 of the above-described second preferred embodiment except for the suspension system 923A.

Correspondingly, the inner SMA driving apparatus 921A includes a lens carrier 9211A, at least two inner driving units 9212A, and a supporting carrier 9213A, and the outer SMA driving apparatus 922A includes a bearing apparatus 9221A and at least two outer driving units 9222A.

The suspension system 923A supports the lens carrier 9211A and the supporting carrier 9213A of the SMA driving apparatus 921A, and provides forces opposite to the inner SMA driving apparatus 921A and the outer SMA driving apparatus 922A. The lens 910 is held under the cooperative action of the suspension system 923A, the inner SMA driving apparatus 921A and the outer SMA driving apparatus 922A, and when the lens 910 is moved to an imaging position, the lens 910 is drawn by means of the suspension system 923A through the lens carrier 9211A to return to the initial position. The suspension system 923A further includes an inner suspension apparatus 9231A and an outer suspension apparatus 9232A, wherein the inner suspension apparatus 9231A is disposed on the lens carrier 9211A of the inner SMA driving apparatus 921A, and provides a force opposite to the inner SMA driving apparatus 921A. The outer suspension apparatus 9232A is disposed on the supporting carrier 9213A of the inner SMA driving apparatus 921A, and provides a force opposite to the outer SMA driving apparatus 922A.

In this modified embodiment of the present disclosure, the inner suspension apparatus 9231A is embodied as an elastic piece apparatus supporting the lens carrier 9211A, wherein the inner suspension apparatus 9231A further includes an inner suspension upper elastic piece 92311A and an inner suspension lower elastic piece 92312A. The inner suspension upper elastic piece 92311A is disposed above the lens carrier 9211A, and the inner suspension upper elastic piece 92311A provides the lens carrier 9211A with a downward supporting force. The inner suspension lower elastic piece 92312A is disposed on a lower end of the lens carrier 9211A, and provides the lens carrier 9211A with an upward supporting force. Correspondingly, the inner suspension lower elastic piece 92312A is disposed on the supporting base 924A, and the inner suspension lower elastic piece 92312A is supported upwardly by means of the supporting base 924A.

The outer suspension apparatus 9232A is embodied as an elastic supporting apparatus that supports the supporting carrier 9213A, wherein the outer suspension apparatus 9232A further includes an outer suspension upper elastic piece 92321A and an outer suspension lower elastic piece 92322A, and wherein the outer suspension upper elastic piece 92321A is disposed above the supporting carrier 9213A, and the outer suspension lower elastic piece 92322A is disposed below the supporting carrier 9213A. The outer suspension apparatus 9232A provides the supporting carrier 9213A with a force opposite to the outer SMA driving apparatus 922A, so that the supporting carrier 9213A drives the lens 910 to return to the initial position. Correspondingly, the outer suspension lower elastic piece 92322A of the outer suspension apparatus 9232A is disposed on the supporting base 924A, and the lower elastic piece 92322A is supported upwardly by the supporting base 924A.

Preferably, in the second preferred embodiment of the present disclosure, the inner suspension upper elastic piece 92311A and the inner suspension lower elastic piece 92312A of the inner suspension apparatus 9231A, and the outer suspension upper elastic piece 92321A and the outer suspension lower elastic piece 92322A of the outer suspension apparatus 9232A are metal elastic apparatuses with an elastic supporting function. When the SMA driving device 920A drives the lens 910 to move upward, the inner suspension upper elastic piece 92311A and the outer suspension upper elastic piece 92321A are driven to undergo elastic deformation. When the lens 910 needs to return to the initial position, the inner suspension upper elastic piece 92311A and the outer suspension upper elastic piece 92321A drive the lens carrier 9211A and the supporting carrier 9213A to move downward under the elastic action.

Figure 23A:
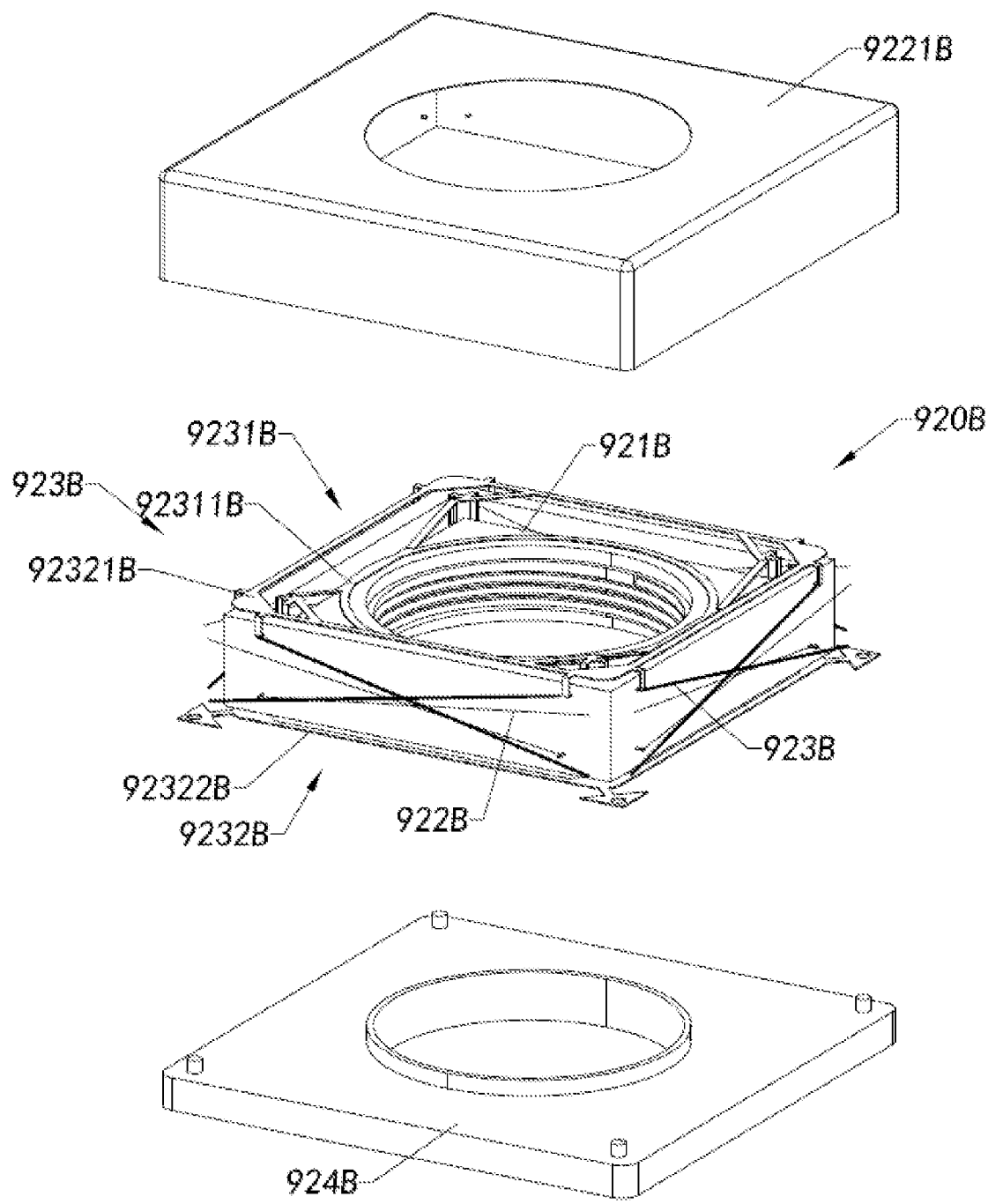
FIG. 23A is an overall schematic view of a second optional embodiment of an SMA driver of the camera apparatus according to the above preferred embodiment of the present disclosure.
Figure 23B:
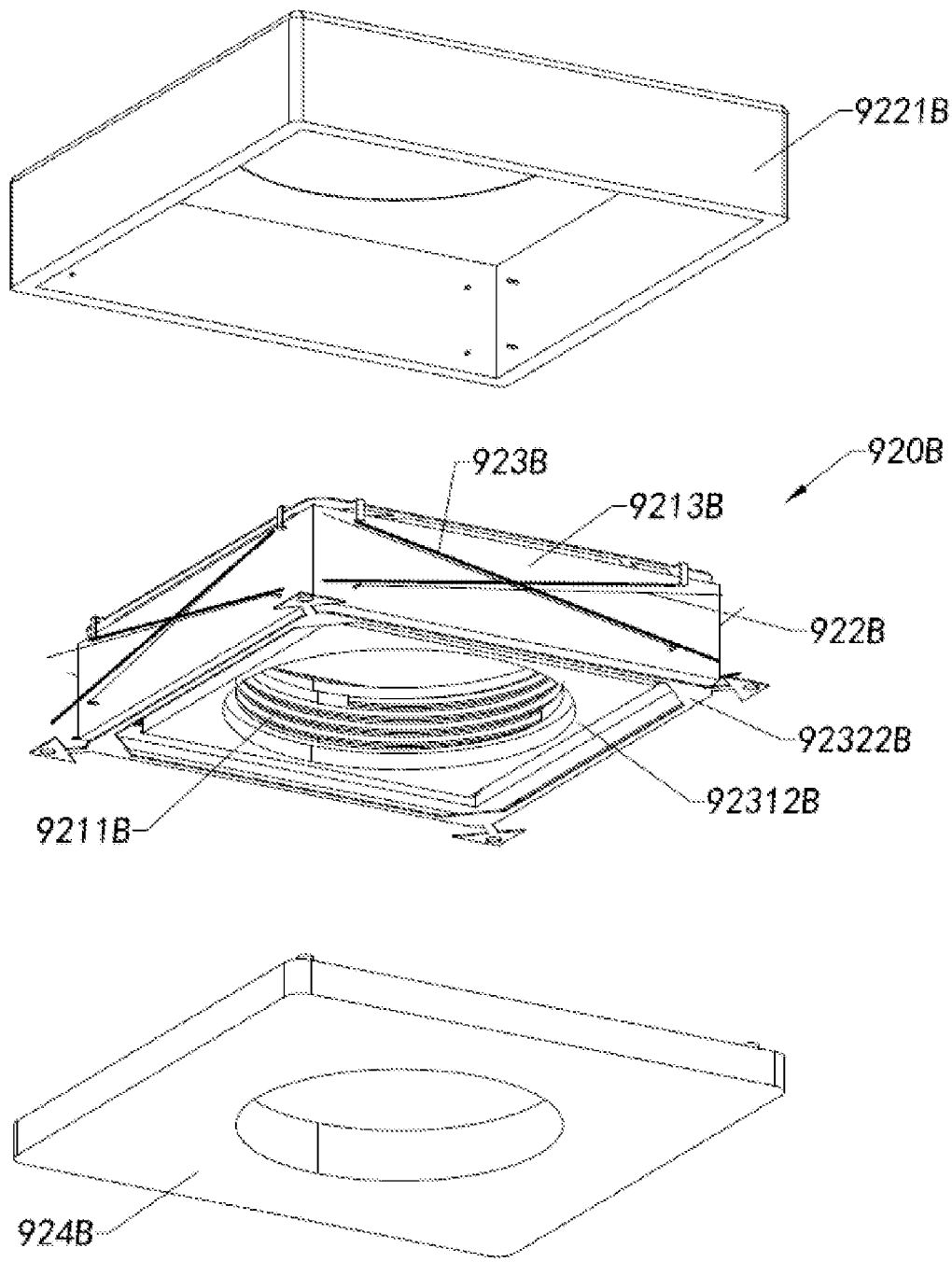
FIG. 23B is another overall schematic view of the SMA driver of the camera apparatus according to the above preferred embodiment of the present disclosure.
Figure 24:
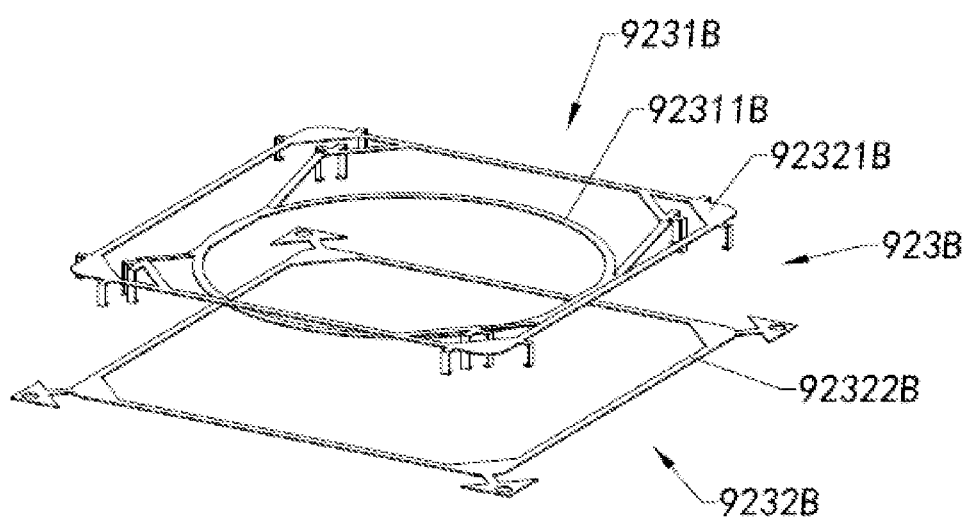
FIG. 24 is a schematic view of a suspension system of the SMA driver of the camera apparatus according to the above preferred embodiment of the present disclosure.

Referring to FIGS. 23A to 24 of the drawings of the specification of the present disclosure, another optional implementation of an SMA driver 920B of the camera apparatus according to the above preferred embodiment of the present disclosure is explained in the following description. The SMA driver 920B includes an inner SMA driving apparatus 921B, an outer SMA driving apparatus 922B, at least one suspension system 923B, and a supporting base 924B. It is worth mentioning that, in the optional implementation of the SMA driver 920B of the present disclosure, the inner SMA driving apparatus 921B and the outer SMA driving apparatus 922B, as well as the supporting base 924B have the same structures and functions as the inner SMA driving apparatus 921 and the outer SMA driving apparatus 922, as well as the supporting base 924 of the above-described second preferred embodiment except for the suspension system 923B.

The suspension system 923B includes an inner suspension apparatus 9231B and an outer suspension apparatus 9232B, wherein the inner suspension apparatus 9231B provides a force opposite to the inner SMA driving apparatus 921B, and wherein the outer suspension apparatus 9232B provides a force opposite to the outer SMA driving apparatus 922B, so that the suspension system 923B, the inner SMA driving apparatus 921B, and the outer SMA driving apparatus 92B jointly support the lens 910 to maintain the position of the lens 910 stable.

In detail, the inner suspension apparatus 9231B further includes an inner suspension upper elastic piece 92311B, at least two inner suspension units 92312B, and an inner suspension lower elastic piece 92313B, wherein the inner suspension upper elastic piece 92311B is disposed above the lens carrier 9211B, the inner suspension lower elastic piece 92313B is disposed below the supporting carrier 9213B, and wherein the inner suspension units 92312B are disposed to be connected to the inner suspension upper elastic piece 92311B and the inner suspension lower elastic piece 92313B. The inner suspension units 92312B apply a downward force to the lens carrier 9211B through the inner suspension lower elastic piece 92313B based on the position of the supporting carrier 9213B. Preferably, in this preferred embodiment of the present disclosure, the number of the inner suspension units 92312B is four, wherein the inner suspension units 92312B are symmetrically disposed around the lens carrier 9211B.

The inner suspension unit 92312B further includes at least one inner suspension wire 923121B, wherein the inner suspension wire 923121B is connected to the inner suspension upper elastic piece 92311B and the inner suspension lower elastic piece 92313B. Preferably, in this optional implementation of the present disclosure, the number of the inner suspension wires 923121B of the inner suspension unit 92312B is two, wherein the inner suspension wires 923121B are connected to the inner suspension upper elastic piece 92311B and the inner suspension lower elastic piece 92313B in different planes. In other words, the inner suspension wires 923121B is connected to a left side of the inner suspension upper elastic piece 92311B and a right side of the inner suspension lower elastic piece 92313B, wherein the other suspension wire 923121B of the inner suspension unit 92312B is connected to a right side of the inner suspension upper elastic piece 92311B and a left side of the inner suspension lower elastic piece 92313B, so that the two suspension wires 923121B of the inner suspension unit 92312B are in different planes.

The outer suspension apparatus 9232B includes an outer suspension upper elastic piece 92321B, at least two outer suspension units 92322B, and an outer suspension lower elastic piece 92323B, wherein the outer suspension upper elastic piece 92321B is disposed above the supporting carrier 9213B, and the outer suspension lower elastic piece 92323B is disposed below the bearing apparatus 9221B, and wherein the outer suspension unit 92322B is disposed to be connected to the outer suspension upper elastic piece 92321B and the outer suspension lower elastic piece 92323B. The outer suspension units 92322B apply a downward force to the lens carrier 9211B through the outer suspension lower elastic piece 92323B based on the position of the bearing apparatus 9221B. Preferably, in this preferred embodiment of the present disclosure, the number of the outer suspension units 92322B is four, wherein the outer suspension units 92322B are symmetrically disposed around the lens carrier 9211B.

The outer suspension unit 92322B further includes at least one outer suspension wire 923221B, wherein the outer suspension wire 923221B is connected to the outer suspension upper elastic piece 92321B and the outer suspension lower elastic piece 92323B. Preferably, in this optional implementation of the present disclosure, the number of the outer suspension wires 923221B of the outer suspension unit 92322B is two, wherein the outer suspension wires 923221B are connected to the outer suspension upper elastic piece 92321B and the outer suspension lower elastic piece 92323B in different planes. Preferably, in this optional implementation of the present disclosure, the inner suspension wire 923121B and the outer suspension wire 923221B are fixed to the elastic pieces in a manner of hooking or pressing.

Figure 25A:
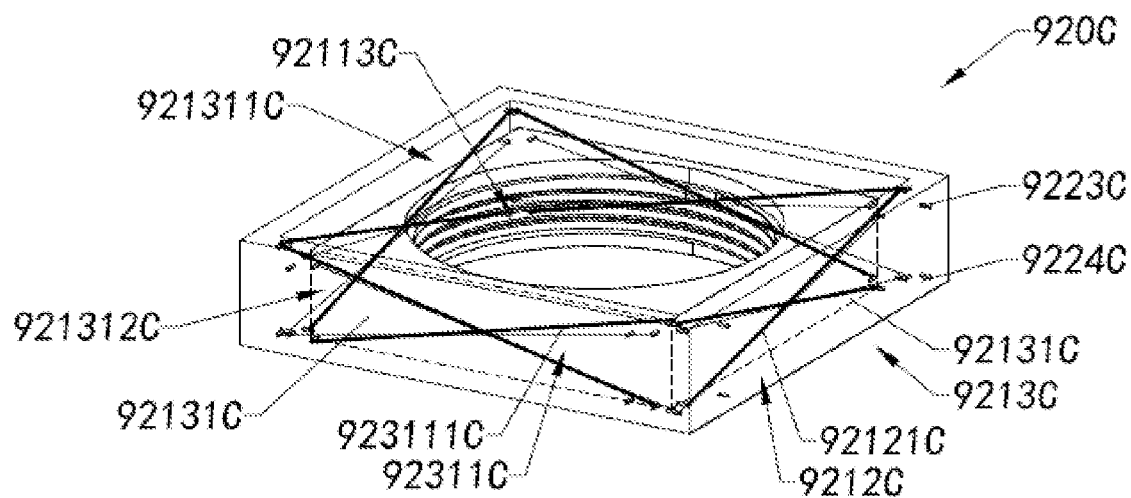
FIG. 25 is an overall schematic view of a third optional implementation of an SMA driver of the camera apparatus according to the above preferred embodiment of the present disclosure.
Figure 25B:
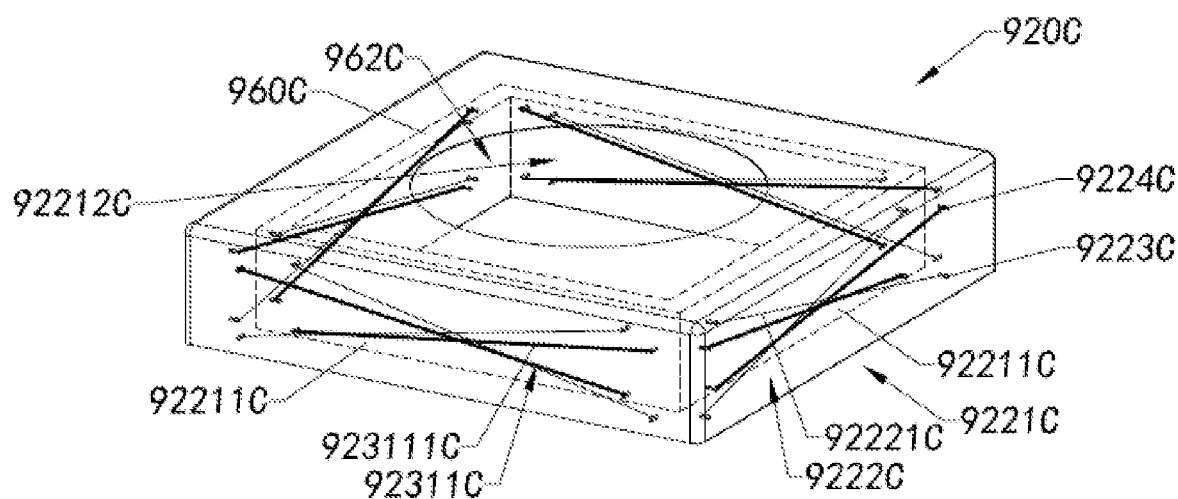
Figure 26:
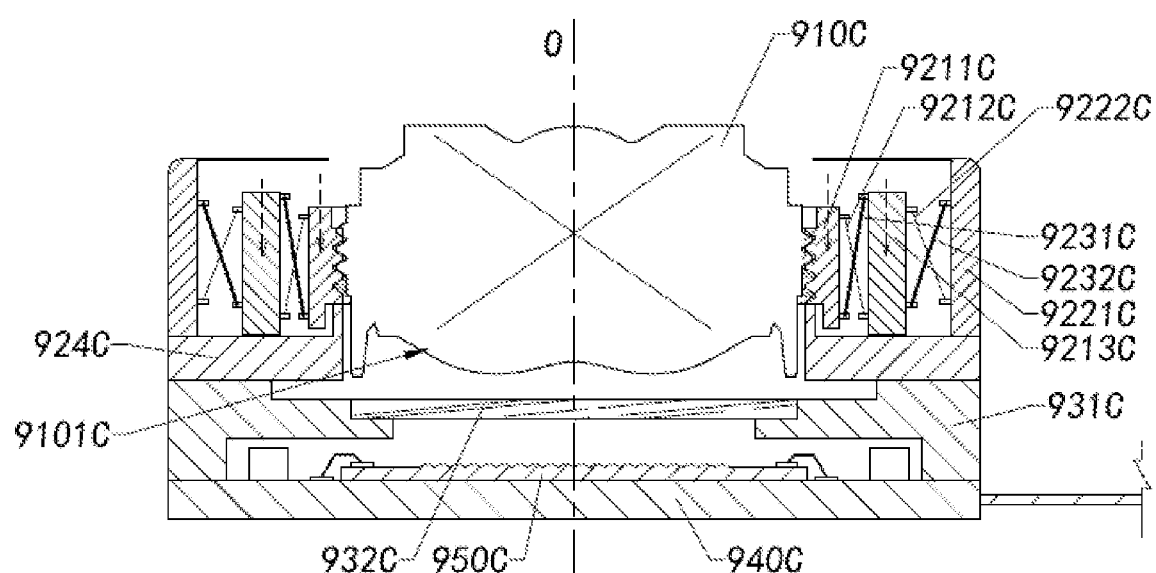
FIG. 26 is a schematic view of the SMA driver of the camera apparatus according to the above preferred embodiment of the present disclosure driving a lens to move.

Referring to FIGS. 25 and 26 of the drawings of the specification of the present disclosure, an SMA driver 920C of the camera apparatus according to the above preferred embodiment of the present disclosure is explained in the following description. The SMA driver 920C includes an inner SMA driving apparatus 921C, an outer SMA driving apparatus 922C, at least one suspension system 923C, and a supporting base 924C. It is different from the above second preferred embodiment in the direction the inner SMA driving apparatus 921C and the outer SMA driving apparatus 922C drive the lens 910 to move, and the position of the lens 910 during the initial state.

In detail, the inner SMA driving apparatus 921C includes a lens carrier 9211C, at least two inner driving units 9212C, and a supporting carrier 9213C, wherein the inner driving unit 9212C is disposed on the lens carrier 9211C and the supporting carrier 9213C. In this preferred embodiment of the present disclosure, the inner driving unit 9212C telescopically drives the lens carrier 9211C to move downward based on the supporting carrier 9213C. The outer SMA driving apparatus 922C further includes at least one bearing apparatus 9221C and at least two outer driving units 9222C, wherein the outer driving units 9222C are symmetrically disposed on the bearing apparatus 9221C and the supporting carrier 9213C. The outer driving unit 9222C of the outer SMA driving apparatus 922C drives the inner SMA driving apparatus 921C to move downward in a manner of thermal shrinkage.

Correspondingly, the suspension system 923C is disposed to provide the lens carrier 9211C and the supporting carrier 9213C with forces opposite to the inner SMA driving apparatus 921C and opposite to the outer SMA driving apparatus 922C, so that the inner SMA driving apparatus 921C, the outer SMA driving apparatus 922C, and the suspension system 923C maintain the lens 910 stable. The suspension system 923C supports the lens carrier 9211C and the supporting carrier 9213C, so that the lens 910 is drawn by the suspension system 923C upwardly to the initial position. The inner driving unit 9212C further includes two inner drive SMA lines 92121C, and the outer driving unit 9222C further includes two outer drive SMA lines 92221C. The inner drive SMA lines 92121C are telescopically connected to the upper end of the lens carrier 9211C and the lower end of the supporting carrier 9213C in mutually different planes. The outer drive SMA lines 92221C are telescopically connected to the upper end of the supporting carrier 9213C and the lower end of the bearing apparatus 9221C in mutually different planes.

Correspondingly, the suspension system 923C further includes an inner suspension apparatus 9231C and an outer suspension apparatus 9232C, wherein the inner suspension apparatus 9231C is disposed on the inner SMA driving apparatus 921C in a different plane, the outer suspension apparatus 9232C is disposed on the outer SMA driving apparatus 922C in a different plane, and the lens 910 is provided with forces opposite to the inner SMA driving apparatus 921C and the outer SMA driving apparatus 922C by means of the lens carrier 9211C and the supporting carrier 9213C.

The inner suspension apparatus 9231C further includes four inner suspension units 92311C, wherein the inner suspension units 92311C are symmetrically disposed on the side surfaces of the lens carrier 9211C. The inner suspension unit 92311C further includes two inner suspension wires 923111C, wherein the inner suspension wires 923111 are disposed to be connected to the upper end of the lens carrier 9211 and the lower end of the supporting carrier 9213C in mutually different planes. The outer suspension apparatus 9232C further includes four outer suspension units 92321C, wherein the outer suspension units 92321C are symmetrically disposed on four side surfaces of the supporting carrier 9213C. The outer suspension unit 92321C further includes two outer suspension wires 923211C, wherein the outer suspension wires 923211C are connected to the upper end of the supporting carrier 9213C and the upper end of the bearing apparatus 9221C in mutually different planes.

In short, in the initial state of the SMA driver 920C of the modified implementation of the present disclosure, the lens 910 is held by the inner SMA driving apparatus 921C, the outer SMA driving apparatus 922C and the suspension system 923C at the upper end. The inner SMA driving apparatus 921C and the outer SMA driving apparatus 922C each drive the lens 910 to move downward in a manner of thermal shrinkage, so that the lens 910 is in an imaging position. When the lens 910 needs to return to the initial position, the suspension system 923C draws the inner SMA driving apparatus 921C to move upward, and by means of the lens carrier 9211C of the inner SMA driving apparatus 921C, the lens 910 is driven to move upward.

Figure 27:
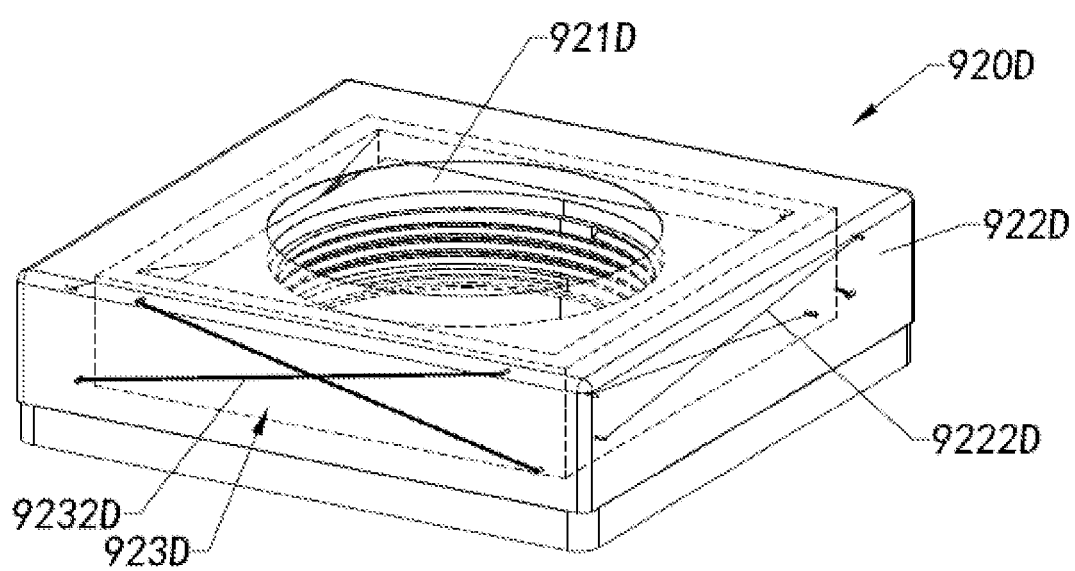
FIG. 27 is an overall schematic view of a fourth optional implementation of an SMA driver of the camera apparatus according to the above preferred embodiment of the present disclosure.
Figure 28:
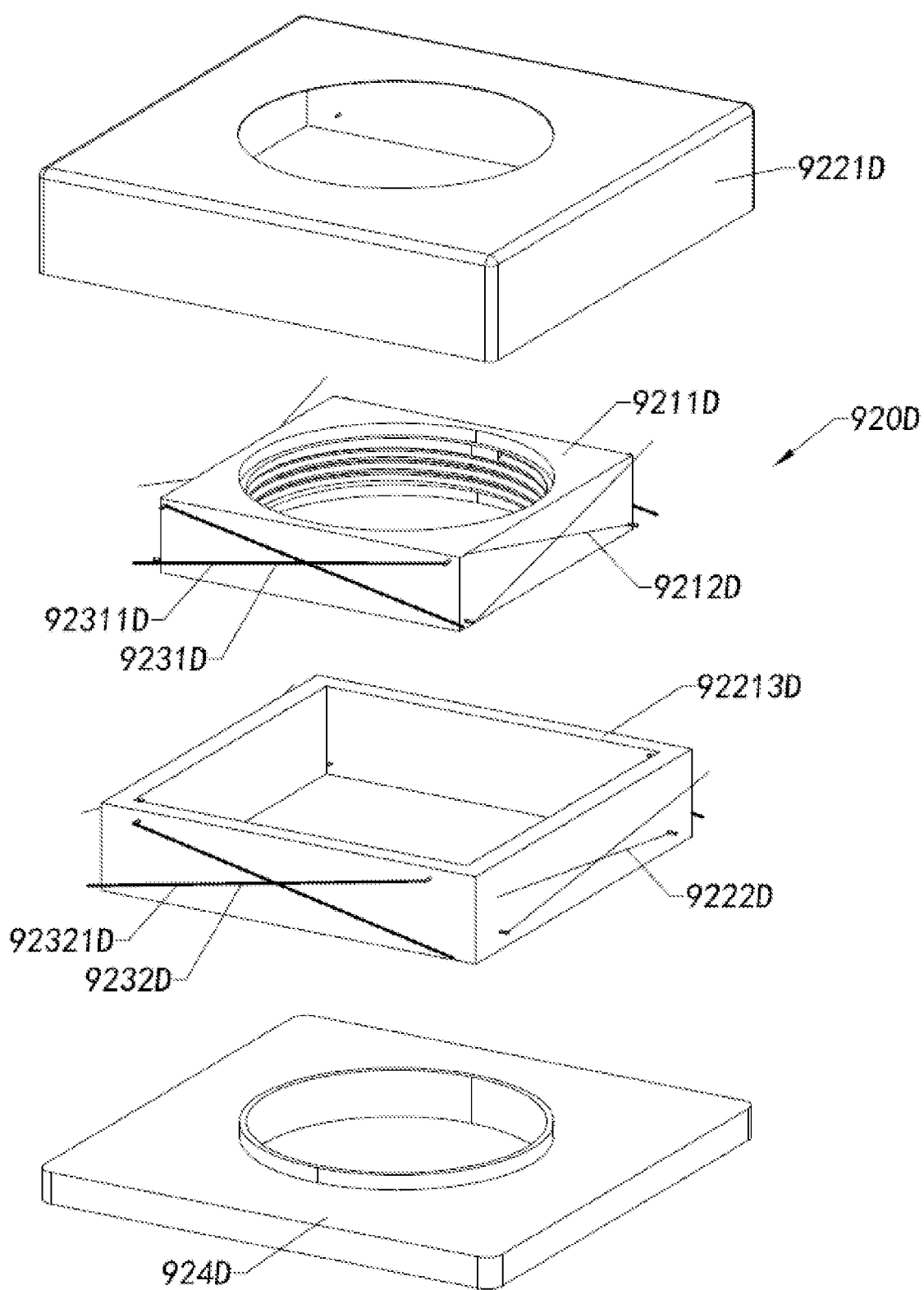
FIG. 28 is an exploded schematic view of the SMA driver of the camera apparatus according to the above preferred embodiment of the present disclosure.
Figure 29:
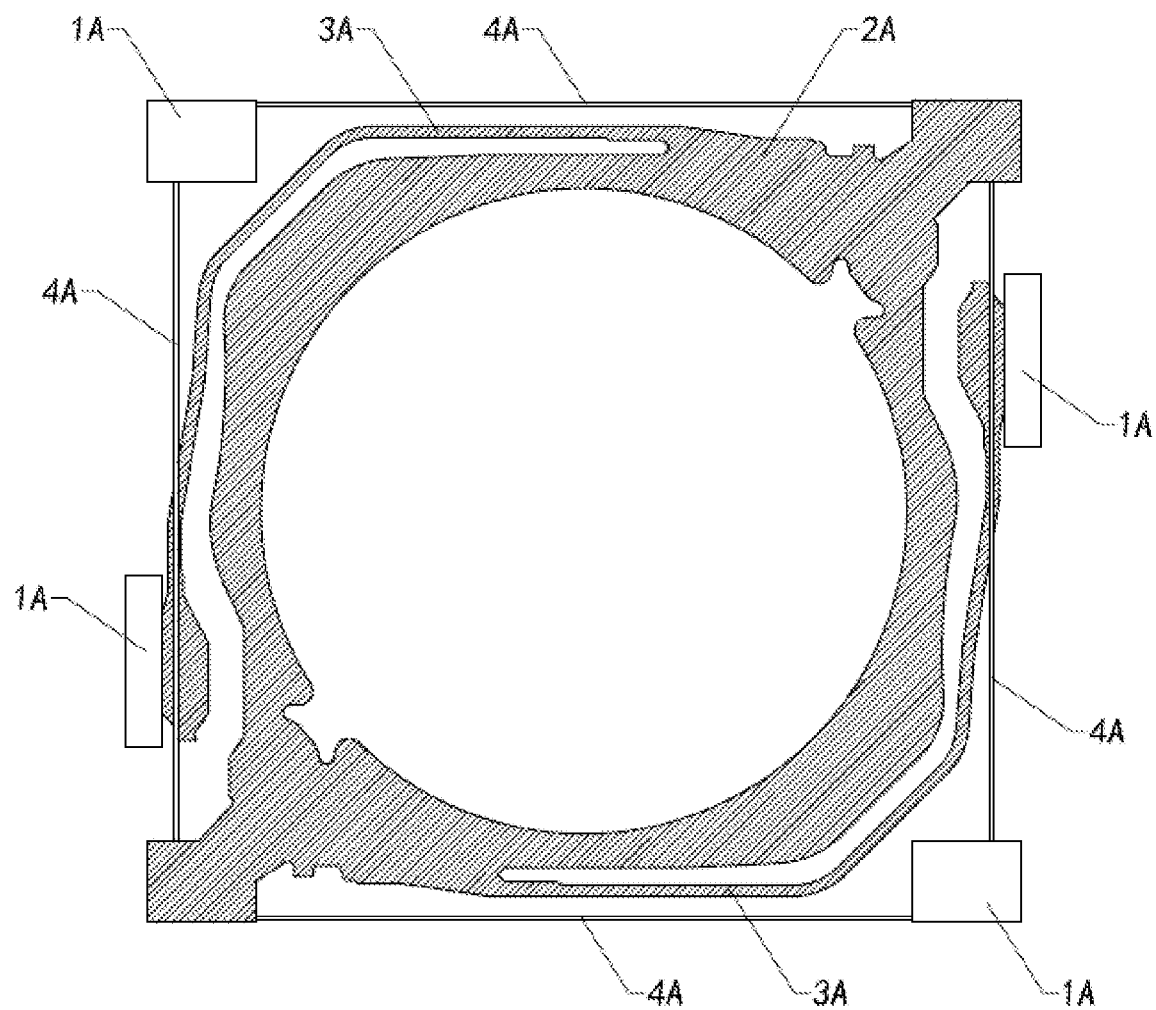
FIG. 29 is a schematic view of an arrangement of SMA driving lines in a camera module according to the prior art.
Figure 30:
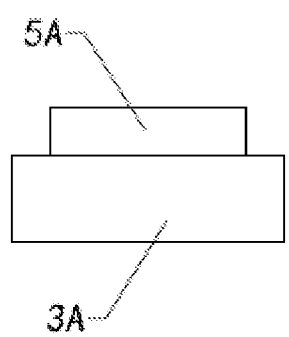
FIG. 30 is a schematic view of an arrangement of power lines on a cantilever according to the prior art.
Figure 31:
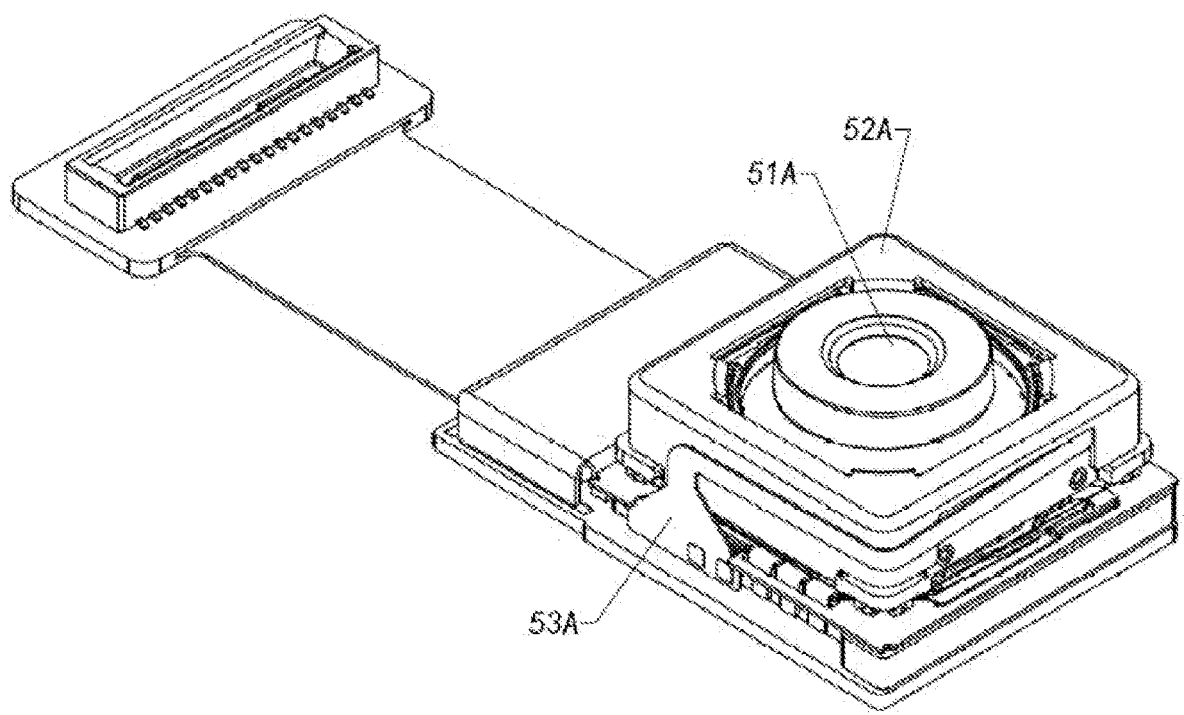
FIG. 31 is an external connection belt for arranging motor power lines in a camera module according to the prior art.

As shown in FIGS. 27 and 28, another optional implementation of an SMA driver 920D of the camera apparatus according to the above preferred embodiment of the present disclosure is explained in the following description. The SMA driver 920B includes an inner SMA driving apparatus 921D, an outer SMA driving apparatus 922D, at least one suspension system 923D, and a supporting base 924D. The inner SMA driving apparatus 921D includes a lens carrier 9211D, two inner driving units 9212D, and a supporting carrier 9213D, wherein the inner driving units 9212D are symmetrically disposed on two opposite side surfaces of the lens carrier 9211D. The inner driving unit 9212D drives the lens carrier 9211D to move along the direction of the optical axis O in a manner of thermal shrinkage based on the supporting carrier 9213D.

The outer SMA driving apparatus 922D includes a bearing apparatus 9221D and two outer driving units 9222D, wherein the outer driving units are symmetrically disposed on outer sides of the supporting carrier 9213D of the inner SMA driving apparatus 921D. The outer driving unit 9222D drives the inner SMA driving apparatus 921D to move along the direction of the optical axis O in a manner of thermal shrinkage based on the bearing apparatus 9221D. It is worth mentioning that, in this optional implementation of the present disclosure, the inner driving unit 9212D and the outer driving unit 9222D have the same structures and functions as well as mounting manners as those of the above second preferred embodiment except for the number of the inner driving units 9212D and the number of the outer driving units 9222D.

Correspondingly, the suspension system 923D further includes an inner suspension apparatus 9231D and an outer suspension apparatus 9232D, wherein the inner suspension apparatus 9231D is disposed on the inner SMA driving apparatus 921D and provides the lens carrier 9211D with a force opposite to the inner driving unit 9212D. The inner suspension apparatus 9231D further includes two inner suspension units 92311D, wherein the inner suspension units 92311D are symmetrically disposed on the other two side surfaces of the lens carrier 9211D. In other words, a pair of side surfaces of the lens carrier 9211D are connected to the inner driving unit 9212D, and the other pair of side surfaces are connected to the inner suspension unit 92311D. The outer suspension apparatus 9232D further includes two outer suspension units 92321D, wherein the outer suspension units 92321D are symmetrically disposed on the other pair of side surfaces of the supporting carrier 9213D.

It is worth mentioning that, in this optional embodiment of the present disclosure, the inner suspension unit 92311D and the outer suspension unit 92321D have the same structures and functions as well as mounting manners as those of the inner suspension unit 92311 and the outer suspension unit 92321 in the above second preferred embodiment.

According to another aspect of the present disclosure, the present disclosure further provides a driving method for an SMA driver, wherein the driving method comprises the following steps:

(a) being supported on an outer SMA driving apparatus 922, and driving a lens carrier 9211 to move by means of at least one inner driving unit 9212 of an inner SMA driving apparatus 921; and (b) driving a supporting carrier 9213 of the inner SMA driving apparatus 921 to move, and driving the lens carrier 9211 to move by means of the supporting carrier 9213.

In the above-mentioned driving method of the present disclosure, step (a) and step (b) of the driving method can be performed at the same time without a difference in time step. The inner SMA driving apparatus 921 and the outer SMA driving apparatus 922 drives the lens carrier 9211 to move in the same direction along the optical axis O.

In step (a), the lens carrier 9211 is drawn to move in a manner of thermal shrinkage. At least one inner SMA line of the inner driving unit 9212 thermally shrinks, and the lens carrier 9211 is drawn by means of the supporting carrier 9213 through the inner drive SMA line to move. The inner driving unit 9212 draws the lens carrier 9211 to move along the direction of the optical axis O, or draws the lens carrier 9211 to move in a horizontal direction in a manner of translation or tilt movement, or draws the lens carrier 9211 to move in a manner of rotation.

Step (a) of the above driving method further comprises: being driven by the inner SMA driving apparatus 921 to cause an inner suspension apparatus 9231 of a suspension system 923 to produce elastic deformation, and by means of the inner suspension apparatus 9231, drawing the lens carrier 9211 to return to an initial position under the elastic action.

In step (b), the supporting carrier 9213 is drawn to move in a manner of thermal shrinkage. At least one outer driving unit 9222 of the outer SMA driving apparatus 922 thermally shrinks, and the outer driving unit 9222 is supported by means of a bearing apparatus 9221, so that the outer driving unit 9222 draws the supporting carrier 9213 to move in a manner of shrinkage. The outer driving unit 9222 draws the supporting carrier 9213 to move along the direction of the optical axis O, or draws the supporting carrier 9213 to move in a horizontal direction in a manner of translation, or draws the supporting carrier 9213 to move in a manner of rotation.

Step (b) of the above driving method further comprises: being driven by the outer SMA driving apparatus 922 to cause an outer suspension apparatus 9232 of the suspension system 923 to produce elastic deformation, and by means of the outer suspension apparatus, drawing the supporting carrier 9213 to return to an initial position under the elastic action.

Referring to FIGS. 32 to 38D of the drawings of the specification, a camera apparatus of a third preferred embodiment provided by the present disclosure is explained, and in the present preferred embodiment, the arrangement of the internal power lines is optimized to achieve the purpose of reducing the overall size of the camera apparatus and simplifying the internal structure. It should be understood by those skilled in the art that in other preferred embodiments of the present disclosure, the camera apparatus can also be named a camera module.

Figure 32:
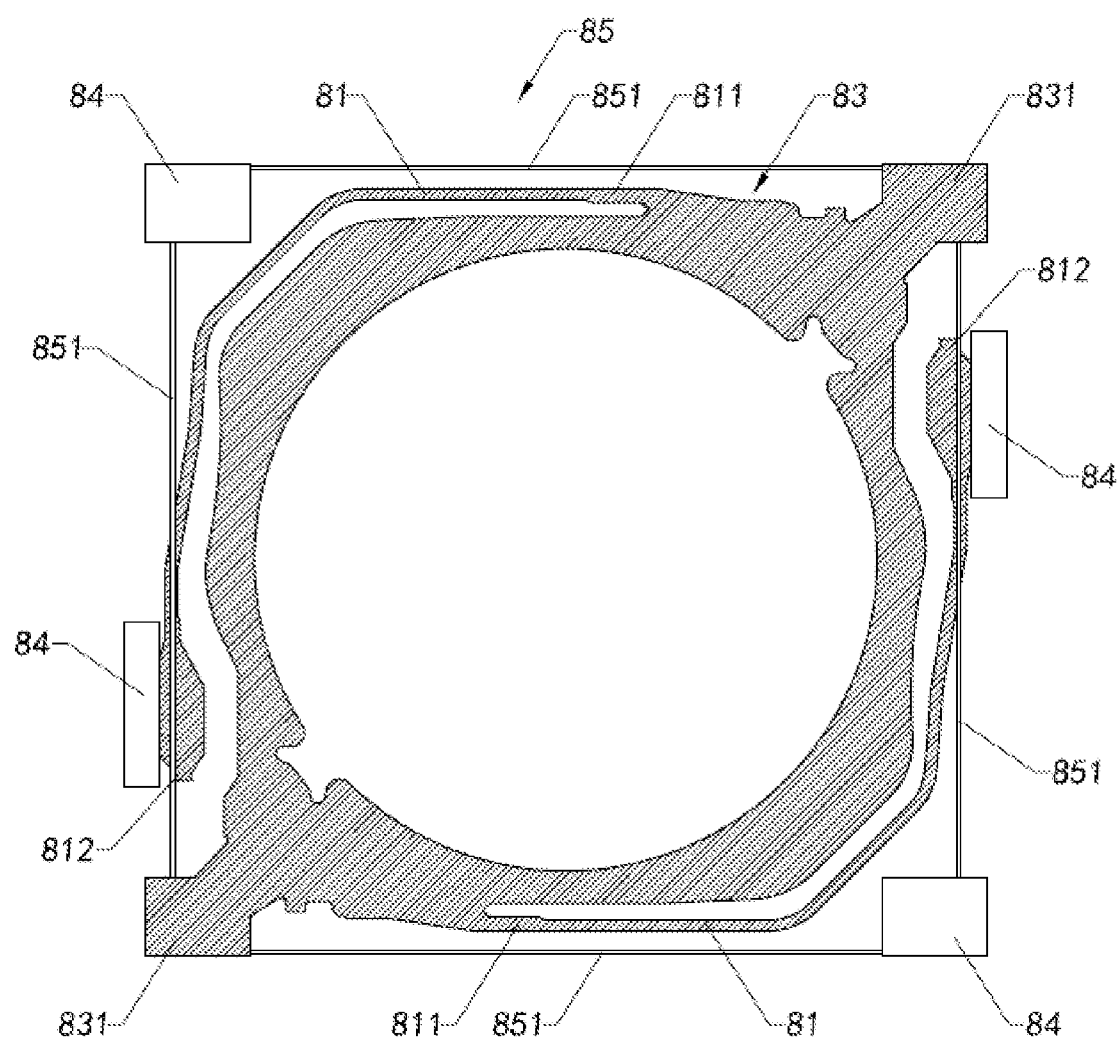
FIG. 32 is a schematic view of an arrangement of SMA driving lines in a camera module in accordance with a third preferred embodiment of the present disclosure.
Figure 33:
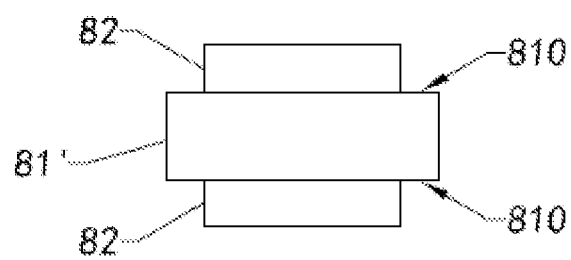
FIG. 33 is a schematic view of one preferred embodiment of a cantilever of the camera module according to the above-described preferred embodiment of the present disclosure, and shows an arrangement of power lines on the cantilever.
Figure 34:
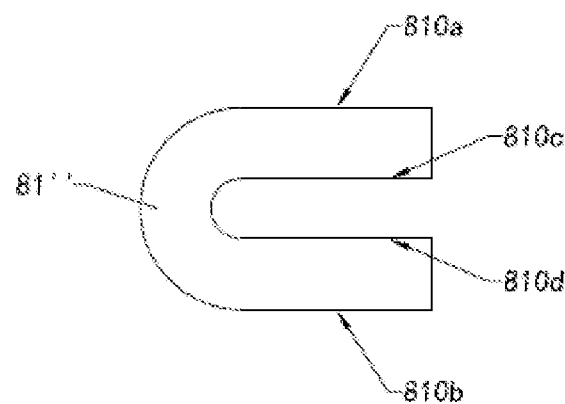
FIG. 34 is a schematic view of another preferred embodiment of the cantilever of the camera module according to the above preferred embodiment of the present disclosure.
Figure 35:
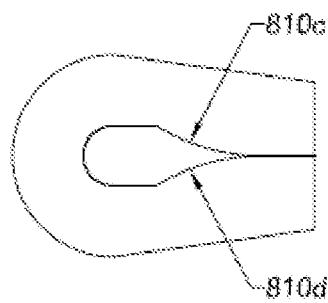
FIG. 35 is a schematic view of another preferred embodiment of the cantilever of the camera module according to the above preferred embodiment of the present disclosure.

As shown in FIG. 32, the camera apparatus of the present disclosure includes: a movable member 83, a supporting member 84, a lens (not shown) provided in the movable member 83, a cantilever 81 elastically connected to the movable member 83 and the supporting member 84, a plurality of driving units 85 for driving the lens to move, and a plurality of power lines 82 electrically connected to all driving units 85. As shown in FIGS. 33 to 35, the cantilever 81 has at least two mounting surfaces 810, and all the power lines 82 are arranged along at least two mounting surfaces 810 of the cantilever 81. In the present disclosure, the mounting surfaces 810 of the cantilever 81 are increased, so that more power lines 82 can be arranged on the cantilever 81, thereby avoiding the separate arrangement for wiring structures for some electrical elements, and achieving the purpose of simplifying the internal structure, which is conductive to the reduction of the overall size of the camera apparatus.

Preferably, the mounting surfaces 810 are disposed in sequence along a height direction of the lens, so that more power lines 82 are arranged by increasing the mounting surfaces 810 in the height direction without increasing the width of the cantilever 81. Since the cantilever 81 has more free space in the height direction, increasing the height of the cantilever 81 does not result in an increase in the overall size of the camera apparatus.

In some embodiments, the cantilever 81' is sheet-shaped. As shown in FIG. 33, the cantilever 81' has two upper and lower mounting surfaces 810, and a plurality of power lines 82 are disposed on the upper and lower mounting surfaces 810, respectively. It is worth mentioning that the power lines 82 are bonded to the mounting surfaces 810 by an adhesive.

The double-sided wiring of the cantilever 81 allows more power lines 82 to be arranged on the cantilever 81. However, in some cases, the number of electrical elements is large, and even the double-sided wiring of the cantilever 81 still cannot meet the demand.

In order to further increase the wiring space of the cantilever 81, in other embodiments, the cantilever 81" has a U-shaped section. As shown in FIG. 34, the cantilever 81" has a first mounting surface 810a, a second mounting surface 810b, a third mounting surface 810c and the fourth mounting surface 810d, the first mounting surface 810a and the second mounting surface 810b face outwards, the third mounting surface 810c is opposite to the fourth mounting surface 810d, and at least a part of the power lines 82 are arranged between the third mounting surface 810c and the fourth mounting surface 810d. Preferably, a part of the power lines 82 are arranged on the first mounting surface 810a and/or the second mounting surface 810b.

It is worth mentioning that only one power line 82 may be disposed between the third mounting surface 810c and the fourth mounting surface 810d, or multiple power lines 82 may be disposed.

The power line 82 may be bonded to the third mounting surface 810c and/or the fourth mounting surface 810d by an adhesive, or may be directly clamped by the third mounting surface 810c and the fourth mounting surface 810d. When the power line 82 is directly clamped by the third mounting surface 810c and the fourth mounting surface 810d, in order to ensure the mounting stability of the power line 82, in some embodiments, outer ends of the third mounting surface 810c and the fourth mounting surface 810d are close to each other to prevent the power line 82 from falling off between the third mounting surface 810c and the fourth mounting surface 810d, as shown in FIG. 35.

The cantilever 81" is formed by stamping a metal sheet.

Figure 36A:
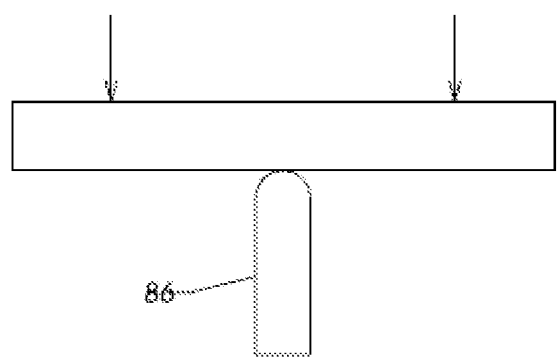
FIGS. 36A, 36B, 36C and 36D show one embodiment of a process for forming a cantilever from a metal sheet by stamping.
Figure 36B:
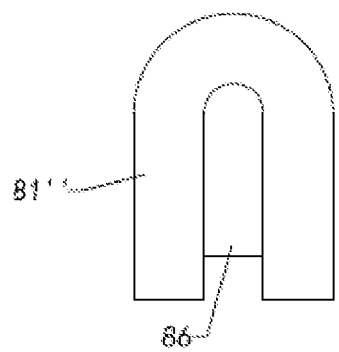

In some embodiments, when the cantilever 81" is stamped and shaped, the middle of the metal sheet is opposed to a guide positioning member 86, as shown in FIG. 36A, and then a force is applied to two ends of the metal sheet so that two sides of the metal sheet are attached to both sides of the guide positioning member 86, thereby forming a cantilever 81" with a U-shaped section, as shown by 368B. The distance between the third mounting surface 810c and the fourth mounting surface 810d of the cantilever 81" is slightly larger than the outer diameter of the power line 82 to leave a space for applying an adhesive.

Figure 36C:
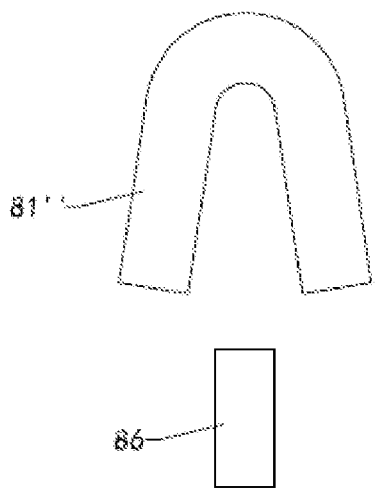
Figure 36D:
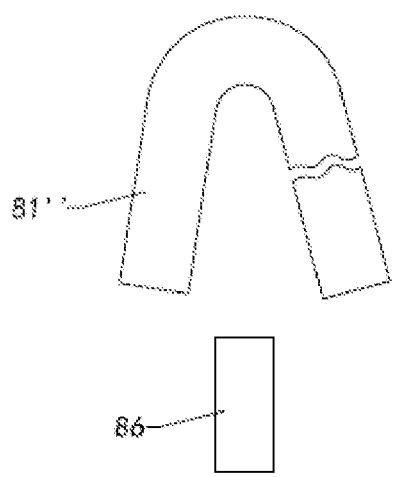

After the stamping is completed, when the cantilever 81" is separated from the stamp positioning member 86, since the cantilever 81" is thin, it is easy to deform or even break, as shown in FIGS. 36C and 36D. In addition, after the cantilever 81" is shaped, the power line 82 is bonded between the third mounting surface 810c and the fourth mounting surface 810d by an adhesive. However, when the adhesive is cured, its volume will change, which easily causes deformation and deterioration of mechanical properties of the cantilever 81".

Figure 37:
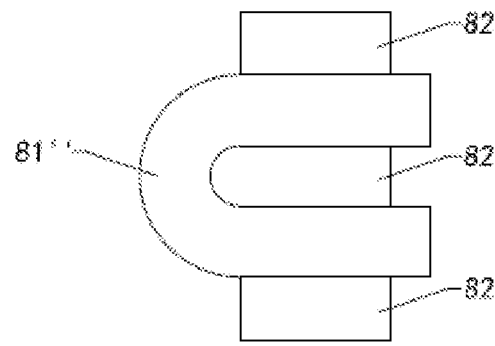
FIG. 37 is a schematic view of another preferred embodiment of the cantilever of the camera module according to the above-described preferred embodiment of the present disclosure, and shows an arrangement of power lines on the cantilever.

Considering the above drawbacks, in a preferred embodiment, when the cantilever 81" is stamped and shaped, the power line 82 is used instead of the guide positioning member 86, so that the middle of the metal sheet is opposite to a power line 82, and then a force is applied to two ends of the metal sheet so that the two sides of the metal sheet are attached to both sides of the power line 82. After the stamping is completed, the power line 82 is clamped on the inside of the cantilever 81". In this way, the step of bonding the power lines 82 and the cantilever 81" can be omitted, which is conductive to saving space and reducing the volume of the cantilever 81". After the stamping is completed, the power line 82 is disposed on the outside of the cantilever 81" as needed, as shown in FIG. 37. In addition, the cantilever 81" can be made thinner because it does not need to consider the deformation caused when the guide positioning member is taken out.

Figure 38A:
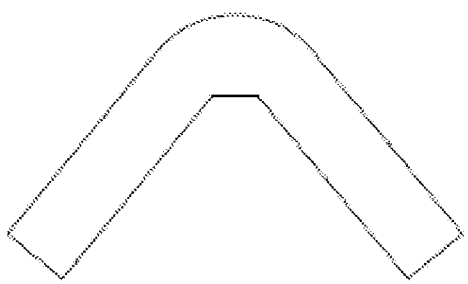
FIGS. 38A, 38B and 38C show another preferred embodiment of the process for forming the cantilever from the metal sheet by stamping.
Figure 38B:
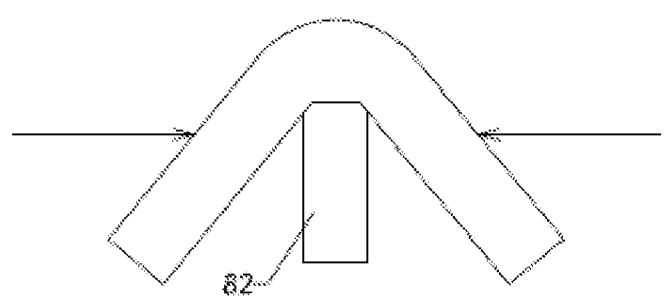
Figure 38C:
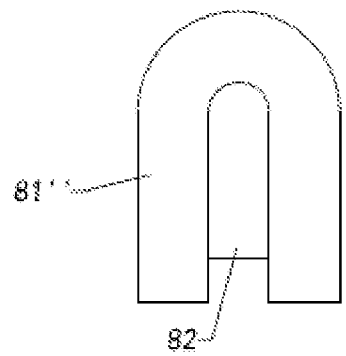

In the above embodiment, when the power line 82 is used to directly replace the guide positioning member 86 for stamping, an upper end surface of the power line 82 may be worn out, and leakage or short circuit may occur during actual work. On this basis, in a more preferred embodiment, the guide positioning member 86 is first used to pre-stamp the metal sheet to form a V-shaped section, as shown in FIG. 38A, and then the power line 82 is used instead of the guide positioning member 86 to apply a force to the two ends of the metal sheet, as shown in FIG. 38B, so that the two sides of the metal sheet are attached to both sides of the power line 82, as shown in FIG. 38C. After the stamping is completed, the power line 82 is disposed on the outside of the cantilever 81" again as needed.

Figure 38D:
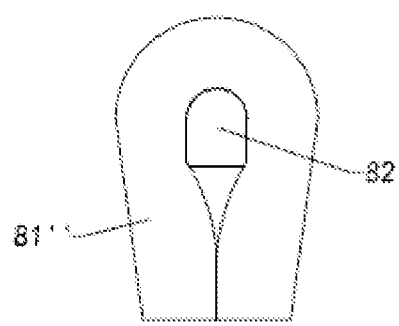
FIG. 38D shows another preferred embodiment of forming a cantilever from a metal sheet by stamping.

In other embodiments, when the metal sheet is pressed on both sides of the power line 82, two side surfaces can be inclined inward, as shown in FIG. 38D, which can prevent the power line 82 from accidentally falling off.

It can be understood that, in order to further increase the number of mounting surfaces 810 of the cantilever 81, the section of cantilever 81 may also be S-shaped, or even a curved shape with more bends.

The driving unit 85 may be a shape memory alloy driving line, or may be a voice coil motor, or may be other electrical devices for driving the lens to move.

In a preferred embodiment, as shown in FIG. 32, the plurality of driving units 85 include four shape memory alloy driving lines 851. All driving line 851 are disposed in an xy-axis plane. One end of each driving line 851 is connected to the movable member 83, and the other end is connected to the supporting member 84. By controlling the expansion and contraction of each driving line 851, the movement of the movable member 83 in the xy-axis plane is realized, and thus the movable member 83 drives the lens to move in the xy-axis plane.

Preferably, the driving lines 851 are positively disposed on the outside of the movable member 83 in a quadrilateral shape, the movable member 83 has two connecting ends 831 on the diagonal positions, and each connecting end 831 is connected to two mutually perpendicular driving lines 851.

The movable member 83 and the supporting member 84 are elastically connected by two cantilevers 81, and the two cantilevers 81 are centrally symmetrically disposed on the outside of the movable member 83 to allow the movable member 83 to move relative to the supporting member 84 under the action of all driving lines 851. The cantilever 81 has a first end 811 connected to the movable member 83 and a second end 812 connected to the supporting member 84. The first end 811 of the cantilever 81 is close to a connecting end 831 of the movable member 83, and the second end of the cantilever 81 812 is close to the other connecting end 831 of the movable member 83.

A plurality of power lines 82 extend along the cantilever 81 from the second end 812 to the first end 811 and then to the movable member 83. At least a part of the power lines 82 are electrically connected to the driving lines 851 at the connecting ends 831. That is, a plurality of power lines 82 extend through the cantilever 81 from the outside of the movable member 83 to the movable member 83, and are electrically connected to a plurality of electrical elements mounted on the movable member 83.

Preferably, the plurality of driving units 85 further include a motor (not shown in the figure) disposed on the movable member 83, the motor is used to drive the lens to move relative to the movable member 83, and at least one power line 82 extending to the movable members 83 extends to the motor and is electrically connected to the motor. Therefore, in the present disclosure, since the wiring space of the cantilever 81 is increased so that the power lines of all electrical elements each can extend to the movable member 83 through the cantilever 81, there is no need to provide an additional connection belt to arrange the power lines of the motor.

According to a preferred embodiment of the present disclosure, the present disclosure provides a power line arrangement method, which is suitable for arranging the power lines on the cantilever 81", comprising the following steps:

S811. providing a metal sheet with a V-shaped section, the metal sheet being used to form the cantilever 81";

S812. disposing at least one power line 82 on an inner side of the above metal sheet;

S813. squeezing both sides of the above metal sheet inwardly so that the inner side of the metal sheet is attached to the power line 82 and the metal sheet is shaped into the cantilever 81".

Preferably, after step S813, the power line arrangement method further comprises step S814: arranging a power line 82 on at least one outer side of the cantilever 81".

According to a preferred embodiment of the present disclosure, the present disclosure further provides a power line arrangement method, which is suitable for arranging the power lines on the cantilever 81", comprising the following steps:

S821. providing a metal sheet, the metal sheet being used to form the cantilever;

S822. using at least one power line as a stamping guide member to stamp the metal sheet, so that an inner side of the metal sheet is attached to the power line and the metal sheet is shaped into the cantilever.

It should be understood by those skilled in the art that the embodiments of the present disclosure described in the above description and shown in the drawings are only examples and do not limit the application. The objectives of the present application have been achieved completely and efficiently. The function and structural principles of the present disclosure have been presented and described in the embodiments, and the implementations of the present disclosure may be varied or modified without departing from the principles.

The invention claimed is:

1. A shape memory alloy (SMA) driving device, comprising:
  a lens carrier;
  at least one upgoing driver, wherein the lens carrier is connected to the upgoing driver and is drivable by the upgoing driver, and the upgoing driver supports the lens carrier upwardly in a thermally driven manner, and pulls the lens carrier to move upward; and
  at least one downgoing driver, wherein the lens carrier is connected to the downgoing driver and is drivable by the downgoing driver, and the downgoing driver supports the lens carrier downwardly in a thermally driven manner, and pulls the lens carrier to move downward;
  wherein the upgoing driver and the downgoing driver include a plurality of SMA lines disposed on lateral sides of the lens carrier and a plurality of bending members extending outwardly from the lateral sides of the lens carrier, and each SMA line is hooked over each bending member;

wherein the SMA driving device further comprises a plurality of spacer apparatuses, wherein the spacer apparatuses are formed by integrally extending outwardly from the lateral sides of the lens carrier, and the spacer apparatuses protrude outwardly relative to positions of the upgoing driver and the downgoing driver in a direction perpendicular to an optical axis direction of the SMA driving device, wherein each bending member and each spacer apparatus are formed by integrally extending outwardly from each of lateral side surfaces of the lens carrier;

wherein each spacer apparatus is located between one bending member and an end of one SMA line, and at least one spacer apparatus and one bending member located on each lateral side surface which is parallel to the optical axis direction, and the spacer apparatuses limit the SMA lines of the upgoing driver and the downgoing driver from contacting an inner wall of a housing, which is used for receiving the SMA driving device.

2. The SMA driving device according to claim 1, wherein in an initial state, the lens carrier is supported upwardly by the upgoing driver and drawn downwardly by the downgoing driver, and is held at an intermediate position, and wherein the lens carrier can be moved up and down based on the upgoing driver and the downgoing driver.

3. The SMA driving device according to claim 2, wherein the upgoing driver and the downgoing driver provide the lens carrier with a force in a manner of being driven by electric heating, and wherein the upgoing driver and the downgoing driver support the lens carrier at the intermediate position in a case of being powered on, and drive the lens carrier to move.

4. The SMA driving device according to claim 2, wherein the upgoing driver comprises at least one upgoing driving unit and at least one upper bending member, wherein the upper bending member is disposed on the lens carrier, and wherein the upgoing driving unit is connected to the upper bending member, and the upgoing driving unit provides the lens carrier with an upward force through the upper bending member, so that the upper bending member drives the lens carrier upwardly to move.

5. The SMA driving device according to claim 4, wherein the downgoing driver comprises at least one downgoing driving unit and at least one lower bending member, wherein the lower bending member is disposed on the lens carrier, and wherein the downgoing driving unit is drivingly connected to the lower bending member, and the downgoing driving unit provides the lens carrier with a downward force through the lower bending member, so that the lower bending member drives the lens carrier downwardly to move.

6. The SMA driving device according to claim 5, wherein the upper bending member and the lower bending member are formed by integrally extending outwardly from an outer edge of the lens carrier.

7. The SMA driving device according to claim 2, wherein the upgoing driver comprises at least one upgoing driving unit and at least one upper actuator, wherein the upper actuator is disposed below the lens carrier, and wherein the upgoing driving unit is drivingly connected to the upper actuator, and the upgoing driving unit provides the lens carrier with an upward force through the upper actuator, so that the upper actuator drives the lens carrier upwardly to move.

8. The SMA driving device according to claim 7, wherein the downgoing driver comprises at least one downgoing driving unit and at least one lower actuator, wherein the lower actuator is disposed above the lens carrier, and wherein the downgoing driving unit is drivingly connected to the lower actuator, and the downgoing driving unit provides the lens carrier with a downward force through the lower actuator, so that the lower actuator drives the lens carrier downwardly to move.

9. The SMA driving device according to claim 8, wherein the upper actuator further comprises an upper actuator main body and at least one upper hook, wherein the upper hook is disposed on a side of the upper actuator main body, wherein the upper hook is formed by integrally extending upwardly from an outer side of the upper actuator main body, and wherein the upgoing driving unit applies an upward force to the upper actuator main body through the upper hook, so that the upper actuator main body drives the lens carrier to move upward.

10. The SMA driving device according to claim 9, wherein the lower actuator further comprises a lower actuator main body and at least one lower hook, wherein the lower hook is disposed on a side of the lower actuator main body, wherein the lower hook is formed by integrally extending downwardly from an outer side of the lower actuator main body, and wherein the downgoing driving unit applies a downward force to the lower actuator main body through the lower hook, so that the lower actuator main body drives the lens carrier to move downward.

11. The SMA driving device according to claim 2, wherein the SMA driving device further comprises a supporting base, and wherein the upgoing driver and the downgoing driver are mounted on the supporting base, and the upgoing driver and the downgoing driver are supported by means of the supporting base.

12. A manufacturing method of a shape memory alloy (SMA) driving device, wherein the manufacturing method comprises the following steps:
(a) placing a lens carrier in an intermediate position, so that the lens carrier can be driven to move up and down;
(b) disposing at least one upgoing driver and at least one downgoing driver on the lens carrier, so that the lens carrier is driven by means of the upgoing driver to move upward, and the lens carrier is driven by means of the downgoing driver to move downward;

wherein the upgoing driver and the downgoing driver include a plurality of SMA lines disposed on lateral sides of the lens carrier and a plurality of bending members extending outwardly from the lateral sides of the lens carrier, and each SMA line is hooked over each bending member;

wherein the SMA driving device further comprises a plurality of spacer apparatuses, wherein the spacer apparatuses are formed by integrally extending outwardly from the lateral sides of the lens carrier, and the spacer apparatuses protrude outwardly relative to positions of the upgoing driver and the downgoing driver in a direction perpendicular to an optical axis direction of the SMA driving device, wherein each bending member and each spacer apparatus are formed by integrally extending outwardly from each of lateral side surfaces of the lens carrier;

wherein each spacer apparatus is located between one bending member and an end of one SMA line, and at least one spacer apparatus and one bending member located on each lateral side surface which is parallel to the optical axis direction, and the spacer apparatuses limit the SMA lines of the upgoing driver and the downgoing driver from contacting an inner wall of a housing, which is used for receiving the SMA driving device; and (c) mounting at least one upper elastic piece above the lens carrier, and mounting at least one lower elastic piece between the lens carrier and a supporting base so as to manufacture the SMA driving device.

13. The manufacturing method according to claim 12, wherein in the step (b), two upgoing driving units of the upgoing driver and two downgoing driving units of the downgoing driver are symmetrically disposed on sides of the lens carrier.

14. The manufacturing method according to claim 13, wherein in the step (b), two upper drive fixing apparatuses of the upper driving unit and two lower drive fixing apparatuses of the lower driving unit are fixedly mounted on the supporting base, and the upgoing driver and the downgoing driver are supported by means of the supporting base.

15. The manufacturing method according to claim 13, wherein in the step (b), at least one upper drive SMA line is pressed against the upper drive fixing apparatus, and at least a lower drive SMA line is pressed against the lower drive fixing apparatus to manufacture the upgoing driving unit and the downgoing driving unit.

16. A driving method of the shape memory alloy (SMA) driving device according to claim 1, wherein the driving method comprises the following steps:

(I) in an initial state, drawing the lens carrier by means of joint shrinkage of an upper drive SMA line of at least one upgoing driving unit of the upgoing driver and a lower drive SMA line of at least one downgoing driving unit of the downgoing driver, to hold the lens carrier at a position that can move up and down; and (II) differently controlling temperature of the upper drive SMA line and temperature of the lower drive SMA line, to control the upper drive SMA line and the lower drive SMA line to draw and support the lens carrier with different degrees of tension, so as to drive the lens carrier to move.

17. The driving method according to claim 16, wherein in the step (I) of the above method, in the initial state of the SMA driving device, the upper drive SMA line and the lower drive SMA line are electrically heated to increase the temperature of the SMA lines, so that the lens carrier is supported in a manner of thermal shrinkage.

18. The driving method according to claim 16, wherein in the step (II) of the above method, the SMA driving device differently controls magnitudes of currents of the upper drive SMA line and the lower drive SMA line to control the temperature for thermal driving of the upper drive SMA line and the lower drive SMA line.

19. The driving method according to claim 18, wherein in the step (II) of the above method, when a current of the upper drive SMA line of the upgoing driving unit is increased, and a current of the lower drive SMA line of the downgoing driving unit is decreased, the upper drive SMA line is tightened as the temperature rises, and the lower drive SMA line is relaxed as the temperature drops.

20. The driving method according to claim 18, wherein in the step (II) of the above method, when a current of the lower drive SMA line of the downgoing driving unit is increased, and a current of the upper drive SMA line of the upgoing driving unit is decreased, the lower drive SMA line is tightened as the temperature rises, and the upper drive SMA line is relaxed as the temperature drops.

\* \* \* \* \*